US009348154B2

(12) United States Patent
Hayakawa

(10) Patent No.: US 9,348,154 B2
(45) Date of Patent: May 24, 2016

(54) OPTICAL RESONATOR APPARATUS, OPTICAL TRANSMITTER AND CONTROLLING METHOD FOR OPTICAL RESONATOR

(71) Applicants: FUJITSU LIMITED, Kawasaki-shi, Kanagawa (JP); Photonics Electronics Technology Research Association, Bunkyo-ku, Tokyo (JP)

(72) Inventor: Akinori Hayakawa, Sagamihara (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 33 days.

(21) Appl. No.: 14/529,740

(22) Filed: Oct. 31, 2014

(65) Prior Publication Data

US 2015/0132015 A1 May 14, 2015

(30) Foreign Application Priority Data

Nov. 8, 2013 (JP) ................................. 2013-232373

(51) Int. Cl.
*H04B 10/572* (2013.01)
*G02F 1/025* (2006.01)
(Continued)

(52) U.S. Cl.
CPC *G02F 1/025* (2013.01); *G02B 6/28* (2013.01); *G02B 6/4215* (2013.01); *G02F 1/0147* (2013.01); *G02F 1/225* (2013.01); *H04B 10/5057* (2013.01); *H04B 10/572* (2013.01); *G02B 6/29364* (2013.01); *G02F 2001/0151* (2013.01); *G02F 2201/16* (2013.01); *G02F 2203/15* (2013.01)

(58) Field of Classification Search
CPC ................. H04B 10/50; H04B 10/501; H04B 10/505–10/506; H04B 10/54–10/588; G02B 6/28; G02F 1/025; G02F 1/0147; G02F 1/225
USPC ................................................... 398/182–201
See application file for complete search history.

(56) References Cited

U.S. PATENT DOCUMENTS 6,891,865 B1 * 5/2005 Ma ........................... H01S 5/141
372/20
7,310,459 B1 * 12/2007 Rahman ............. G02B 6/12007
385/14

(Continued)

FOREIGN PATENT DOCUMENTS

JP 2003-066253 3/2003
JP 2005-055882 3/2005

*Primary Examiner* — Li Liu
(74) *Attorney, Agent, or Firm* — Myers Wolin, LLC.

(57) ABSTRACT

An optical resonator apparatus includes an optical resonator unit wherein ring optical resonators each including a first optical waveguide and a resonance wavelength adjustment electrode are coupled in cascade connection and round-trip lengths of the ring optical waveguides are different from each other and vary in order from an input side to an output side, and a controller that adjusts a resonance wavelength of each ring optical resonator in order beginning with the ring optical resonator provided at the most input side so as to match with an input light wavelength and, when an inter-channel occurs, adjusts the resonance wavelength of the first ring optical resonator from the input side so as to match with a second-matching input light wavelength and adjusts the resonance wavelengths of the second and succeeding ring optical resonators from the input side so as to match with the first-matching input light wavelength.

20 Claims, 26 Drawing Sheets

(51) Int. Cl.
  *G02F 1/01*     (2006.01)
  *G02F 1/225*    (2006.01)
  *H04B 10/50*    (2013.01)
  *G02B 6/28*         (2006.01)
  *G02B 6/42*         (2006.01)
  *G02F 1/015*        (2006.01)
  *G02B 6/293*        (2006.01)

(56) References Cited

U.S. PATENT DOCUMENTS

| | | | | |
|---|---|---|---|---|
| 7,820,970 B1* | 10/2010 | Shaw | ............ | G01J 5/08 250/338.1 |
| 8,588,556 B1* | 11/2013 | Dong | ............ | G02F 1/025 359/237 |
| 9,002,147 B2* | 4/2015 | Akiyama | ............ | H01S 5/142 385/3 |
| 9,130,350 B2* | 9/2015 | Jeong | ............ | H01S 5/142 |
| 2001/0004411 A1* | 6/2001 | Yariv | ............ | B82Y 20/00 385/28 |
| 2003/0090767 A1* | 5/2003 | Yap | ............ | G02B 6/2861 398/183 |
| 2004/0081386 A1* | 4/2004 | Morse | ............ | G02B 6/12007 385/15 |
| 2005/0013538 A1 | 1/2005 | Yamazaki | | |
| 2005/0025199 A1* | 2/2005 | Ma | ............ | H01S 5/141 372/20 |
| 2009/0148115 A1* | 6/2009 | Lee | ............ | G02B 6/12007 385/132 |
| 2010/0098372 A1* | 4/2010 | Manipatruni | ............ | G02B 6/12007 385/2 |
| 2010/0329685 A1* | 12/2010 | Zheng | ............ | G02F 1/0147 398/83 |
| 2011/0026879 A1* | 2/2011 | Popovic | ............ | B82Y 20/00 385/28 |
| 2011/0293216 A1* | 12/2011 | Lipson | ............ | G02B 6/12007 385/14 |
| 2012/0045163 A1* | 2/2012 | Wu | ............ | G02F 1/225 385/2 |
| 2012/0207479 A1* | 8/2012 | Krishnamoorthy | .. | H04B 10/506 398/85 |
| 2013/0037692 A1* | 2/2013 | Akiyama | ............ | G02F 1/0115 250/201.1 |
| 2013/0044973 A1* | 2/2013 | Akiyama | ............ | G02F 1/0121 385/2 |
| 2014/0016931 A1* | 1/2014 | Meade | ............ | H04Q 11/0005 398/48 |
| 2014/0110572 A1* | 4/2014 | Li | ............ | G01J 1/0209 250/227.23 |
| 2014/0133511 A1* | 5/2014 | Tanaka | ............ | H01S 5/0687 372/50.11 |
| 2014/0314406 A1* | 10/2014 | Zerbe | ............ | H04J 14/02 398/38 |
| 2014/0321848 A1* | 10/2014 | Sekiguchi | ............ | G02F 1/0123 398/38 |
| 2015/0016767 A1* | 1/2015 | Akiyama | ............ | H01S 5/142 385/3 |
| 2015/0316794 A1* | 11/2015 | Hayakawa | ............ | G02F 1/025 385/2 |

* cited by examiner

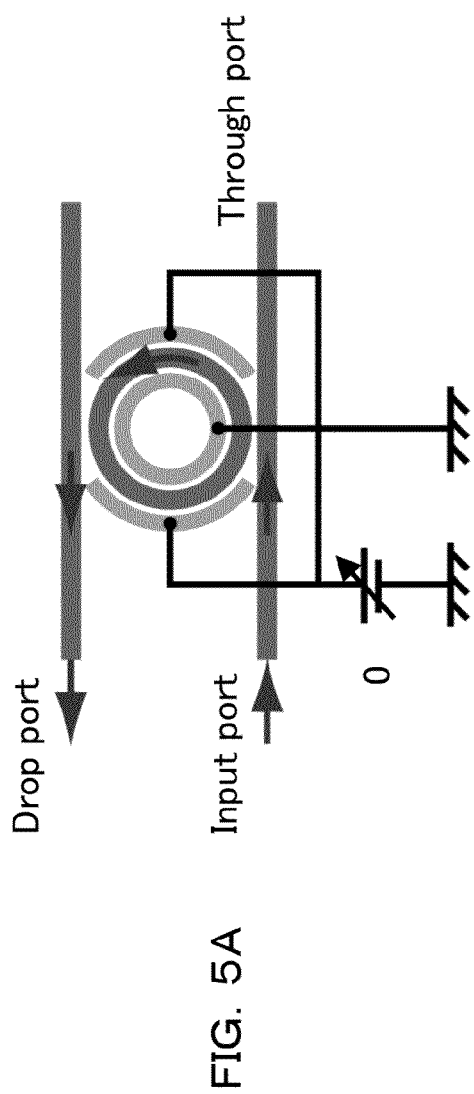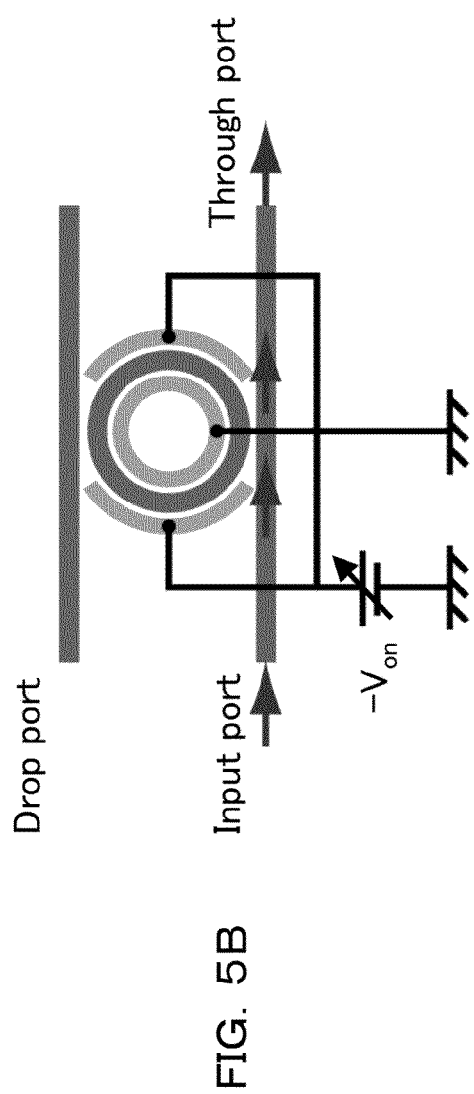
FIG. 5A
FIG. 5B

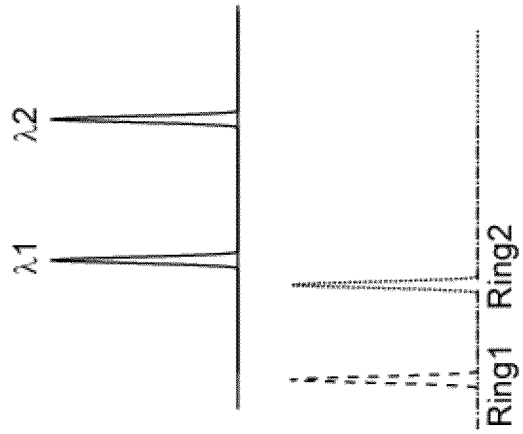
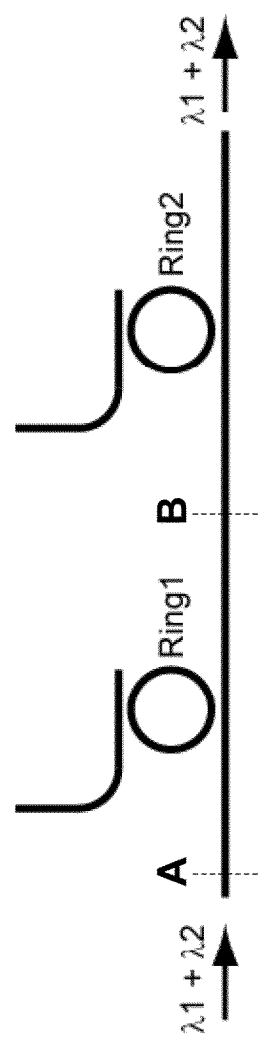

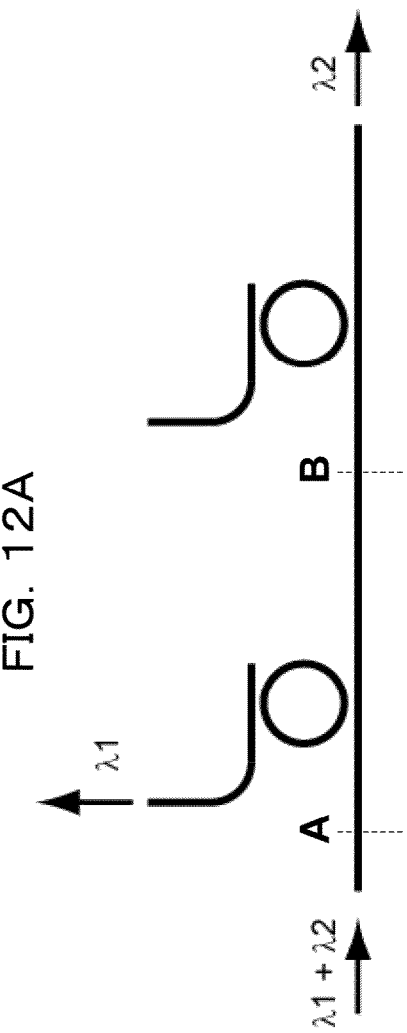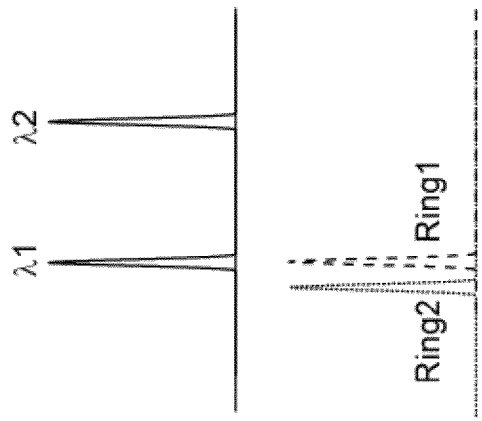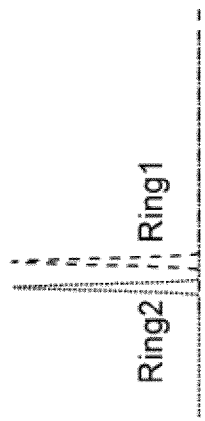

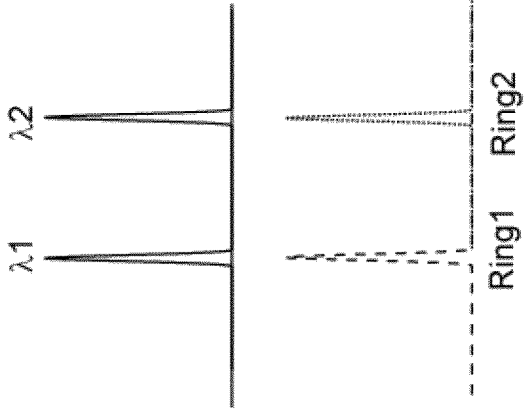
FIG. 13D
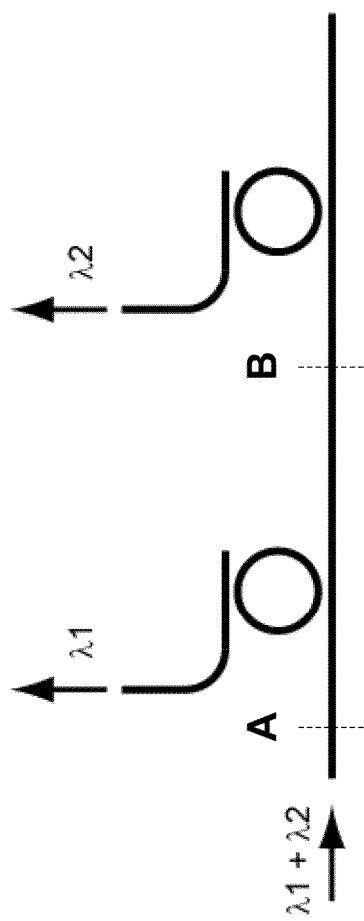
FIG. 13A
FIG. 13C
FIG. 13B

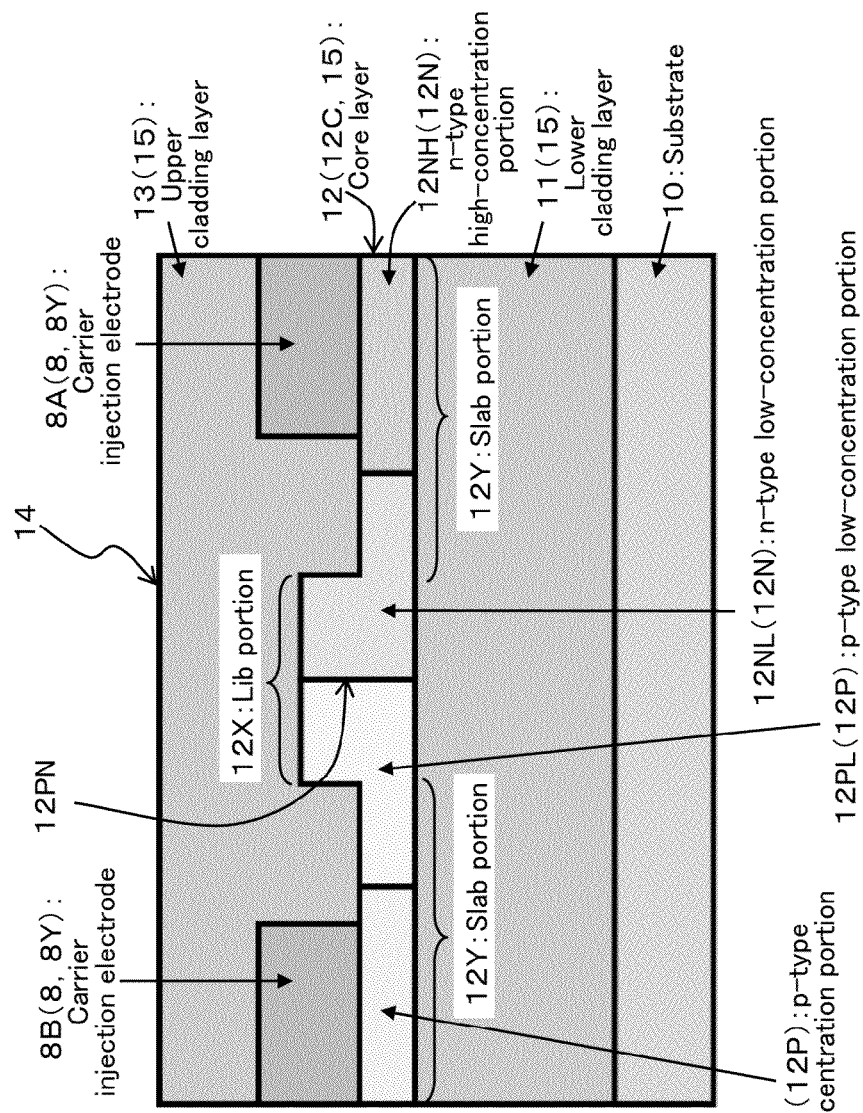
FIG. 24B
FIG. 24A
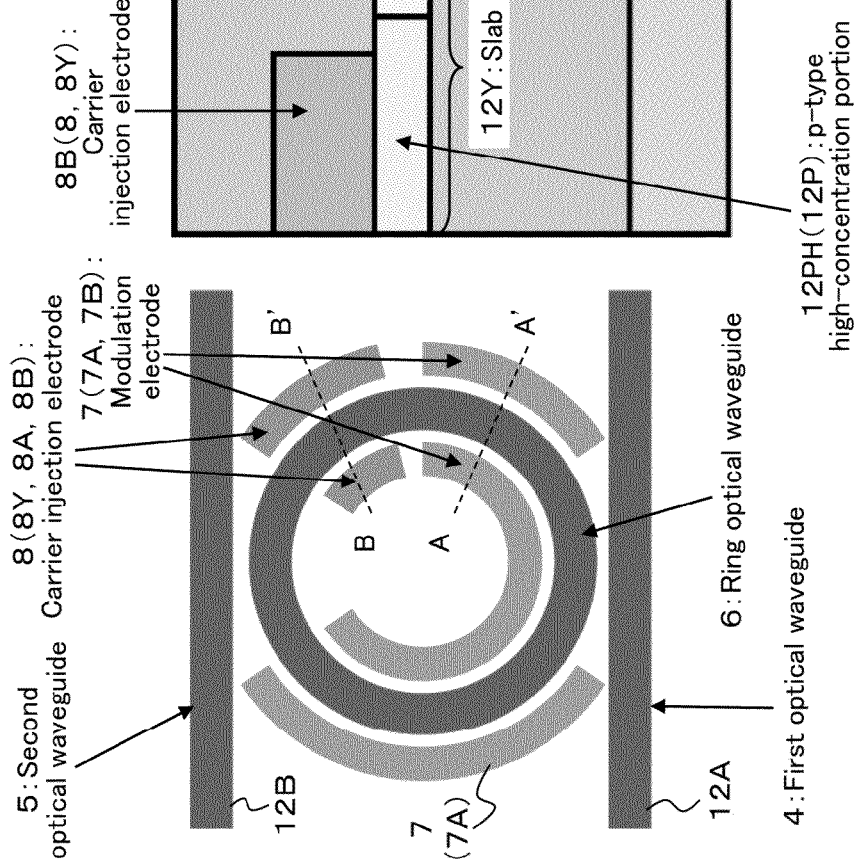

OPTICAL RESONATOR APPARATUS, OPTICAL TRANSMITTER AND CONTROLLING METHOD FOR OPTICAL RESONATOR

CROSS-REFERENCE TO RELATED APPLICATION

This application is based upon and claims the benefit of priority of the prior Japanese Patent Application No. 2013-232373, filed on Nov. 8, 2013, the entire contents of which are incorporated herein by reference.

FIELD

The embodiments discussed herein are related to an optical resonator apparatus, an optical transmitter and a controlling method for an optical resonator.

BACKGROUND

In recent years, an optical functional device on a silicon substrate for which a silicon electronic circuit fabrication technology with which large-scale integration can be implemented at a low cost is utilized draws attention.

Further, in a high-performance server, a supercomputer or the like, enhancement in performance is attempted by employment of a multicore configuration for a CPU (Central Processing Unit) and so forth so as to be ready for enhancement in required arithmetic operation performance. On the other hand, in communication between chips or boards, while the speed of the arithmetic operation performance is increasing, communication with an electric signal is reaching a limit from a problem of a physical distance.

A large-scale optical communication device on a silicon substrate which is based on a low-loss and small-sized silicon narrow line waveguide, namely, a silicon photonics, is expected as a technology for solving the problem of insufficiency of the communication capacity of such an information processing apparatus whose operation speed is increasing as described above.

The silicon photonics is configured from an optical functional device such as a silicon-based optical waveguide, light emitting device, light receiving device, optical modulator, optical branching unit and optical demultiplexer.

For example, as an optical modulator in the silicon photonics, it is expected that a ring optical modulator of a very small size of, for example, several 10 μm$^2$ to 100 μm$^2$ and a low capacity is promising from a point of view of power consumption and a high-speed responsibility.

SUMMARY

According to an aspect of the embodiment, an optical resonator apparatus includes an optical resonator unit that includes a plurality of ring optical resonators each including a first optical waveguide, a second optical waveguide, a ring optical waveguide optically coupled between the first optical waveguide and the second optical waveguide, and a resonance wavelength adjustment electrode provided on the ring optical waveguide for adjusting a resonance wavelength, the plurality of ring optical resonators being coupled in cascade connection with each other, the ring optical waveguides of the plurality of ring optical resonators having round-trip lengths that are different from each other and vary in order from a light input side to a light output side, and a controller that performs resonance wavelength adjustment control for adjusting a resonance wavelength of each of the plurality of ring optical resonators in order beginning with the ring optical resonator provided at the most light input side from among the plurality of ring optical resonators so as to match with an input light wavelength of each of a plurality of input lights having wavelengths that are different from each other and performs, when it is decided that an inter-channel occurs, re-resonance wavelength adjustment control for adjusting the resonance wavelength of the first ring optical resonator from the light input side from among the plurality of ring optical resonators so as to match with a second-matching input light wavelength and adjusting the resonance wavelengths of the second and succeeding ring optical resonators from the light input side to the first-matching input light wavelength thereby to adjust the resonance wavelength of each of the plurality of ring optical resonators so as to match with the input light wavelength of each of the plurality of input lights having wavelengths that are different from each other in order beginning with the ring optical resonator provided at the most light input side from among the plurality of ring optical resonators.

According to another aspect of the embodiment, an optical transmitter includes a light source that outputs lights having wavelengths different from each other, an optical multiplexing unit coupled with the light source, an optical resonator unit that is coupled with the optical multiplexing unit and includes a plurality of ring optical resonators each including a first optical waveguide, a second optical waveguide, a ring optical waveguide optically coupled between the first optical waveguide and the second optical waveguide, and a resonance wavelength adjustment electrode provided on the ring optical waveguide for adjusting a resonance wavelength, the plurality of ring optical resonators being coupled in cascade connection with each other, the ring optical waveguides of the plurality of ring optical resonators having round-trip lengths that are different from each other and vary in order from a light input side to a light output side, and a controller that performs resonance wavelength adjustment control for adjusting a resonance wavelength of each of the plurality of ring optical resonators in order beginning with the ring optical resonator provided at the most light input side from among the plurality of ring optical resonators to an input light wavelength of a corresponding one of input light components having a plurality of wavelengths different from each other and performs, when it is decided that an inter-channel occurs, re-resonance wavelength adjustment control for adjusting the resonance wavelength of the first ring optical resonator from the light input side from among the plurality of ring optical resonators so as to match with a second-matching input light wavelength and adjusting the resonance wavelengths of the second and succeeding ring optical resonators from the light input side to the first-matching input light wavelength thereby to adjust the resonance wavelengths of the plurality of ring optical resonators so as to match with the input light wavelength each of the plurality of input lights having wavelengths that are different from each other in order beginning with the ring optical resonator provided at the most light input side from among the plurality of ring optical resonators.

According to further aspect of the embodiment, a controlling method for an optical resonator includes performing, by a controller, resonance wavelength adjustment control for adjusting a resonance wavelength of each of a plurality of ring optical resonators provided in an optical resonator and each including a first optical waveguide, a second optical waveguide, a ring optical waveguide optically coupled between the first optical waveguide and the second optical waveguide, and a resonance wavelength adjustment electrode provided on the ring optical waveguide for adjusting a resonance wavelength, the plurality of ring optical resonators being coupled in cascade connection with each other, the ring optical waveguides of the plurality of ring optical resonators having round-trip lengths that are different from each other and vary in order from a light input side to a light output side, the resonance wavelength adjustment control adjusting the resonance wavelength of each of the plurality of ring optical resonators in order beginning with the ring optical resonator provided at the most light input side from among the plurality of ring optical resonators so as to match with an input light wavelength of each of a plurality of input lights having wavelengths that are different from each other, and performing, by the controller, when it is decided that an inter-channel occurs, re-resonance wavelength adjustment control for adjusting the resonance wavelength of the first ring optical resonator from the light input side from among the plurality of ring optical resonators so as to match with a second-matching input light wavelength and adjusting the resonance wavelengths of the second and succeeding ring optical resonators from the light input side to the first-matching input light wavelength thereby to adjust the resonance wavelength of each of the plurality of ring optical resonators so as to match with the input light wavelength of each of the plurality of input lights having wavelengths that are different from each other in order beginning with the ring optical resonator provided at the most light input side from among the plurality of ring optical resonators.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 3A and 3B are schematic views illustrating a configuration of the optical resonance unit (optical modulation unit) provided in the optical resonator apparatus (optical modulation apparatus) and the optical transmitter according to the first embodiment, and wherein FIG. 3A is a top plan view and FIG. 3B is a sectional view taken along line A-A' of FIG. 3A;

FIGS. 5A and 5B are schematic views illustrating operation of the one ring optical modulator that does not have a heater;

FIGS. 11A to 11D are views illustrating resonance wavelength adjustment control (resonance spectrum adjustment) where two input lights having wavelengths that are different from each other are inputted to two ring optical resonators (ring optical modulators), and wherein FIG. 11A depicts a view depicting a configuration of the ring optical resonators (ring optical modulators), FIG. 11B depicts a spectrum at a point A of FIG. 11A, FIG. 11C depicts a spectrum at a point B of FIG. 11A, and FIG. 11D depicts a relationship between input light wavelengths and resonance wavelengths of ring optical resonators and illustrates a state before the resonance wavelength adjustment control is performed;

FIGS. 12A to 12D are views illustrating the resonance wavelength adjustment control (resonance spectrum adjustment) where two input lights having wavelengths that are different from each other are inputted to two ring optical resonators (ring optical modulators), and wherein FIG. 12A depicts a view depicting a configuration of the ring optical resonators (ring optical modulators), FIG. 12B depicts a spectrum at a point A of FIG. 12A, FIG. 12C depicts a spectrum at a point B of FIG. 12A, and FIG. 12D depicts a relationship between input light wavelengths and resonance wavelengths of ring optical resonators and illustrates a state after the resonance wavelength adjustment control is performed for a ring optical resonator provided at the first position from the light input side;

FIGS. 13A to 13D are views illustrating the resonance wavelength adjustment control (resonance spectrum adjustment) where two input lights having wavelengths that are different from each other are inputted to two ring optical resonators (ring optical modulators), and wherein FIG. 13A depicts a view depicting a configuration of the ring optical resonators (ring optical modulators), FIG. 13B depicts a spectrum at a point A of FIG. 13A, FIG. 13C depicts a spectrum at a point B of FIG. 13A, and FIG. 13D depicts a relationship between input light wavelengths and resonance wavelengths of ring optical resonator and illustrates a state after the resonance wavelength adjustment control is performed for ring optical resonators provided at the first and second positions from the light input side;

FIGS. 24A and 24B are schematic views illustrating a configuration of an optical resonance unit (optical modulation unit) provided in the optical resonator apparatus (optical modulation apparatus) and the optical transmitter according to the third embodiment, and wherein FIG. 24A is a top plan view and FIG. 24B is a sectional view taken along line B-B' of FIG. 24A;

DESCRIPTION OF EMBODIMENTS

Figure 1:
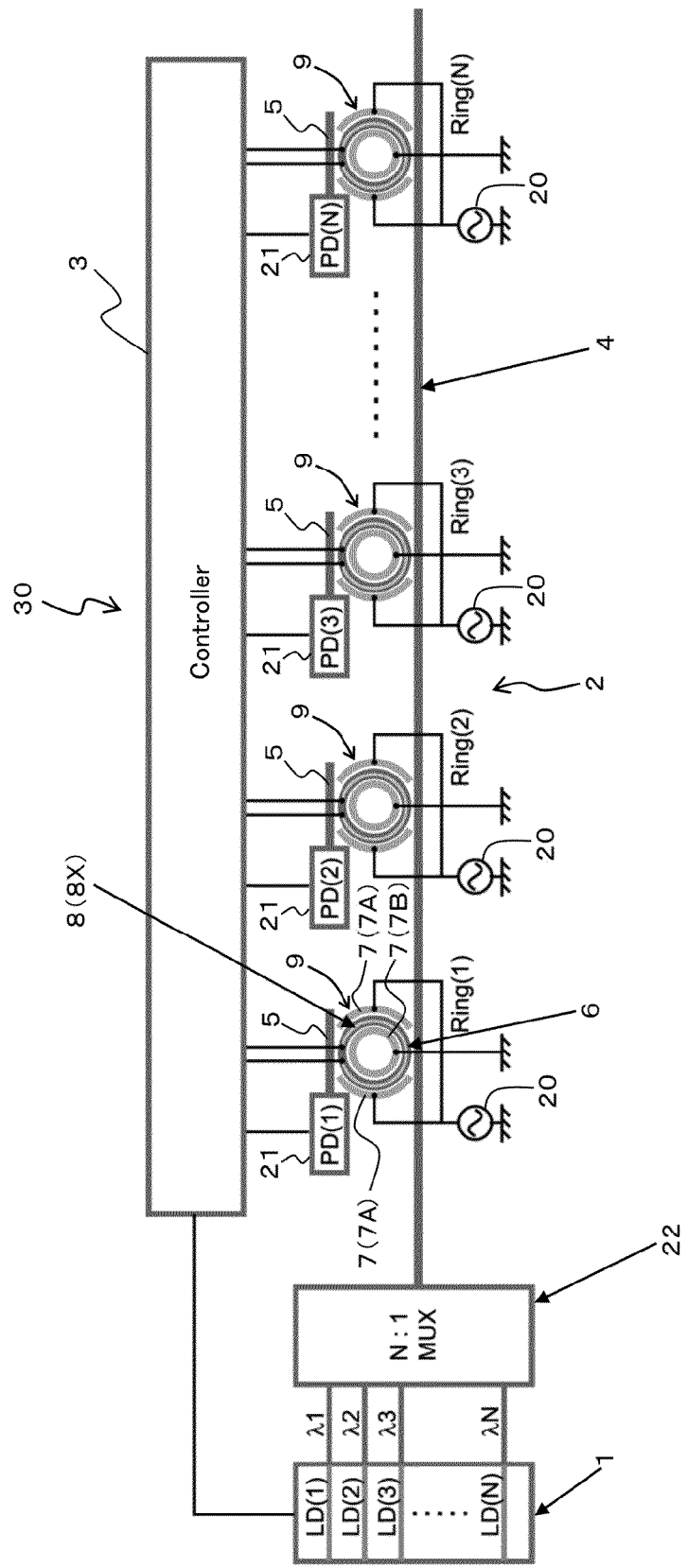
FIG. 1 is a schematic view depicting a configuration of an optical resonator apparatus (optical modulation apparatus) and an optical transmitter according to a first embodiment.

Incidentally, since the operating wavelength band of a ring optical modulator that is an optical modulator in which a ring optical resonator is used and uses a silicon waveguide core layer is very narrow, it is very difficult to adjust the resonance wavelength of the ring optical modulator upon fabrication so as to match with a wavelength of input light.

For example, the resonance wavelength of the ring optical modulator is determined by an optical circumferential length (round-trip length) of the ring optical waveguide configuring the ring optical modulator. However, an equivalent refractive index is dispersed by a deviation between wafers, a deviation between lots and so forth in thickness of a silicon waveguide core layer of an optical waveguide, and as a result, the resonance wavelength of the ring optical modulator is displaced by at least approximately ±10 nm between wafers or between lots.

As regards such displacement of the resonance wavelength of the ring optical modulator as described above, a method is available by which the resonance wavelength of the ring optical modulator is adjusted by heating by a heater or by carrier injection.

However, where the resonance wavelength of the ring optical modulator is adjusted by heating by a heater, the resonance wavelength of the ring optical modulator can be shifted only to a long wavelength side. On the other hand, where the resonance wavelength of the ring optical modulator is adjusted by carrier injection, the resonance wavelength of the ring optical modulator can be shifted only to a short wavelength side.

Therefore, a wavelength adjustment amount necessary for adjusting the resonance wavelength of the ring optical modulator to the wavelength of input light is equal to an amount corresponding to a free spectral range (FSR) of the ring optical modulator at maximum.

Here, in order to decrease the FSR, the radius of the ring optical waveguide configuring the ring optical modulator may be decreased. On the other hand, in order to obtain advantages of downsizing, high speed operation and low power consumption of the ring optical modulator, it is desired to decrease the radius of the ring optical waveguide configuring the ring optical modulator.

If the radius of the ring optical waveguide configuring the ring optical modulator is decreased so as to achieve advantages of downsizing, high speed operation and low power consumption of the ring optical modulator, then the FSR increases and the wavelength adjustment amount necessary for adjusting the resonance wavelength of the ring optical modulator to the wavelength of input light increases.

If the wavelength adjustment amount necessary for adjusting the resonance wavelength of the ring optical modulator to the wavelength of input light is great in this manner, then, in both of the cases of heating by a heater and carrier injection, the current amount to be supplied to an electrode used for adjustment of the resonance wavelength, namely, the current amount necessary for adjusting the resonance wavelength of the ring optical modulator to the wavelength of input light, becomes great. Therefore, if the wavelength adjustment amount necessary for adjusting the resonance wavelength of the ring optical modulator to the wavelength of input light is great, then power consumption necessary for adjusting the resonance wavelength of the ring optical modulator to the wavelength of input light becomes great.

In this case, it seems recommendable to input input light having a plurality of wavelengths different from each other to a plurality of ring optical modulators coupled in cascade connection and adjust the resonance wavelength of each of the plurality of ring optical modulators to a wavelength of input light having the most proximate wavelength thereby to decrease the current amount (power consumption) necessary for adjusting the resonance wavelength of the ring optical modulator to the wavelength of input light.

However, a spectrum of a plurality of input lights of wavelengths different from each other, namely, wavelengths of the input lights, and a spectrum of resonance wavelengths of the plurality of ring optical modulators, namely, the resonance wavelengths of the plurality of ring optical modulators, may not necessarily have an ideal relationship. In particular, although ideally the resonance wavelengths of the plurality of ring optical modulators are placed one by one between the plurality of input lights of wavelength that are different from each other, the input lights and the resonance wavelengths may not necessarily have such an ideal relationship as just described. Therefore, there is a case wherein resonance wavelengths of two ring optical modulators are placed between an input light having one wavelength and another input light having a different wavelength, namely, a case wherein a phenomenon of so-called inter-channel occurs. In this case, if resonance wavelength adjustment control for adjusting the resonance wavelength of a ring optical modulator to the long wavelength side or the short wavelength side so as to cause the resonance wavelength to match with an input light wavelength is performed in order beginning with the ring optical modulator provided at the most light input side, then the current amount necessary for the resonance wavelength adjustment control for the ring optical modulator for which the resonance wavelength adjustment control has been performed last, namely, necessary power consumption, increases exceeding that of any other ring optical modulator.

It is to be noted here that, while such a problem as described above is described as a subject of a ring optical modulator for which a silicon waveguide core layer is used, also a ring optical modulator in which some other semiconductor material such as, for example, silicon germanium, InP, GaAs, mixed crystal of silicon germanium, InP or GaAs is used has a similar subject. Further, while such a problem as described above is described as a subject of a ring optical modulator, also a ring optical resonator provided in an optical resonator apparatus including, for example, an optical demultiplexing apparatus has a similar subject.

Therefore, it is desirable to moderate such a situation that, when a plurality of input lights having wavelengths that are different from each other are inputted to a plurality of ring optical modulators coupled in cascade connection to decrease the required current amount, the current amount necessary for resonance wavelength adjustment control for a ring optical resonator for which the resonance wavelength adjustment control has been performed last exceeds that of any other ring optical resonator.

In the following, an optical resonator apparatus, an optical transmitter and a controlling method for an optical resonator according to embodiments of the present technology are described with reference to the drawings.

First Embodiment

First, an optical resonator apparatus, an optical transmitter and a controlling method for an optical resonator according to a first embodiment are described with reference to FIGS. 1 to 20.

In the present embodiment, an optical resonator apparatus, an optical transmitter including the optical resonator apparatus and a controlling method for an optical resonator are described taking, as an example, an optical modulation apparatus, an optical transmitter including the optical modulation apparatus and a controlling method for an optical modulator, respectively.

As depicted in FIG. 1, the optical transmitter according to the present embodiment includes a light source 1, an optical multiplexing unit 22, an optical modulation unit (optical resonance unit) 2 and a controller 3. The optical modulation apparatus (optical resonator apparatus) according to the present embodiment is configured from the optical modulation unit 2 and the controller 3. It is to be noted that, while the present embodiment is described taking, as an example, a case in which the optical transmitter is configured including the light source 1 and the optical multiplexing unit 22, the optical modulation apparatus may be configured without including the light source 1 and the optical multiplexing unit 22. In this case, a light source and an optical multiplexing unit provided separately may be coupled to the optical modulation apparatus.

Here, the light source 1 is a light source that outputs lights having wavelengths that are different from each other. Here, the light source 1 is a laser array light source that includes a plurality of laser light sources such as, for example, distributed feedback (DFB) lasers or distributed Bragg reflector (DBR) lasers and in which the laser light sources output laser lights having wavelengths that are different from each other. It is to be noted that the lasers included in the laser array light source 1 are denoted by LD(1), LD(2), LD(3), . . . and LD(N), and the wavelengths of the laser lights outputted from the laser light sources are denoted by $\lambda 1, \lambda 2, \lambda 3, \ldots$ and $\lambda N$, and the wavelength interval between the wavelengths is represented by as $\Delta\lambda$.

The optical multiplexing unit 22 is coupled to the light source 1 and multiplexes lights outputted from the light source 1 and having wavelengths that are different from each other. Here, the optical multiplexing unit 22 is an optical multiplexer (Mux) that multiplexes the laser lights outputted from the laser array light source 1 and having the wavelengths $\lambda 1$ to $\lambda N$ that are different from each other. As the optical multiplexer 22, for example, a delayed Mach-Zehnder interferometer (DMZI) or an arrayed waveguide grating (AWG) is used.

The optical modulation unit 2 is coupled to the optical multiplexing unit 22 and receives input light obtained by multiplexing a plurality of lights having wavelengths that are different from each other and outputted from the optical multiplexing unit 22. Here, CW (Continuous Wave)-WDM (Wavelength Division Multiplexed) input light obtained by multiplexing and wavelength division multiplexing the laser lights (continuous light) outputted from the laser array light source 1 and having the wavelengths $\lambda 1$ to $\lambda N$ that are different from each other is inputted to the optical modulation unit 2. It is to be noted that WDM input light is referred to also as WDM signal light.

Here, as depicted in FIG. 1, the optical modulation unit 2 includes a plurality of ring optical modulators (ring optical resonators) 9, each of which includes a first optical waveguide 4, a second optical waveguide 5, a ring optical waveguide 6 optically coupled between the first optical waveguide 4 and the second optical waveguide 5, a modulation electrode 7 that is provided on the ring optical waveguide 6 and to which a modulation electric signal (modulation signal) is supplied, and a resonance wavelength adjustment electrode 8 provided on the ring optical waveguide 6 for adjusting a resonance wavelength. Here, the number of ring optical modulators 9 is equal to the number of input lights having a plurality of wavelengths that are different from each other, namely, a number corresponding to the number of wavelengths of WDM input light. In particular, where the number of input light having a plurality of wavelengths that are different from each other, namely, the number of wavelengths of WDM input light, is N, N ring optical modulators are provided. In this case, the plurality of ring optical modulators 9 are denoted by Ring(1), Ring(2), Ring(3), . . . and Ring(N). A modulation signal source 20 is connected to the modulation electrode 7 of each ring optical modulator 9. Further, a heater power supply not depicted is connected to the resonance wavelength adjustment electrode 8 of each ring optical modulator 9.

Figure 2:
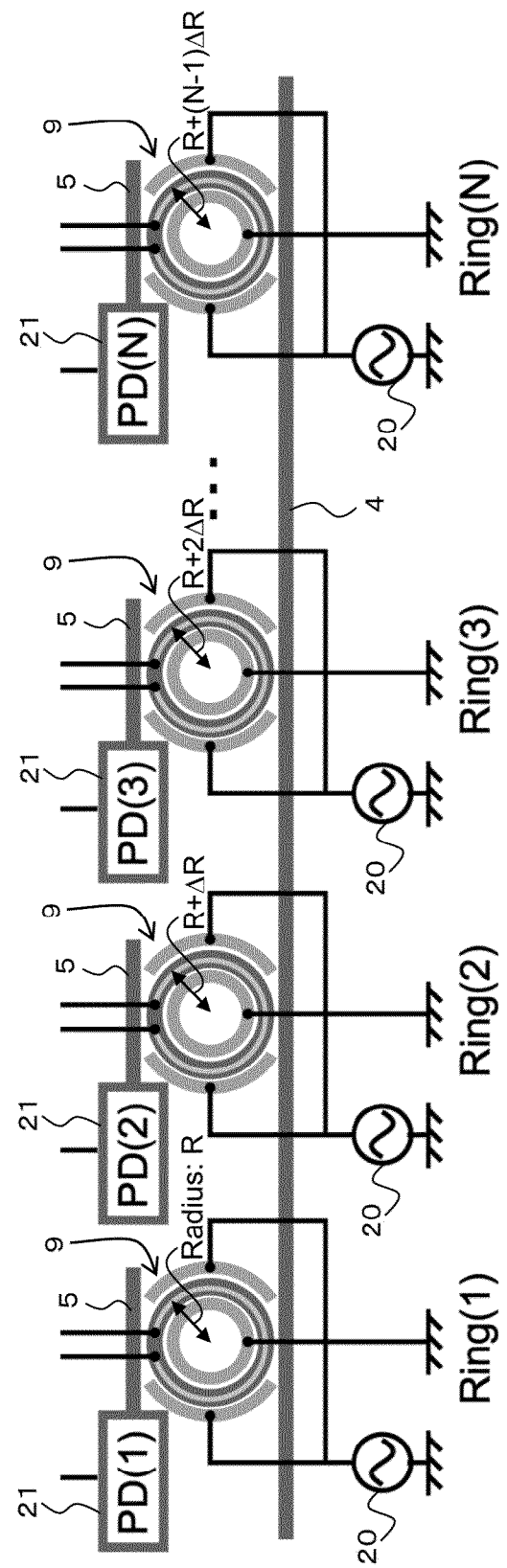
FIG. 2 is a schematic view illustrating a configuration of an optical resonance unit (optical modulation unit) provided in the optical resonator apparatus (optical modulation apparatus) according to the first embodiment.

Further, the plurality of ring optical modulators 9 are optically coupled in cascade connection to the first optical waveguide 4. Further, the ring optical waveguides 6 of the plurality of ring optical modulators 9 have round-trip lengths (circumferential lengths) that are different from each other, and the round-trip lengths increase in order from the light input side to the light output side (namely, the round-trip lengths vary in order from the light input side to the light output side). In particular, the first optical waveguides 4 that configure the plurality of ring optical modulators 9 are coupled to each other to configure one first optical waveguide, and a plurality of ring optical waveguides 6 having round-trip lengths that are different from each other are provided in series along the first optical waveguide 4 such that the round-trip lengths increase in order from the light input side to the light output side and the modulation electrode 7 and the resonance wavelength adjustment electrode 8 are provided on each ring optical waveguide 6. In this manner, the round-trip length of each of the ring optical waveguides 6 of the ring optical modulators 9 is smaller toward the light input side but is greater toward the light output side. Since each of the ring optical waveguides 6 of the ring optical modulators 9 here has a circular ring shape, the ring optical waveguides 6 have the ring radii different from each other and the ring radii increase in order from the light input side to the light output side. In particular, the ring radii of the ring optical waveguides 6 of the ring optical modulators 9 are smaller toward the light input side but are greater toward the light output side. It is to be noted that the light input side is also a light input side of the first optical waveguide 4 (bus optical waveguide), and the light output side is also a light output side of the first optical waveguide 4 (bus optical waveguide).

Where the ring optical waveguides 6 of the ring optical modulators 9 have round-trip lengths that are different from each other and increase in order from the light input side to the light output side, in this manner, the resonance wavelengths of the ring optical modulators 9 are different from each other and become longer in order from the light input side to the light output side. In particular, in a state in which a modulation electric signal is not supplied to the modulation electrode 7 and besides current is not supplied to the resonance wavelength adjustment electrode 8, the resonance wavelengths of the ring optical modulators 9 are different from each other and become longer in order from the light input side to the light output side. It is to be noted that the orders of resonance are equal to each other. Here, the round-trip lengths (ring radii) of the ring optical waveguides 6 of the ring optical modulators 9 are set so as to be different from each other such that the resonance wavelength interval between the plurality of ring optical modulators 9 is substantially equal to the wavelength interval between the plurality of input lights having wavelengths that are different from each other and outputted from the laser array light source 1. The ring optical modulator 9 having the ring optical waveguide 6 whose round-trip length is smallest (whose ring radius is smallest) is positioned at the position at the most light input side, and the ring optical modulators 9 having the ring optical waveguides 6 whose round-trip lengths are greater (whose ring radii are greater) are disposed in order toward the light output side. For example, if the equivalent refractive index of the optical waveguide is approximately 3.392 in the 1550 nm band, then if the ring radius of the first ring optical modulator Ring(1) from the light input side is set to R (here, approximately 8.0 µm) and the ring radii of the second to Nth ring optical modulators Ring(2) to Ring(N) are set so as to increase by $\Delta R$ (here, approximately 0.0165 µm) in this manner like R+$\Delta R$ (here, approximately 8.0165 µm), R+2$\Delta R$ (here, approximately 8.0330 µm), . . . and R+(N−1) $\Delta R$ as depicted in FIG. 2, then the resonance wavelength of each ring optical modulator 9 at a certain order shifts to the long wavelength side by approximately 3.2 nm. It is to be noted that, although it is difficult to produce an absolute value of the resonance wavelength of each ring optical modulator 9 in a certain order with high accuracy, a relative resonance wavelength difference between the ring optical modulators adjacent to each other can be produced with an accuracy of a deviation $\alpha_{ring}$ of the resonance wavelength interval=approximately 0.1 nm to approximately 0.5 nm. Further, as hereinafter described, each of the ring optical modulator 9 has a small heater mechanism and the resonance wavelength of each ring optical modulator 9 can be adjusted individually.

It is to be noted that the plurality of ring optical modulators 9 coupled in cascade connection are referred to also as ring optical modulator group. Further, the light source 1 side of the first optical waveguide 4, the opposite side to the light source 1 and the photodetector 21 side of the second optical waveguide 5 are referred to as input port, through port and drop port, respectively. Further, the first optical waveguide 4 is referred to also as bus optical waveguide. Further, the second optical waveguide 5 is referred to also as drop port optical waveguide or monitor optical waveguide.

Figures 3A, 3B:
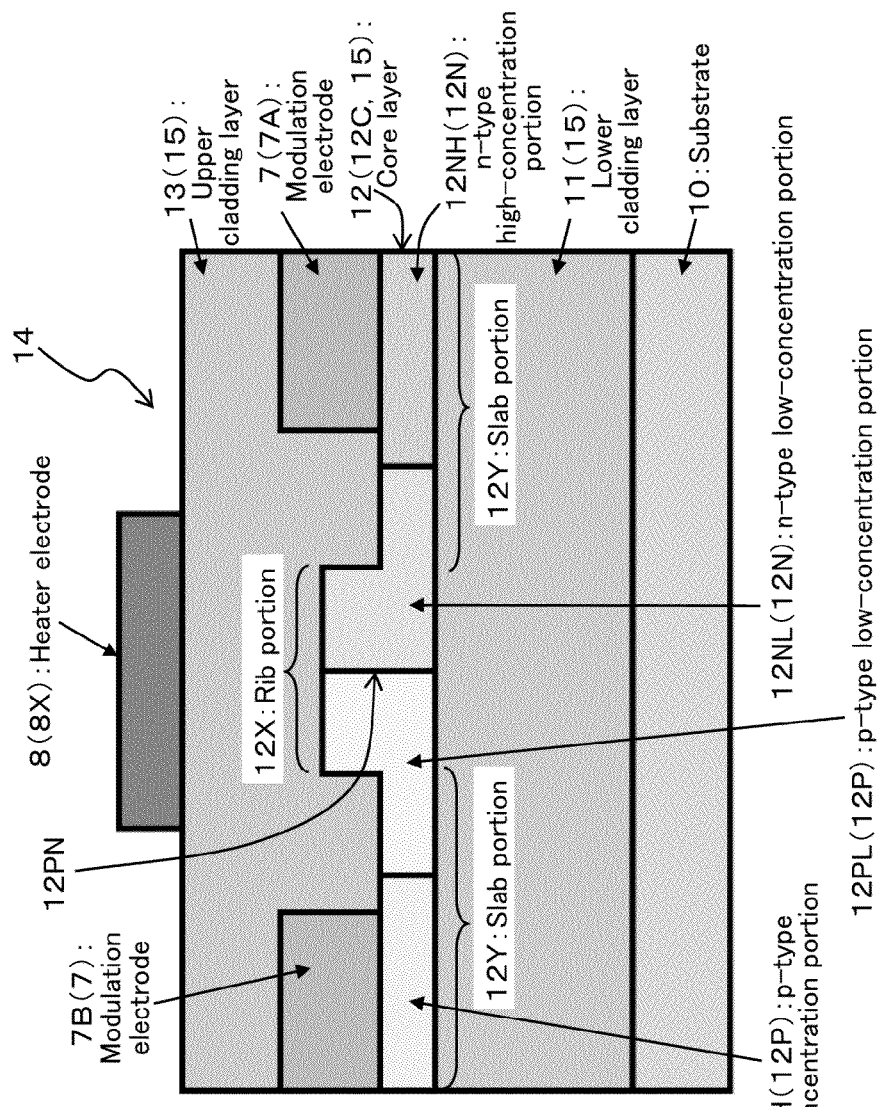

In the present embodiment, as depicted in FIGS. 3A and 3B, the optical modulation unit 2 is configured as an optical modulation device (optical semiconductor device; optical device) structured such that a lower cladding layer 11, a core layer 12 and an upper cladding layer 13 are stacked on a substrate 10. The laser array light source 1 is integrated on the substrate 10 on which the optical modulation device 14 is formed. It is to be noted that this is referred to also as optical integrated device. Here, the laser array light source 1 is optically coupled to the first optical waveguide 4 using, for example, coupling by flip-flop bonding or evanescent coupling utilizing a wafer bonding technology.

In particular, the optical modulation unit 2 is configured as a silicon optical modulation device 14 formed on the silicon substrate 10.

The silicon optical modulation device 14 as the optical modulation unit 2 includes a silicon optical waveguide 15 configured from the $SiO_2$ lower cladding layer 11, silicon core layer 12, $SiO_2$ upper cladding layer 13 and provided on the silicon substrate 10. For example, silicon that configures the substrate 10 or the core layer 12 is crystal silicon.

By patterning the silicon core layer 12 in a linear form or a ring form, a linear waveguide core layer 12A, another linear waveguide core layer 12B and ring waveguide core layers 12C are formed as waveguide core layers for the first optical waveguide 4, second optical waveguide 5 and ring optical waveguide 6 optically coupled to each other. It is to be noted that the first optical waveguide 4 is referred to also as first silicon optical waveguide including the linear silicon waveguide core layer 12A. The second optical waveguide 5 is referred to also as second silicon optical waveguide including the linear silicon waveguide core layer 12B. Further, the ring optical waveguide 6 is referred to also as silicon ring optical waveguide including the ring silicon waveguide core layer 12C.

Here, the ring waveguide core layer 12C (ring silicon core layer) configuring each ring optical waveguide 6 has a rib waveguide structure (rib waveguide shape) having a rib portion 12X and a slab portion 12Y.

Further, one side of each ring waveguide core layer 12C in the widthwise direction (right side in FIG. 3B) is formed as an n-type doped region 12N doped in the n type, and the other side of each ring waveguide core layer 12C (left side in FIG. 3B) is formed as a p-type doped region 12P doped in the p type. The n-type doped region 12N and the p-type doped region 12P are joined together at a central position in the widthwise direction or in the proximity of the central position to form a pn junction portion 12PN. The structure just described is referred to also as lateral pn structure. It is to be noted that, where the ring waveguide core layer 12C having such a configuration as described above is used, a ring optical modulator for which carrier density variation upon reverse biasing is utilized is implemented.

Here, from within the n-type doped region 12N of each ring waveguide core layer 12C, the rib portion 12X and a region in the proximity of the rib portion 12X are a low-concentration doped region 12NL in which n-type impurity is doped with a low concentration, and the remaining region, namely, one outside region of the slab portion 12Y, is a high-concentration doped region 12NH in which n-type impurity is doped with a higher concentration than that of the low-concentration doped region 12NL. Further, from within the p-type doped region 12P of each ring waveguide core layer 12C, the rib portion 12X and a region in the proximity of the rib portion 12X are a low-concentration doped region 12PL in which p-type impurity is doped with a low concentration, and the remaining region, namely, the other outside region of the slab portion 12Y, is a high-concentration doped region 12PH in which p-type impurity is doped with a higher concentration than that of the low-concentration doped region 12PL.

An n-side electrode 7A configuring the modulation electrode 7 is provided along the rib portion 12X on the high-concentration doped region 12NH of the n-type doped region 12N of each ring waveguide core layer 12C, namely, on the one outside region of the slab portion 12Y. Further, a p-side electrode 7B configuring the modulation electrode 7 is provided along the rib portion 12X on the high-concentration doped region 12PH of the p-type doped region 12P of each ring waveguide core layer 12C, namely, on the other outside region of the slab portion 12Y. In particular, the n-side electrode 7A and the p-side electrode 7B that configure the modulation electrode 7 are provided along the rib portion 12X on the opposite sides (outer sides and inner sides) across the rib portion 12X of the ring waveguide core layer 12C. Here, the p-side electrode 7B is provided in a ring shape over the overall circumference on the inner side of the ring-shaped rib portion 12X configuring the ring waveguide core layer 12C, and the n-side electrode 7A is provided partially at the outer side of the ring-shaped rib portion 12X.

By applying a modulation electric signal to the modulation electrode 7 provided on the ring waveguide core layer 12C configuring each ring optical waveguide 6 in this manner, intensity modulation of inputted light having a wavelength (laser light; input light; continuous light), namely, intensity modulation by the ring optical modulator 9, can be performed. Therefore, the modulation electrode 7 is referred to also as intensity modulation electrode.

Further, a heater electrode 8X as the resonance wavelength adjustment electrode 8 is provided over each ring waveguide core layer 12C. In particular, the heater electrode 8X for heating the ring optical waveguide 6, namely, the ring waveguide core layer 12C, is provided along the rib portion 12X, namely, over the substantially overall circumference of the ring-shaped rib portion 12X on the upper cladding layer 13 over the rib portion 12X of the ring waveguide core layer 12C. The heater electrode 8X is configured from a resister (for example, of a metal), and, if current is supplied to the heater electrode 8X, then the heater electrode 8X generates heat. Therefore, by supplying current to the heater electrode 8X, the ring optical waveguide 6, namely, the ring waveguide core layer 12C, is heated so that the refractive index thereof can be varied. Consequently, the resonance wavelength of the ring optical modulator 9 can be adjusted. Here, if current is supplied to the heater electrode 8X, then the ring optical waveguide 6, namely, the ring waveguide core layer 12C, is heated so that the refractive index thereof varies and the resonance wavelength of the ring optical modulator 9 shifts to the long wavelength side. It is to be noted that the heater electrode 8X is referred to also as micro heater or small heater mechanism.

Here, as depicted in FIGS. 1 and 2, the ring waveguide core layers 12C configuring the ring optical waveguides 6 of the plurality of (here, N) ring optical modulators 9 have round-trip lengths (circumferential lengths) different from each other, and the round-trip lengths increase in order from the light input side toward the light output side. Further, the ring waveguide core layers 12C are disposed in series in a juxtaposed relationship along the linear waveguide core layer 12A configuring the first optical waveguide 4 such that they are optically coupled to and between the linear waveguide core layer 12A configuring the first optical waveguide 4 and the linear waveguide core layer 12B configuring the second optical waveguide 5.

In the present embodiment, in each of the ring optical modulators 9, the photodetector (PD) 21 is coupled to the second optical waveguide 5 provided at the side opposed to the first optical waveguide 4 across the ring optical waveguide 6. In particular, the photodetector 21 that detects output power (power; light intensity; light intensity information) of light inputted to the second optical waveguide 5 is coupled to the second optical waveguide 5. Here, the number of photodetectors 21 is equal to the number of input lights having a plurality of wavelengths that are different from each other, namely, the number corresponding to the number of wavelengths of WDM input light. In particular, where the number of input lights having the plurality of wavelengths different from each other, namely, the number of wavelengths of WDM input light, is N, N photodetectors are provided. It is to be noted that the PDs coupled to the ring optical modulators Ring(1), Ring (2), Ring(3), . . . and Ring(N) are denoted by PD(1), PD(2), PD(3), . . . and PD(N). As hereinafter described, the controller 3 performs resonance wavelength adjustment control for the ring optical modulators 9 based on information detected by the photodetectors 21. In particular, a PD 21 is coupled to each of the ring optical modulators 9, and it can be detected by the PD 21 what transmission characteristic each of the ring optical modulators 9 has with respect to input light (laser light). Therefore, the PDs 21 are electrically connected to the controller 3 such that information (monitor information) detected by the PDs 21 is transmitted to the controller 3 so that the controller 3 can perform the resonance wavelength adjustment control for the ring optical resonators 9 based on the information detected by the PDs 21. Here, for the PD 21, for example, a pin type PD having an InGaAs absorption layer or a Ge absorption layer may be used. In this case, if light is inputted to each PD 21, then photocurrent corresponding to the intensity of the inputted light is generated. The PDs 21 may be integrated on the silicon substrate 10 on which the silicon optical modulation device 14 is formed. In this case, the optical modulation unit 2 includes the PDs 21. It is to be noted that the PDs 21 may not be integrated on the silicon substrate 10 on which the silicon optical modulation device 14 is formed but may be coupled to the optical modulation unit 2 (here, the second optical waveguide 5). It is to be noted that the photodetector 21 is referred to also as light receiver.

The controller 3 performs the resonance wavelength adjustment control and modulation driving control. In the present embodiment, the controller 3 performs control for a heater power supply (or a heater driving circuit including the heater power supply) in order to perform the resonance wavelength adjustment control, and performs control for the modulation signal source 20 (or a driver circuit including the modulation signal source 20) in order to perform the modulation driving control. Further, the controller 3 performs control also for the laser array light source 1. Here, the controller 3 performs control for changing over the heater power supply (or the heater driving circuit including the heater power supply) between ON and OFF, control for supplying power, control for changing over the lasers included in the laser array light source 1 between ON and OFF, and manages light intensity information (photocurrent outputted from the PDs 21) from the photodetectors 21. The controller 3 is, for example, a computer (controller; controlling circuit) including a CPU, a memory, a storage device and so forth. It is to be noted that monitor values outputted in response to the intensities of light inputted to the PDs (1) to (N) and to be inputted to the controller 3 are represented as $P_{mon}(1)$ to $P_{mon}(N)$.

Here, the controller 3 performs the resonance wavelength adjustment control for adjusting the resonance wavelengths of the plurality of ring optical modulators 9 (here, to the long wavelength side) so as to match with input light wavelengths of the plurality of input lights having wavelengths that are different from each other in order beginning with the ring optical modulator Ring(1) provided at the most light input side from among the plurality of ring optical modulators 9. Then, if it is decided that an inter-channel occurs, then the resonance wavelength of the first ring optical modulator Ring(1) from the light input side from among the plurality of ring optical modulators 9 is adjusted (here, to the long wavelength side) so as to match with a second-matching input light wavelength, and the resonance wavelengths of the second and succeeding ring optical modulators Ring(2) to Ring(N) from the light input side are adjusted (here, to the long wavelength side) so as to match with a first-matching input light wavelength. Consequently, the controller 3 performs re-resonance wavelength adjustment control for adjusting the resonance wavelengths of the plurality of ring optical modulators 9 (here, to the long wavelength side) so as to match with the plurality of input lights having wavelengths that are different from each other in order beginning with the ring optical modulator Ring(1) provided at the most light input side from among the plurality of ring optical modulators 9.

In the present embodiment, the controller 3 decides that an inter-channel occurs when the current amount required for the resonance wavelength adjustment control for the ring optical modulator Ring(N) for which the resonance wavelength adjustment control has been performed last in the resonance wavelength adjustment control is equal to or higher than a certain current amount.

Here, the controller 3 performs the resonance wavelength adjustment control as described just below. In particular, the controller 3 drives the laser array light source 1 to input WDM input light obtained by multiplexing a plurality of laser lights having wavelengths that are different from each other to the first optical waveguides 4 of the optical modulation unit 2, and performs control for the heater power supply (or the heater driving circuit including the heater power supply) in order beginning with the ring optical modulator Ring(1) provided at the most light input side while monitoring the value of each PD 21 so that the resonance wavelengths of the ring optical modulators 9 are adjusted to the long wavelength side so as to match with the wavelengths of the laser lights. Then, the controller 3 acquires a current amount required for the resonance wavelength adjustment control of the ring optical modulator Ring(N) for which the resonance wavelength adjustment control has been performed last in the resonance wavelength adjustment control described above. Here, power consumption is further acquired based on the acquired current amount. Further, the controller 3 decides whether or not the power consumption (current amount) is lower than certain power consumption (certain current amount), and decides that an inter-channel occurs if it is decided that the acquired current amount is equal to or higher than certain power consumption (certain current amount). Further, when it is decided that an inter-channel occurs, the re-resonance wavelength adjustment control is performed as described just below. In particular, the resonance wavelength of the first ring optical modulator Ring(1) from the light input side is adjusted to the long wavelength side so as to match with a second-matching input light wavelength and the resonance wavelengths of the second to succeeding ring optical modulators Ring(2) to Ring(N) from the light input side are adjusted to the long wavelength side so as to match with a first-matching input light wavelength. Then, the resonance wavelengths of the ring optical modulators Ring(1) to Ring(N) are adjusted to the long wavelength side in order beginning with the ring optical modulator Ring(1) provided at the most light input side so as to match with the wavelengths of the laser lights. Such control as described above is performed, for example, every time the optical transmitter 30 is started up (power supply is switched on). It is to be noted here that, while it is decided using power consumption whether or not an inter-channel occurs, the decision method is not limited to this, and it may be decided using a current amount whether or not an inter-channel occurs. It is to be noted that control powers (power consumption required for the resonance wavelength adjustment control; power values) required for maximization of the monitor values $P_{mon}(1)$ to $P_{mon}(N)$ of the photodetectors PD(1) to PD(N) are denoted by $P_{tune}(1)$ to $P_{tune}(N)$.

Further, the controller 3 performs the modulation driving control for supplying a modulation electric signal to the modulation electrode 7 of each ring optical modulator 9. In particular, after the resonance wavelength adjustment control and the re-resonance wavelength adjustment control are performed, the controller 3 performs control for the modulation signal source 20 (or the driver circuit including the modulation signal source 20) and performs the modulation driving control for supplying a modulation electric signal to the modulation electrode 7 of each ring optical modulator 9. By the modulation driving control by the controller 3, a modulation electric signal is supplied from the modulation signal source 20 to the modulation electrode 7 of the ring optical modulator 9. In the modulation driving control, the transmission spectrum of the ring optical modulator 9 is varied at a high speed based on the modulation electric signal supplied to the modulation electrode 7 to modulate the intensity of light outputted from the output port at a high speed.

It is to be noted that, in the present embodiment, the heater electrode 8X as the resonance wavelength adjustment electrode 8, the heater power supply (or the heater driving circuit including the heater power supply) and the functions of the controller 3 for performing the resonance wavelength adjustment control and the re-resonance wavelength adjustment control are a mechanism for adjusting the resonance wavelength of the ring optical modulator 9. Therefore, the mechanism just described is referred to also as resonance wavelength adjustment mechanism, resonance wavelength adjustment unit or resonance wavelength controlling circuit.

Incidentally, the reason why the optical modulation unit 2 is configured such that the plurality of ring optical modulators 9 are coupled in cascade connection and have round-trip lengths that are different from each other and increase in order from the light input side to the light output side and the re-resonance wavelength adjustment control described above is performed by the controller 3 when it is decided that an inter-channel occurs as a result of performance of the resonance wavelength adjustment control as described above is such as follows.

Figure 4:
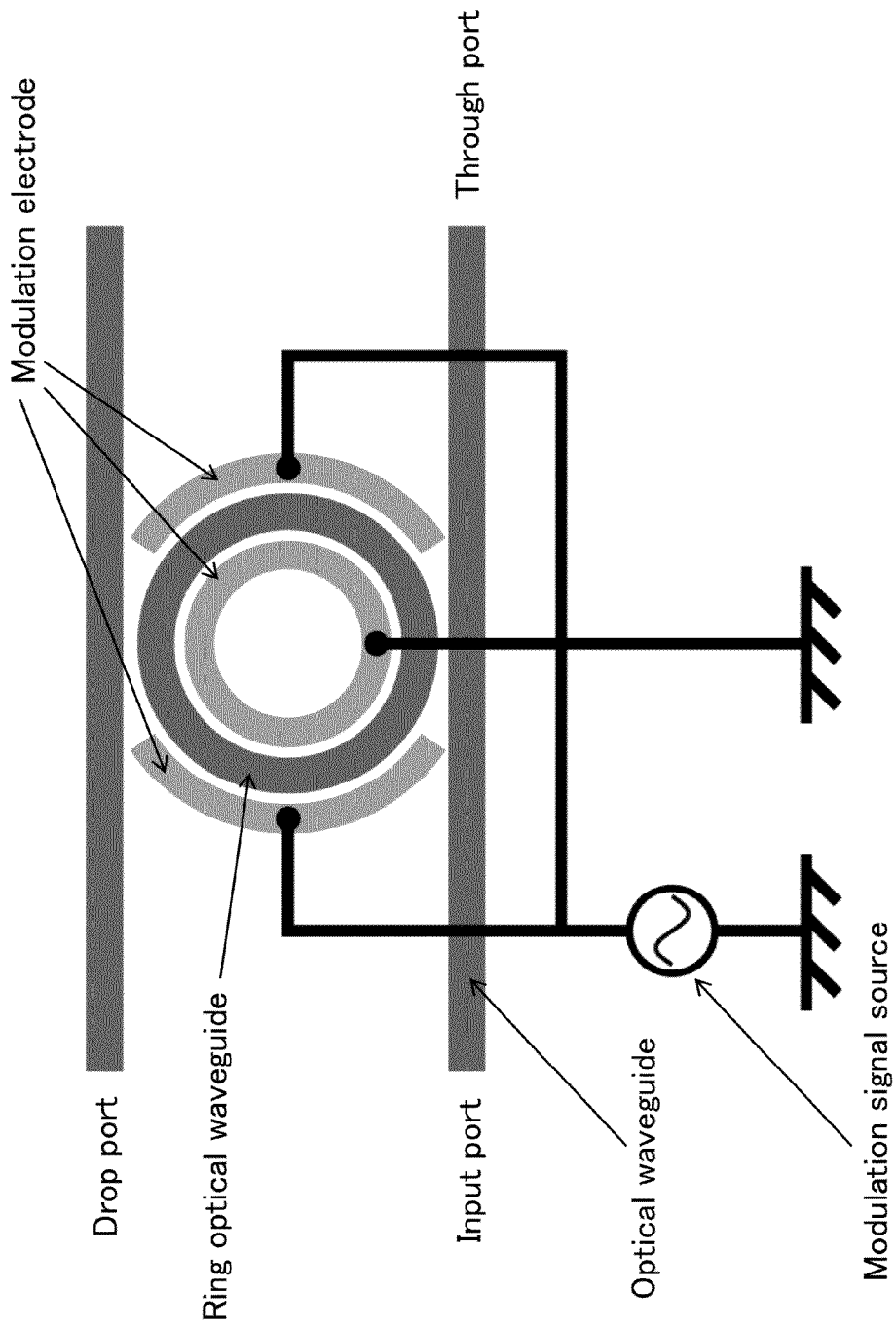
FIG. 4 is a schematic view depicting a configuration of one ring optical modulator that does not have a heater.

First, an operation principle of the ring optical modulator where it includes only one ring optical modulator which does not have a heater as depicted in FIG. 4 is described with reference to FIGS. 4 to 7C.

Figure 6:
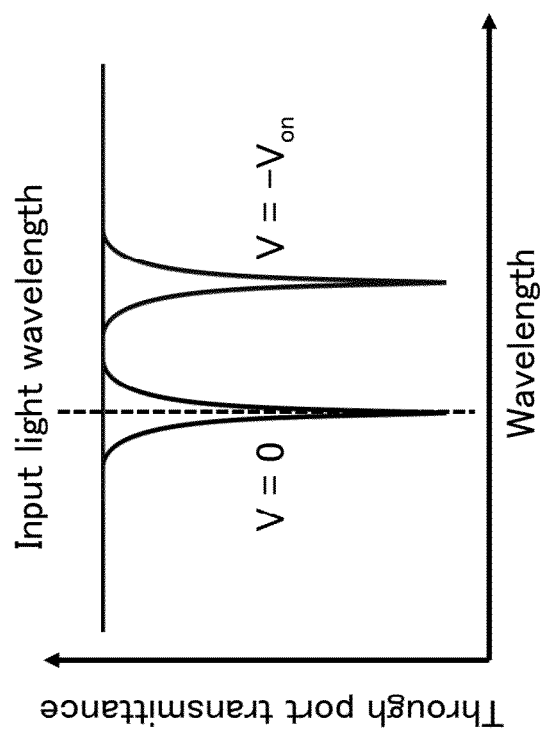
FIG. 6 is a view depicting a transmission spectrum (transmittance from an input port to a through port) of the one ring optical modulator that does not have a heater, and is a view illustrating operation of the ring optical modulator.

In such a ring optical modulator as depicted in FIG. 4, if a wavelength of input light inputted from the input port satisfies a resonance condition (resonance wavelength) of the ring optical modulator (ring optical resonator) in a state in which a modulation electric signal is not supplied to the modulation electrode, then the input light propagates to the drop port as depicted in FIGS. 5A, 5B and 6. However, if the wavelength of the input light is displaced from the resonance wavelength, then the input light propagates to the through port.

Since the resonance wavelength of the ring optical modulator depends upon an optical circumferential length of the ring optical waveguide configuring the ring optical modulator, if the refractive index is varied, for example, by an electro-optic effect by an electric signal to vary the optical circumferential length, then the resonance wavelength of the ring optical modulator can be varied. This signifies that the transmittance to the drop port and the through port as viewed from the input port varies, and as a result, the light intensity appearing at the drop port and the through port varies. Therefore, if the modulation electric signal is applied to the modulation electrode of the ring optical modulator to modulate the refractive index, then light intensity modulation operation is obtained.

For example, where the resonance condition is satisfied when the application voltage V to the modulation electrode of the ring optical modulator is 0 V, namely, where the resonance wavelength of the ring optical modulator matches with the wavelength of the input light when the application voltage V is 0 V, if the voltage V to be applied to the modulation electrode of the ring optical modulator is set to 0 V as depicted in FIG. 5A, then the input light inputted from the input port propagates to the drop port. On the other hand, if the voltage V to be applied to the modulation electrode of the ring optical modulator is set to −Von, then the resonance wavelength of the ring optical modulator is displaced from the wavelength of the input light and the input light inputted from the input port propagates to the through port.

In this case, the transmission characteristic of the ring optical modulator, namely, the transmittance to the through port as viewed from the input port, varies as depicted in FIG. 6, and the transmittance becomes minimum when the application voltage V to the modulation electrode of the ring optical modulator is 0 V but becomes maximum when the application voltage V is −Von. It is to be noted here that, while the transmittance becomes maximum when the application voltage V is −Von, the transmittance is not limited to this, and, for example, where the voltage amplitude capable of being applied is limited or in a like case, the transmittance may not become maximum when the application voltage V is −Von.

Figure 7A:
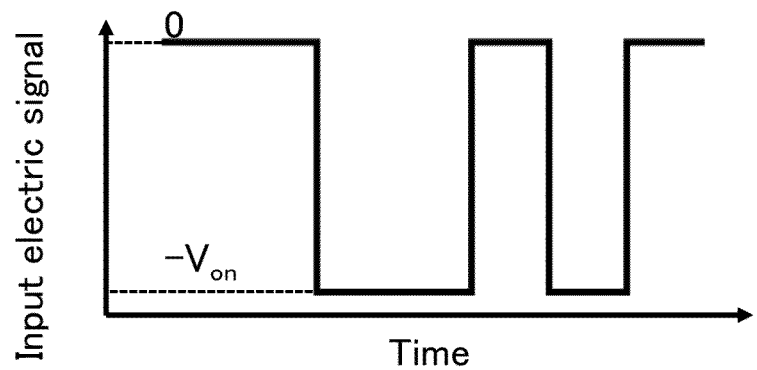
FIGS. 7A to 7C are views illustrating light intensity modulation by the one ring optical modulator that does not have a heater.
Figure 7B:
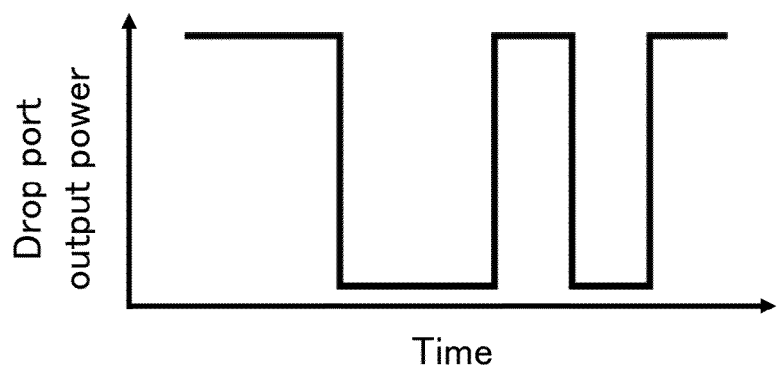
Figure 7C:
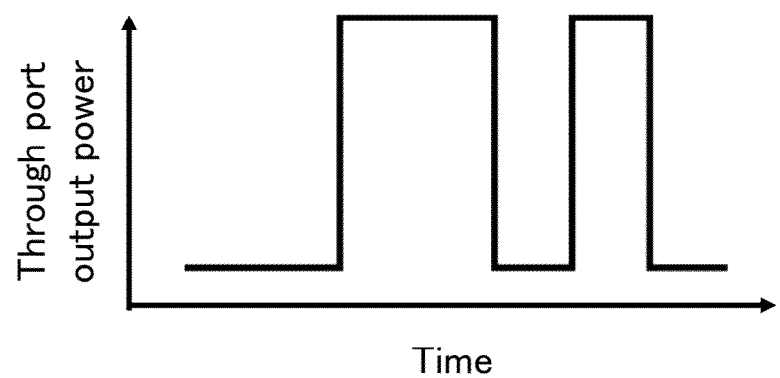

Therefore, if, for example, such a modulation electric signal (input electric signal) as depicted in FIG. 7A is inputted to the modulation electrode of the ring optical modulator, then the power of light (light intensity) outputted from the drop port varies as depicted in FIG. 7B and the power of light outputted from the through port varies as depicted in FIG. 7C. In particular, an inverted signal (light intensity modulation signal) inverted from the modulation electric signal (here, modulation voltage signal) appears at the through port, and a non-inverted signal (positive signal; light intensity modulation signal) same as the modulation electric signal appears at the drop port. In this case, the drop port may be used as the output port, and the through port may be used as the output port by performing signal processing for the inverted signal appearing at the through port.

It is to be noted here that, since the present embodiment is described taking, as an example, a case in which the application voltage V to the modulation electrode of the ring optical modulator is set to 0 V and −Von and the resonance condition is satisfied when the application voltage V to the modulation electrode 7 of the ring optical modulator 9 is 0 V, namely, the resonance wavelength of the ring optical modulator matches with the wavelength of the input light when the application voltage V is 0 V, an inverted signal appears at the through port and a non-inverted signal (positive signal) appears at the drop port. However, the appearance of the two signals is not limited to this. For example, if the application voltage V to the modulation electrode of the ring optical modulator is set to 0 V and −Von and the resonance condition is satisfied when the application voltage V to the modulation electrode 7 of the ring optical modulator 9 is −Von, namely, the resonance wavelength of the ring optical modulator matches with the wavelength of input light when the application voltage V is −Von, or if the application voltage V to the modulation electrode of the ring optical modulator is set to 0 V and +Von and the resonance condition is satisfied when the application voltage V to the modulation electrode 7 of the ring optical modulator 9 is 0 V, namely, the resonance wavelength of the ring optical modulator matches with the wavelength of input light when the application voltage V is 0 V, the non-inverted signal (positive signal) appears at the through port and the inverted signal appears at the drop port. In this case, the through port may be used as the output port, or the drop port may be used as the output port by performing signal processing for the inverted signal appearing at the drop port.

In this manner, one of the drop port and the through port can be used as the output port depending upon the wavelength of input light or the resonance wavelength of the ring optical modulator or by signal processing or the like.

If such a ring optical modulator as described above is formed as a silicon ring optical modulator configured from a silicon optical waveguide in which an optical waveguide includes a silicon waveguide core layer, then such advantages as reduction in size, high-speed operation and low power consumption are achieved. However, the operation wavelength band is very narrow, and it is very difficult to adjust the resonance wavelength of a ring optical modulator upon production so as to match with the wavelength of input light.

For example, while the resonance wavelength of the ring optical modulator depends upon the optical circumferential length (round-trip length) of the ring optical waveguide configuring the ring optical modulator, the equivalent refractive index suffers from a dispersion by a deviation between wafers, a deviation between lots and so forth in thickness of the silicon waveguide core layer of the optical waveguide. Therefore, as a result, the resonance wavelength of the ring optical modulator suffers from displacement of approximately ±10 nm in the minimum between wafers or between lots.

It seems recommendable to adjust, against such displacement of the resonance wavelength of the ring optical modulator as described above, the resonance wavelength of the ring optical modulator by a method of providing a heater (micro heater) on the ring optical modulator to adjust the refractive index by thermal control or another method of adjusting the refractive index by a carrier plasma effect by carrier injection. It is to be noted that the ring optical modulator on which a heater is provided is referred to also as heater-mounted type ring optical modulator or micro-heater-mounted type ring optical modulator.

However, where the resonance wavelength of the ring optical modulator is adjusted by thermal control using a heater (refer to FIG. 8), the resonance wavelength of the ring optical modulator can be shifted only to the long wavelength side. On the other hand, where the resonance wavelength of the ring optical modulator is adjusted by carrier injection, the resonance wavelength of the ring optical modulator can be shifted only to the short wavelength side. Therefore, the wavelength adjustment amount necessary for adjusting the resonance wavelength of the ring optical modulator so as to match with the wavelength of input light is at most equal to an amount of the FSR of the ring optical modulator (refer to FIG. 9).

Here, in order to reduce the FSR, the radius of the ring optical waveguide (ring-shaped waveguide core layer) configuring the ring optical modulator may be increased. On the other hand, in order to achieve the advantages of reduction in size, high-speed operation and low power consumption of the ring optical modulator, it is desired to decrease the radius of the ring optical waveguide configuring the ring optical modulator.

If the radius of the ring optical waveguide (ring-shaped waveguide core layer) configuring the ring optical modulator is decreased so that the advantages of reduction in size, high-speed operation and low power consumption of the ring optical modulator are achieved, then the FSR becomes high and the wavelength adjustment amount necessary for adjusting the resonance wavelength of the ring optical modulator so as to match with the wavelength of input light becomes great.

If the wavelength adjustment amount necessary for adjusting the resonance wavelength of the ring optical modulator so as to match with the wavelength of input light is great in this manner, then, in both cases of heating using a heater and carrier injection, the current amount to be supplied to the electrode used for adjustment of the resonance wavelength, namely, the current amount necessary for adjusting the resonance wavelength of the ring optical modulator so as to match with the wavelength of input light, becomes great. Therefore, if the wavelength adjustment amount necessary for adjusting the resonance wavelength of the ring optical modulator so as to match with the wavelength of input light is great, then power consumption necessary for adjusting the resonance wavelength of the ring optical modulator so as to match with the wavelength of input light becomes high.

Figure 8:
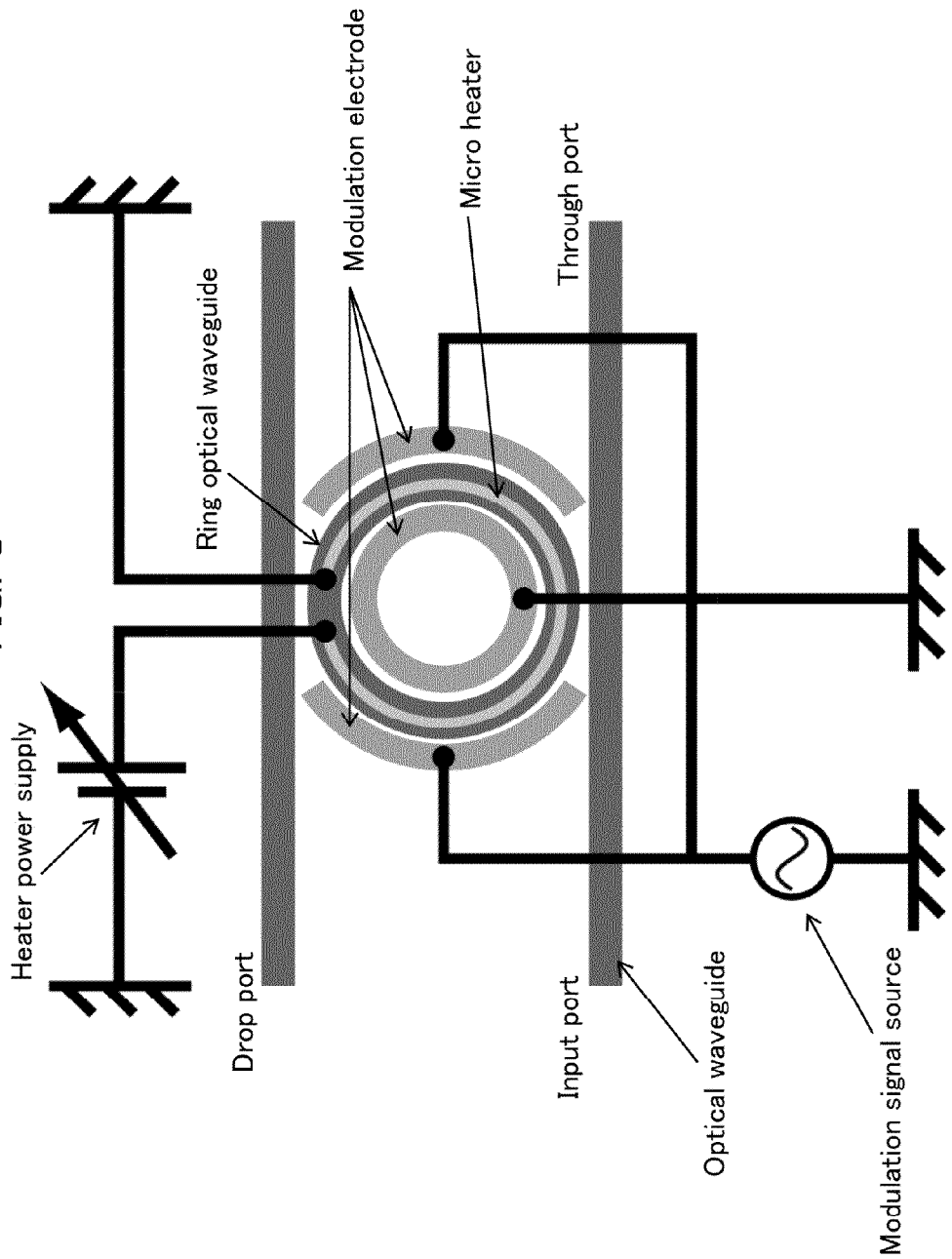
FIG. 8 is a schematic view depicting a configuration of one ring optical modulator that has a heater.
Figure 9:
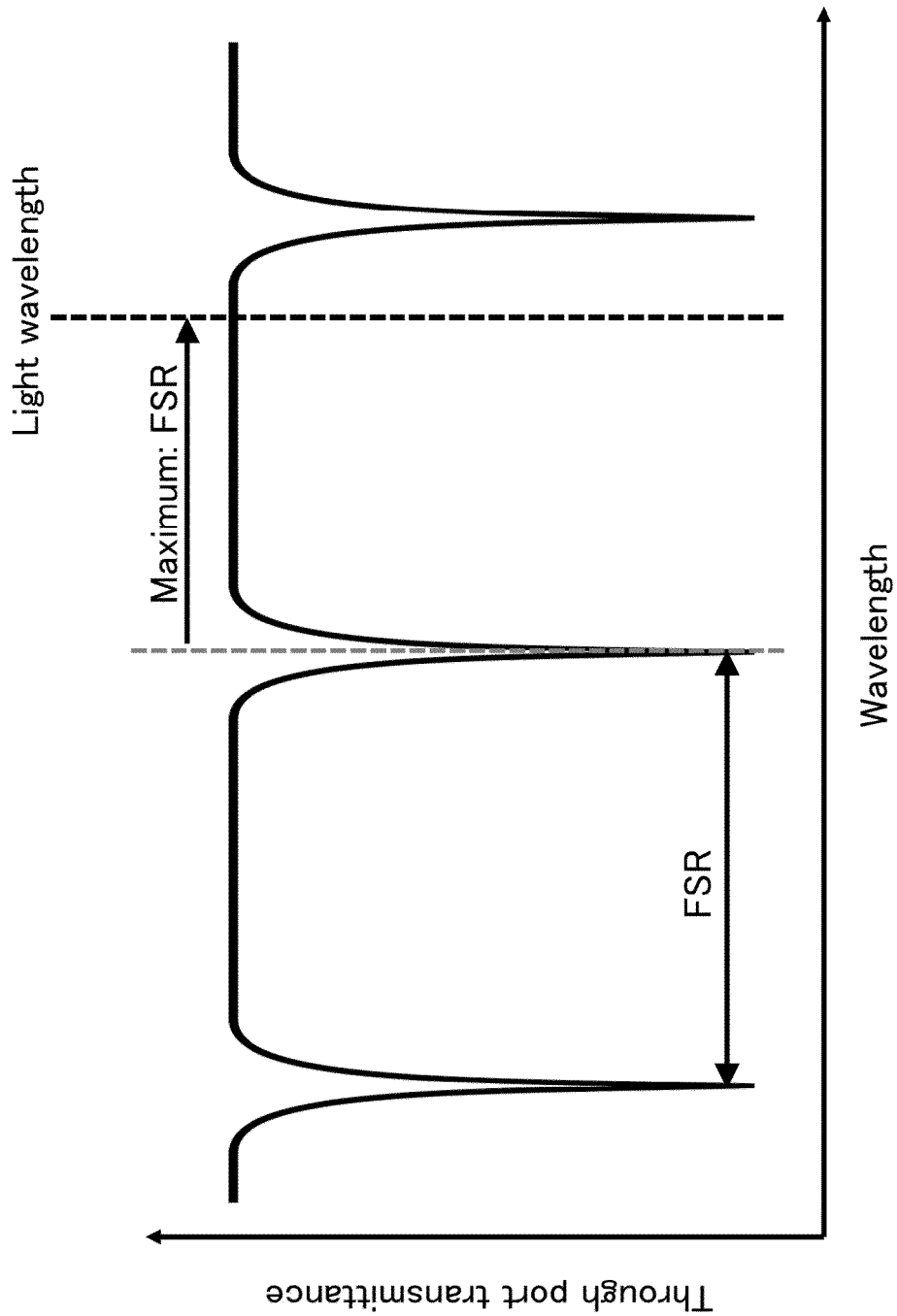
FIG. 9 is a view depicting a transmission spectrum (transmittance from an input port to a through port) of the one ring optical modulator that has a heater, and is a view illustrating adjustment of a resonance wavelength of the ring optical modulator.

For example, in such a micro-heater-mounted type ring optical modulator as illustrated in FIG. 8, in order to achieve the advantages of reduction in size, high-speed operation and low power consumption of the ring optical modulator, it is desired to set the radius (ring radius) of the ring optical waveguide (ring-shaped waveguide core layer) configuring the ring optical modulator to approximately several μm or at most to approximately 10 μm focusing on the characteristic of the ring optical modulator. Therefore, if the ring radius is set to approximately 10 μm, then the FSR increases to approximately 11 nm.

Here, since the temperature dependency of the resonance wavelength of the ring optical modulator is approximately 0.07 nm/K from the temperature dependency of the refractive index of the silicon waveguide core, in order to cause a wavelength shift by an amount equal to the FSR in the ring optical modulator having the ring radius of approximately 10 μm, the temperature of the ring optical modulator may be raised by approximately 160 degrees by heating using a heater. Generally, it is said that a pn junction formed on a silicon waveguide core has a maximum operation temperature of approximately 150 degrees, and, at a temperature higher than the maximum operation temperature, leakage current increases and normal operation cannot be expected. Further, also from a point of view of the reliability, it is very undesirable to cause the ring optical modulator to operate at such a high temperature as just described. Further, the power consumption required for shifting the resonance wavelength of the ring optical modulator by an amount equal to the FSR is approximately several tens mW that is a magnitude that cannot be ignored.

In this case, it seems recommendable to input a plurality of input lights having wavelengths that are different from each other to the plurality of ring optical modulators coupled in cascade connection and adjust the resonance wavelengths of the plurality of ring optical modulators so as to match with the wavelengths of the input lights having the most proximate wavelength to reduce the power consumption necessary for the matching of the resonance wavelengths of the ring optical modulators with the wavelengths of the input lights. However, the wavelengths of the plurality of input lights having wavelengths that are different from each other and the resonance wavelengths of the plurality of ring optical modulators may not necessarily have an ideal relationship. Therefore, there is the possibility that an inter-channel may occur in which two resonance wavelengths of different ring optical modulators are placed between an input light having one wavelength and another input light having a different wavelength adjacent to the one wavelength.

Figure 10A:
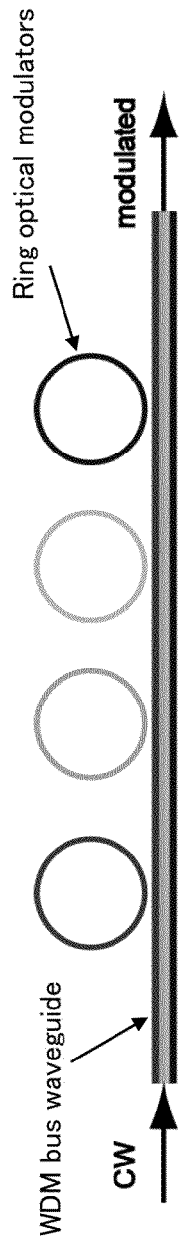
FIGS. 10A to 10C are views illustrating a configuration and a subject of a WDM optical transmitter.
Figure 10B:
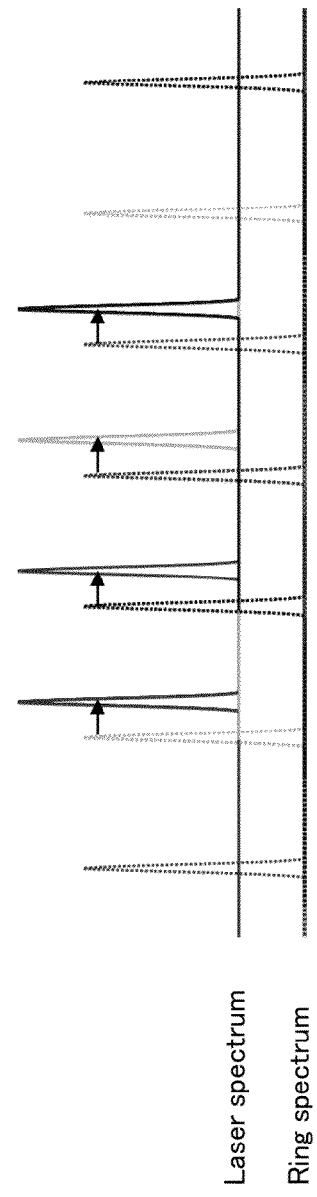
Figure 10C:
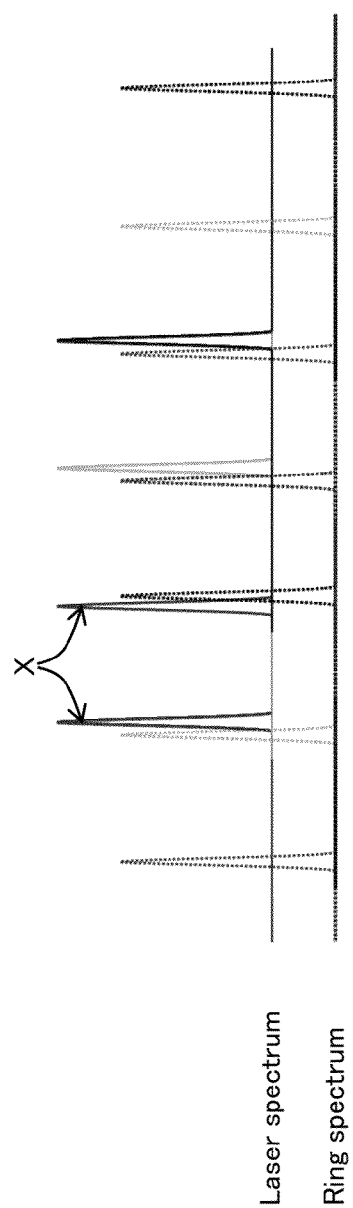

For example, it seems recommendable to configure that the WDM optical transmitter such that CW-WDM input light obtained by multiplexing a plurality of input lights having wavelengths that are different from each other (continuous lights; laser lights) is inputted to the WDM bus waveguide in which the plurality of ring optical modulators are coupled in cascade connection and modulate the input lights included in the CW-WDM input light and having the wavelengths individually by the ring optical modulators and then output the modulated lights as WDM signal light. Also it seems recommendable to adjust, in such a WDM optical transmitter as just described, the resonance wavelengths of the plurality of ring optical modulators so as to match with wavelengths of input lights having most proximate wavelengths as indicated by an arrow mark in FIG. 10B thereby to decrease the power consumption necessary for the adjustment. However, the interval (channel interval) between the resonance wavelengths of the plurality of ring optical modulators and the interval (channel interval) between the plurality of input lights having wavelengths included in the WDM input light are not necessarily fixed but are dispersed with some deviation. Therefore, although there is no problem if the wavelengths of the plurality of laser lights having wavelengths that are different from each other and the resonance wavelengths of the plurality of ring optical modulators have such an ideal relationship as depicted in FIG. 10B, an inter-channel sometimes occurs in which two resonance wavelengths of different ring optical modulators are inserted between an input light having one wavelength and another input light having a different wavelength adjacent to the one wavelength.

Such an inter-channel as just described occurs with a certain probability which depends upon the number of plural input lights (number of wavelengths) having wavelengths that are different from each other, the interval between the wavelengths, the deviation of the wavelengths and the deviation in interval between the resonance wavelengths of the plurality of ring optical modulators.

Then, when an inter-channel occurs, if the resonance wavelength adjustment control for adjusting the resonance wavelengths of the ring optical modulators so as to match with the input light wavelengths is performed in order beginning with the ring optical modulator provided at the most light input side, then the current amount necessary for the resonance wavelength adjustment control for the ring optical modulator for which the resonance wavelength adjustment control has been performed last, namely, necessary power consumption, increases exceeding that of any other ring optical modulator.

Therefore, the optical modulation unit 2 is configured such that the plurality of ring optical modulators 9 are coupled in cascade connection and the ring optical waveguides 6 of the ring optical modulators 9 have round-trip lengths different from each other and increase in order beginning with the light input side to the light output side as depicted in FIGS. 1 and 2. Further, the resonance wavelength adjustment control described above is performed by the controller 3, and, when it is decided that an inter-channel occurs, the re-resonance wavelength adjustment control described above is performed. Consequently, when a plurality of input lights having wavelengths that are different from each other are inputted to the plurality of ring optical modulators 9 coupled in cascade connection to decrease the necessary current amount (power consumption), such a situation that the current amount (power consumption) necessary for the resonance wavelength adjustment control for the ring optical modulator for which the resonance wavelength adjustment control has been performed last increases exceeding that of any other ring optical modulator 9 can be reduced.

More detailed description is given below.

First, the optical modulation unit 2 is configured such that a plurality of ring optical modulators 9 are coupled in cascade connection and the ring optical waveguides 6 of the ring optical modulators 9 have round-trip lengths different from each other and increasing in order from the light input side to the light output side. Further, when the resonance wavelength adjustment control for adjusting the resonance wavelengths of the ring optical modulators 9 so as to match with the input light wavelengths in order beginning with the ring optical modulator 9 provided at the most light input side is performed by the controller 3, the resonance wavelength adjustment control is performed in such an order for the ring optical modulator as a ring optical modulator having the shortest resonance wavelength, another ring optical modulator having a resonance wavelength longer by one channel and a further ring optical modulator having a resonance wavelength further longer by one channel. In this case, if the resonance wavelength of a certain ring optical modulator 9 is adjusted so as to match with an input light wavelength, then the input light propagates to the drop port side of the ring optical modulator 9. Therefore, the input light does not propagate to the ring optical modulators 9 positioned at the light output side than the ring optical modulator 9 just described.

This is described with reference to FIGS. 11A to 13D taking, for simplification of the description, a case in which two input lights having wavelengths λ1 and λ2 that are different from each other are inputted to the ring optical modulators Ring1 and Ring2 having two resonance wavelengths that are different from each other, respectively, as an example.

Here, FIGS. 11A to 11D depict a state before the resonance wavelengths of the ring optical modulators Ring1 and Ring2 are adjusted, and FIGS. 12A to 12D depict a state after the resonance wavelength of the ring optical modulator Ring1 positioned at the light input side is adjusted and FIGS. 13A to 13D depict a state after the resonance wavelength of the ring optical modulator Ring2 is adjusted. Among FIGS. 11A to 13D, FIGS. 11A, 12A and 13A are schematic views and FIGS. 11B, 12B and 13B depict spectrum images observed at a point A in FIGS. 11A, 12A and 13A. Further, FIGS. 11C, 12C and 13C depict spectrum images observed at a point B in FIGS. 11A, 12A and 13A, and FIGS. 11D, 12D and 13D depict a relationship between the two input light wavelengths λ1 and λ2 and the resonance wavelengths of the two ring optical modulators Ring1 and Ring2.

First, in a state before the resonance wavelengths of the ring optical modulators Ring1 and Ring2 are adjusted as depicted in FIGS. 11A to 11D, since the resonance wavelengths of the two ring optical modulators Ring1 and Ring2 and the two input light wavelengths λ1 and λ2 do not match with each other, the two input lights are observed at the points A and B and are outputted from the through port.

Then, the resonance wavelength of the ring optical modulator Ring1 positioned at the light input side is adjusted as depicted in FIGS. 12A to 12D. In particular, the resonance wavelength of the ring optical modulator Ring1 is adjusted so that the light intensity appearing at the drop port of the ring optical modulator Ring1 becomes maximum. As a result, the resonance wavelength of the ring optical modulator Ring1 can be adjusted to the input light having the wavelength λ1. As a result, the input light having the wavelength λ1 propagates to the drop port side of the ring optical modulator Ring1. Consequently, the input light having the wavelength λ1 does not propagate to the ring optical modulator Ring2 positioned at the light output side (namely, the through port side) with respect to the ring optical modulator Ring1. Therefore, the input light having the wavelength λ1 observed at the point A is not observed at the point B any more. Then, only the input light having the wavelength λ2 is outputted from the through port.

Furthermore, the resonance wavelength of the ring optical modulator Ring2 is adjusted as depicted in FIGS. 13A to 13D. In particular, the resonance wavelength of the ring optical modulator Ring2 is adjusted so that the light intensity appearing at the drop port of the ring optical modulator Ring2 becomes maximum. If the resonance wavelength of the ring optical modulator Ring2 is adjusted in this manner, then since the input light having the wavelength λ1 has propagated already to the drop port side of the ring optical modulator Ring1 as described hereinabove, the resonance wavelength of the ring optical modulator Ring2 passes the wavelength corresponding to the input light having the wavelength λ1 and is matched with the input light having the wavelength λ2. As a result, the input light having the wavelength λ2 propagates to the drop port side of the ring optical modulator Ring2. Consequently, not only the input light having the wavelength λ1 but also the input light having the wavelength λ2 are not outputted from the through port. It is to be noted that the input lights having the wavelengths λ1 and λ2 are observed at the point A and the input light having the wavelength λ2 is observed at the point B.

In this manner, when the resonance wavelengths are adjusted in order beginning with the ring optical modulator 9 positioned at the light input side, if the resonance wavelength of a certain ring optical modulator 9 is adjusted to the input light wavelength, then the input light propagates to the drop port side of the ring optical modulator 9. Therefore, the input light does not any more propagate to the ring optical modulator 9 positioned at the light output side with respect to the ring optical modulator 9 just described.

Incidentally, where the resonance wavelength adjustment control is performed in such a manner as described above, if an inter-channel does not occur, then the resonance wavelength adjustment control is performed as described below.

Here, the resonance wavelength adjustment control is described with reference to FIGS. 14, 15A to 15N taking, as an example, a case in which WDM input light including input lights having six wavelengths λ1 to λ6 different from each other and outputted from the six lasers LD1 to LD6 included in the laser array light source 1 is inputted to the ring optical modulators Ring1 to Ring6 having six resonance wavelengths that are different from each other (the number of wavelengths of the WDM input light is 6).

Figure 14:
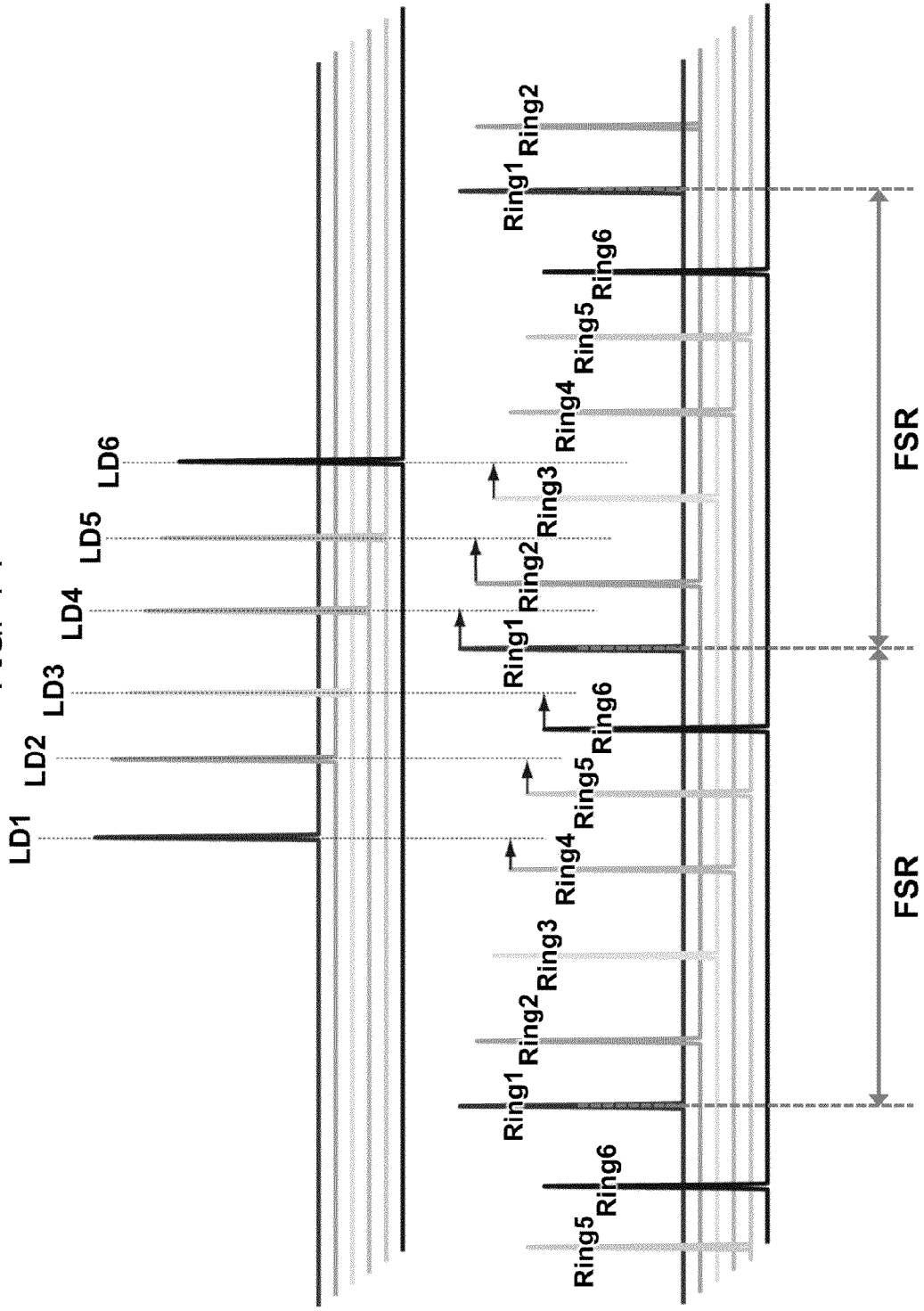
FIG. 14 is a view illustrating the resonance wavelength adjustment control in the optical resonator apparatus (optical modulation apparatus) according to the first embodiment taking, as an example, resonance wavelength adjustment control (resonance spectrum adjustment) where six input lights having wavelengths that are different from each other are inputted to six ring optical resonators (ring optical modulators) and depicting the resonance wavelength control in a case in which an inter-channel does not occur.
Figure 15:
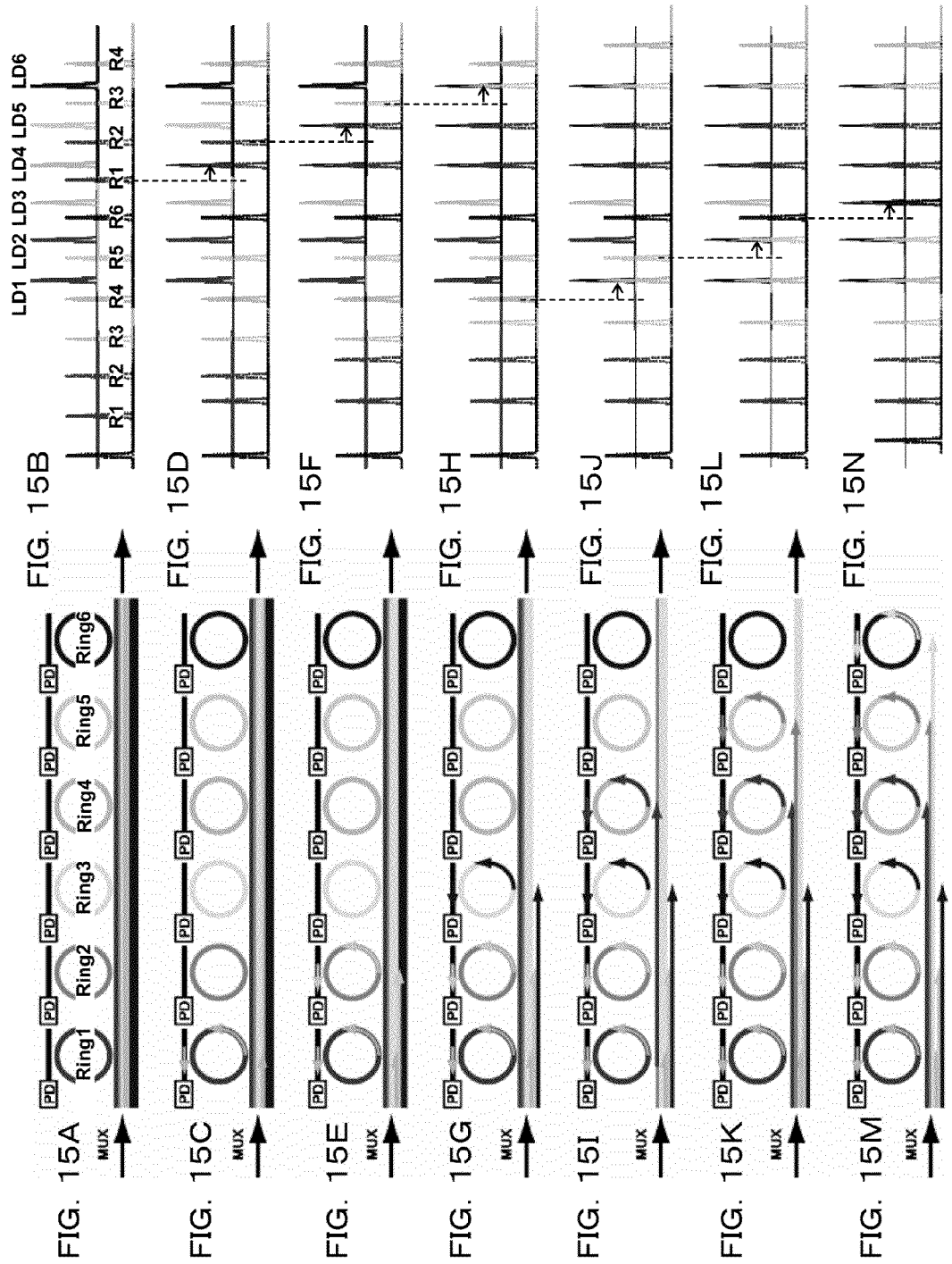
FIGS. 15A to 15N are views illustrating a procedure of the resonance wavelength adjustment control in the optical resonator apparatus (optical modulation apparatus) according to the first embodiment taking, as an example, a procedure of the resonance wavelength adjustment control (resonance spectrum adjustment) where six input lights having wavelengths that are different from each other are inputted to six ring optical resonators (ring optical modulators) and depicting the procedure in a case in which an inter-channel does not occur.

When an inter-channel does not occur, a spectrum of the resonance wavelengths of the six ring optical modulators Ring1 to Ring6 and a spectrum of input light having the six wavelengths λ1 to λ6 that are different from each other have, for example, such a relationship as depicted in FIG. 14.

In this case, as depicted in FIGS. 14, 15A to 15N, by performing the resonance wavelength adjustment control for adjusting the resonance wavelengths of the ring optical modulators Ring1 to Ring6 to the long wavelength side so as to match with the input light wavelength in order beginning with the ring optical modulator Ring1 provided at the most light input side from among the six ring optical modulators Ring1 to Ring6, the resonance wavelengths of the ring optical modulators Ring1 to Ring6 can be adjusted to the most proximate input light wavelengths at the long wavelength side.

In particular, where the six ring optical modulators Ring1 to Ring6 are disposed in order from the light input side as depicted in FIG. 15A and an inter-channel does not occur, the relationship between the spectrum of the WDM input light and the spectrum of the ring optical modulator is as depicted in FIG. 15B. This indicates a state before the resonance wavelength adjustment.

On the other hand, if the resonance wavelength of the first ring optical modulator Ring1 (R1) from the light input side is first adjusted to the long wavelength side so as to match with the input light wavelength as depicted in FIGS. 15C and 15D, then the resonance wavelength is adjusted so as to match with the input light having the wavelength λ4 outputted from the laser LD4. Then, if the resonance wavelength of the second ring optical modulator Ring2 (R2) from the light input side is adjusted to the long wavelength side so as to match with the input light wavelength, then the resonance wavelength is adjusted so as to match with the input light having the wavelength λ5 outputted from the laser LD5. Further, if the resonance wavelength of the third ring optical modulator Ring3 (R3) from the light input side is adjusted to the long wavelength side as depicted in FIGS. 15G and 15H so as to match with the input light wavelength, then the resonance wavelength is adjusted so as to match with the input light having the wavelength λ6 outputted from the laser LD6. Further, if the resonance wavelength of the fourth ring optical modulator Ring4 (R4) from the light input side is adjusted to the long wavelength side as depicted in FIGS. 15I and 15J so as to match with the input light wavelength, then the resonance wavelength is adjusted so as to match with the input light having the wavelength λ1 outputted from the laser LD1. Further, if the resonance wavelength of the fifth ring optical modulator Ring5 (R5) from the light input side is adjusted to the long wavelength side so as to match with the input light wavelength, then the resonance wavelength is adjusted so as to match with the input light having the wavelength λ2 outputted from the laser LD2. Further, if the resonance wavelength of the sixth ring optical modulator Ring6 (R6) from the light input side is adjusted to the long wavelength side so as to match with the input light wavelength, then the resonance wavelength is adjusted so as to match with the input light having the wavelength λ3 outputted from the laser LD3.

Consequently, the power consumption necessary for the resonance wavelength adjustment control for the six ring optical modulators Ring1 to Ring6 can be set to $P_{FSR}/N$ (here, the number of wavelength N=6) or less. In this manner, when an inter-channel does not occur, the power consumption necessary for the resonance wavelength adjustment control for the six ring optical modulators Ring1 to Ring6 can be sufficiently decreased. Therefore, the re-resonance wavelength adjustment control may not be performed.

In this manner, when an inter-channel does not occur, if the power consumption necessary for shifting the resonance wavelength of the ring optical modulator 9 by an amount equal to the FSR and the number of input lights having a plurality of wavelengths that are different from each other are represented $P_{FSR}$ and N (the number of wavelengths of WDM input light is N), respectively, then the expected value of the power consumption necessary for the resonance wavelength adjustment control for the ring optical modulator 9 is given as $P_{FSR}/2N$, and the power consumption necessary for the resonance wavelength adjustment control for each ring optical modulator 9 can be decreased significantly. For example, where $P_{FSR}$ and N are approximately 30 mW and 16, respectively, the expected value of the power consumption necessary for the resonance wavelength adjustment control for each of the plurality of the ring optical modulators 9 is approximately 0.94 mW.

It is to be noted that, when an inter-channel does not occur in this manner, after the resonance wavelength adjustment control is performed in order beginning with the ring optical modulator 9 provided at the most light input side, the resonance wavelength having the shortest wavelength is adjusted to a certain input light wavelength and thereafter the resonance wavelength at the long wavelength side by one channel is adjusted in order so as to match with the input light wavelength displaced by one channel.

On the other hand, if an inter-channel occurs, then the resonance wavelength adjustment control is performed in the following manner.

Here, the resonance wavelength adjustment control is described taking, as an example, a case in which the resonance wavelengths of the two ring optical modulators Ring4 and Ring5 are placed between the input light outputted from the laser LD1 and having the wavelength λ1 and the input light outputted from the laser LD2 and having the wavelength λ2 and an inter-channel occurs.

Where such an inter-channel as just described occurs, even if the resonance wavelength adjustment control for adjusting the resonance wavelengths of the ring optical modulators Ring1 to Ring6 to the long wavelength side so as to match with the input light wavelength in order beginning with the ring optical modulator Ring1 provided at the most light input side from among the six ring optical modulators Ring1 to Ring6 is performed as depicted in FIGS. 17A to 17N similarly as in the case described above in which an inter-channel does not occur, each of the resonance wavelengths of the ring optical modulators Ring1 to Ring6 cannot be adjusted to the most proximate input light wavelength at the long wavelength side.

In particular, where the six ring optical modulators Ring1 to Ring6 are disposed in order from the light input side and an inter-channel occurs as depicted in FIG. 17A, the relationship between the spectrum of the WDM input light and the spectrum of the ring optical modulator is such as depicted in FIG. 17B. FIG. 17B illustrates a state before the resonance wavelength adjustment.

Thus, if the resonance wavelength of the first ring optical modulator Ring1 (R1) from the light input side is adjusted to the long wavelength side so as to match with the input wavelength as depicted in FIGS. 17C and 17D, then the resonance wavelength is adjusted so as to match with the input light having the wavelength λ4 and outputted from the laser LD4. Then, if the resonance wavelength of the second ring optical modulator Ring2 (R2) from the light input side is adjusted to the long wavelength side so as to match with the input wavelength as depicted in FIGS. 17E and 17F, then the resonance wavelength is adjusted so as to match with the input light having the wavelength λ5 and outputted from the laser LD5. Further, if the resonance wavelength of the third ring optical modulator Ring3 (R3) from the light input side is adjusted to the long wavelength side so as to match with the input wavelength as depicted in FIGS. 17G and 17H, then the resonance wavelength is adjusted so as to match with the input light having the wavelength λ6 and outputted from the laser LD6. Further, if the resonance wavelength of the fourth ring optical modulator Ring4 (R4) from the light input side is adjusted to the long wavelength side so as to match with the input wavelength as depicted in FIGS. 17I and 17J, then the resonance wavelength is adjusted so as to match with the input light having the wavelength λ2 and outputted from the laser LD2. Further. if the resonance wavelength of the fifth ring optical modulator Ring5 (R5) from the light input side is adjusted to the long wavelength side so as to match with the input wavelength as depicted in FIGS. 17K and 17L, then the resonance wavelength is adjusted so as to match with the input light having the wavelength λ3 and outputted from the laser LD3. Further, if the resonance wavelength of the sixth ring optical modulator Ring6 (R6) from the light input side is adjusted to the long wavelength side so as to match with the input wavelength as depicted in FIGS. 17M and 17N, then the resonance wavelength is adjusted so as to match with the input light having the wavelength λ1 and outputted from the laser LD1.

In this manner, the resonance wavelength of the ring optical modulator Ring1, resonance wavelength of the ring optical modulator Ring2 and resonance wavelength of the ring optical modulator Ring3 are adjusted to the input light wavelength λ4 outputted from the laser LD4, input light wavelength λ5 outputted from the laser LD5 and input light wavelength λ6 outputted from the laser LD6, respectively, and the resonance wavelengths can be adjusted to the most proximate input light wavelengths at the long wavelength side. However, the resonance wavelength of the ring optical modulator Ring4 cannot be adjusted to the input light wavelength λ1 outputted from the laser LD1 but is adjusted to the input light wavelength λ2 outputted from the laser LD2. As a result, the resonance wavelength of the ring optical modulator Ring5 cannot be adjusted to the input light wavelength λ2 outputted from the laser LD2 but is adjusted to the input light wavelength λ3 outputted from the laser LD3. Further, the resonance wavelength of the ring optical modulator Ring6 cannot be adjusted to the input light wavelength λ3 outputted from the laser LD3 but is adjusted to the input light wavelength λ1 outputted from the laser LD1.

Figure 16:
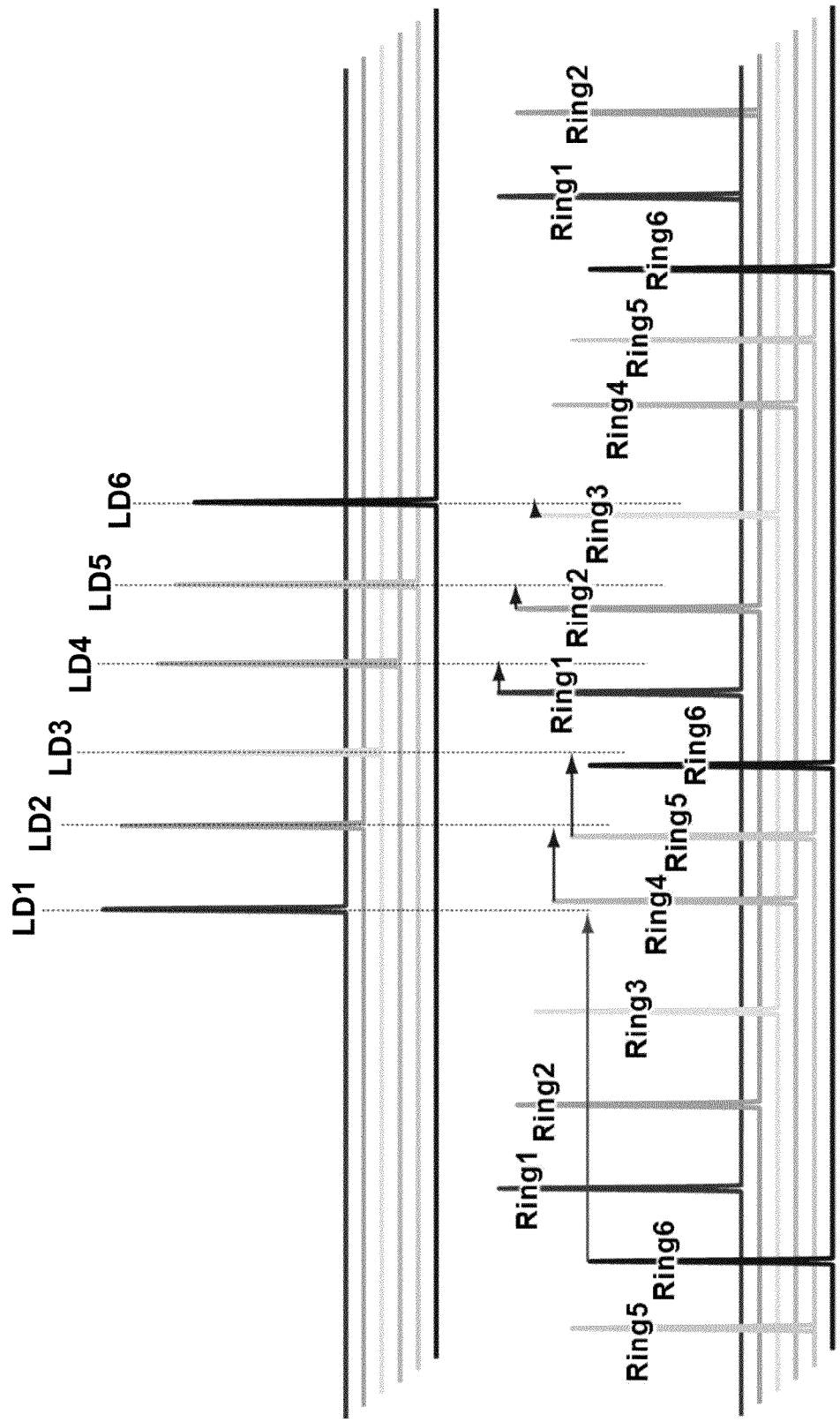
FIG. 16 is a view illustrating the resonance wavelength adjustment control in the optical resonator apparatus (optical modulation apparatus) according to the first embodiment taking, as an example, the resonance wavelength adjustment control (resonance spectrum adjustment) where six input lights having wavelengths that are different from each other are inputted to six ring optical resonators (ring optical modulators) and depicting the resonance wavelength adjustment control in a case in which an inter-channel occurs.
Figure 17:
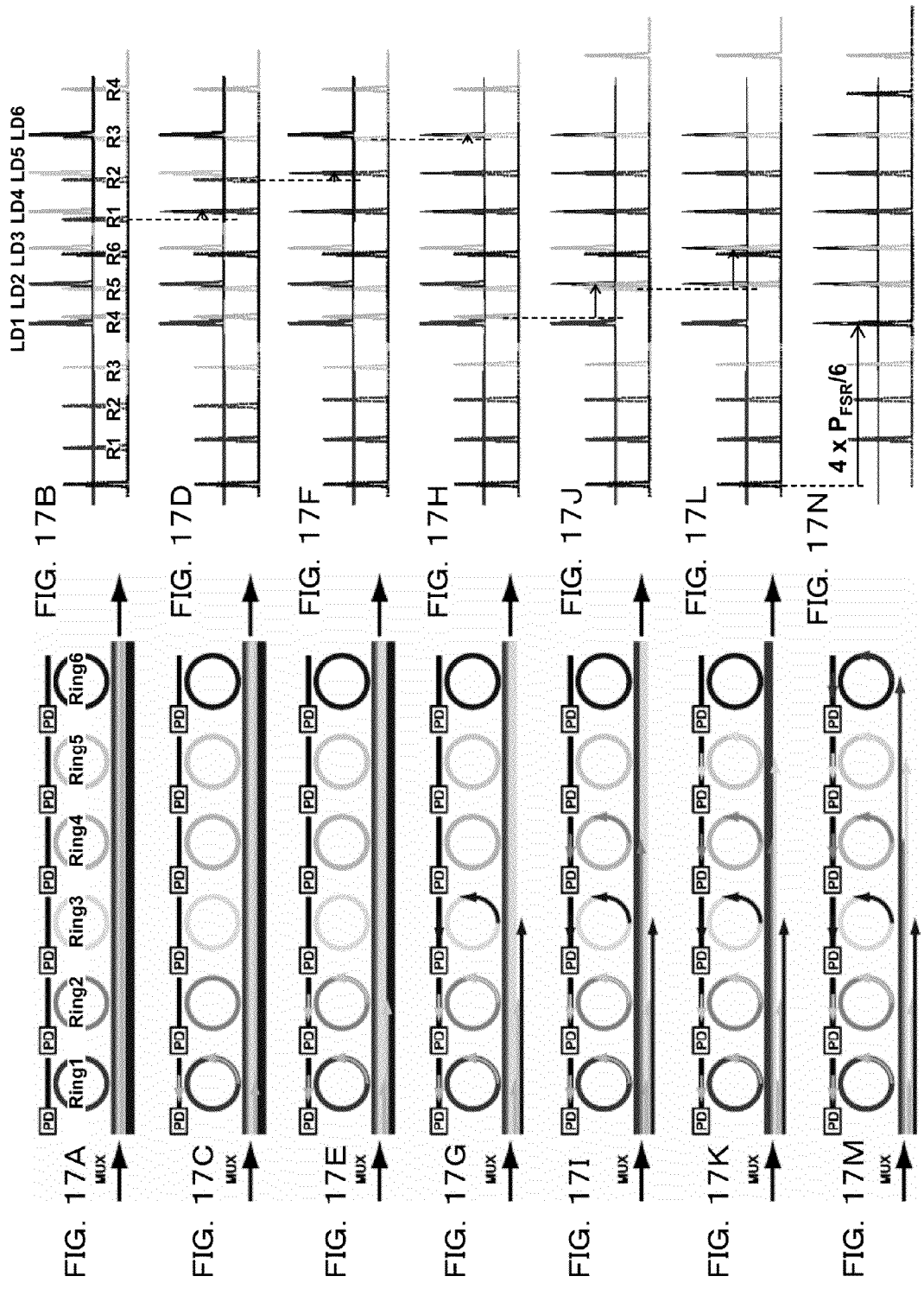
FIGS. 17A to 17N are views illustrating a procedure of the resonance wavelength adjustment control in the optical resonator apparatus (optical modulation apparatus) according to the first embodiment taking, as an example, a procedure of the resonance wavelength adjustment control (resonance spectrum adjustment) where six input lights having wavelengths that are different from each other are inputted to six ring optical resonators (ring optical modulators) and depicting the procedure in a case in which an inter-channel occurs.

In particular, if the resonance wavelengths of the two ring optical modulators Ring4 and Ring5 are placed between the input light of the wavelength λ1 outputted from the laser LD1 and the input light of the wavelength λ2 outputted from the laser LD2 and an inter-channel occurs as depicted in FIG. 16, then neither the resonance wavelength of the ring optical modulator Ring3 nor the resonance wavelength of the ring optical modulator Ring4 can be adjusted to the input light wavelength λ1 outputted from the laser LD1. As a result, the resonance wavelength of the ring optical modulator Ring6 is adjusted to the input light wavelength λ1 outputted from the laser LD1. In particular, if the resonance wavelength of the ring optical modulator Ring6 is adjusted first so that the light intensity appearing at the drop port becomes maximum, then the resonance wavelength of the ring optical modulator Ring6 is adjusted so as to match with the input light wavelength λ1 outputted from the laser LD1.

In this case, the current amount necessary for the resonance wavelength adjustment control for the ring optical modulator Ring6 for which the resonance wavelength adjustment control has been performed last, namely, the necessary power consumption, increases exceeding that for any other ring optical modulator. For example, the power consumption necessary for the resonance wavelength adjustment control for the ring optical modulator Ring6 for which the resonance wavelength adjustment control has been performed last becomes $4 \times P_{FSR}/6$ and increases exceeding that of any other ring optical modulator.

If an inter-channel occurs in this manner, then a toll comes to the ring optical modulator 9 for which the resonance wavelength adjustment control has been performed last, and very high power consumption is required only for one channel. In this case, since only the ring optical modulator 9 just described is heated intensively, the reliability of the entire system remarkably degrades.

Therefore, it is decided whether or not an inter-channel occurs, and, if it is decided that an inter-channel occurs, then the re-resonance wavelength adjustment control described above is performed.

First, in the present embodiment, since a toll comes intensively to the ring optical modulator 9 for which the resonance wavelength adjustment control has been performed last and the power consumption necessary for the adjustment control increases exceeding that of any other channel, a certain threshold value (for example, $P_{FSR}/N \times 1.5$ or the like) is set and it is decided whether or not the value of the power consumption is equal to or higher than the threshold value to decide whether or not an inter-channel occurs. In particular, it is decided whether or not the power consumption (current amount) required for the resonance wavelength adjustment control for the ring optical modulator 9 for which the resonance wavelength adjustment control has been performed last is lower than certain power consumption (certain current amount). Then, if it is decided that the power consumption is equal to or higher than certain power consumption (certain current amount), then it is decided that an inter-channel occurs.

Then, if it is decided that an inter-channel occurs, then the re-resonance wavelength adjustment control for adjusting the resonance wavelength of the first ring optical modulator Ring (1) from the light input side from among the plurality of ring optical modulators 9 to the long wavelength side so as to match with the second-matching input light wavelength and then adjusting the resonance wavelengths of the second and succeeding ring optical modulators Ring(2) to Ring(N) from the light input side to the long wavelength side so as to match with a first-matching input light wavelength is performed.

Here, the re-resonance wavelength adjustment control is described with reference to FIGS. 18 and 19A to 19N taking, as an example, a case in which, for example, WDM input light including six input lights having wavelengths λ1 to λ6 that are different from each other and outputted from the six lasers LD1 to LD6 included in the laser array light source 1 is inputted to the ring optical modulators Ring1 to Ring6 having resonance wavelengths that are different from each other and besides the resonance wavelengths of the two ring optical modulators Ring4 and Ring5 are placed between the input light having the wavelength λ1 outputted from the laser LD1 and the input light of the wavelength λ2 outputted from the laser LD2 and consequently an inter-channel occurs.

In this case, as depicted in FIG. 19A, the six ring optical modulators Ring1 to Ring6 are disposed in order from the light input side and an inter-channel occurs, and the relationship between the spectrum of the WDM input light and the spectrum of the ring optical modulator is such as depicted in FIG. 19B. This indicates a state before the resonance wavelength adjustment.

On the other hand, if the resonance wavelength of the first ring optical modulator Ring1 (R1) from the light input side is adjusted first to the long wavelength side as depicted in FIGS. 19C and 19D so as to match with a second-matching input light wavelength, then the resonance wavelength is matched with the input light having the wavelength λ5 outputted from the laser LD5.

Then, if the resonance wavelength of the second ring optical modulator Ring2 (R2) from the light input side is adjusted to the long wavelength side so as to match with a first-matching input light wavelength as depicted in FIGS. 19E and 19F, then the resonance wavelength is matched with the input light having the wavelength λ6 and outputted from the laser LD6. Further, if the resonance wavelength of the third ring optical modulator Ring3 (R3) from the light input side is adjusted to the long wavelength side so as to match with the first-matching input light wavelength as depicted in FIGS. 19G and 19H, then the resonance wavelength is matched with the input light having the wavelength λ1 and outputted from the laser LD1. Then, if the resonance wavelength of the fourth ring optical modulator Ring4 (R4) from the light input side is adjusted to the long wavelength side so as to match with the first-matching input light wavelength as depicted in FIGS. 19I and 19J, then the resonance wavelength is matched with the input light having the wavelength λ2 and outputted from the laser LD2. Further, if the resonance wavelength of the fifth ring optical modulator Ring5 (R5) from the light input side is adjusted to the long wavelength side so as to match with the first-matching input light wavelength as depicted in FIGS. 19K and 19L, then the resonance wavelength is matched with the input light having the wavelength λ3 and outputted from the laser LD3. Further, if the resonance wavelength of the sixth ring optical modulator Ring6 (R6) from the light input side is adjusted to the long wavelength side so as to match with the first-matching input light wavelength as depicted in FIGS. 19M and 19N, then the resonance wavelength is matched with the input light having the wavelength λ4 and outputted from the laser LD4.

Figure 18:
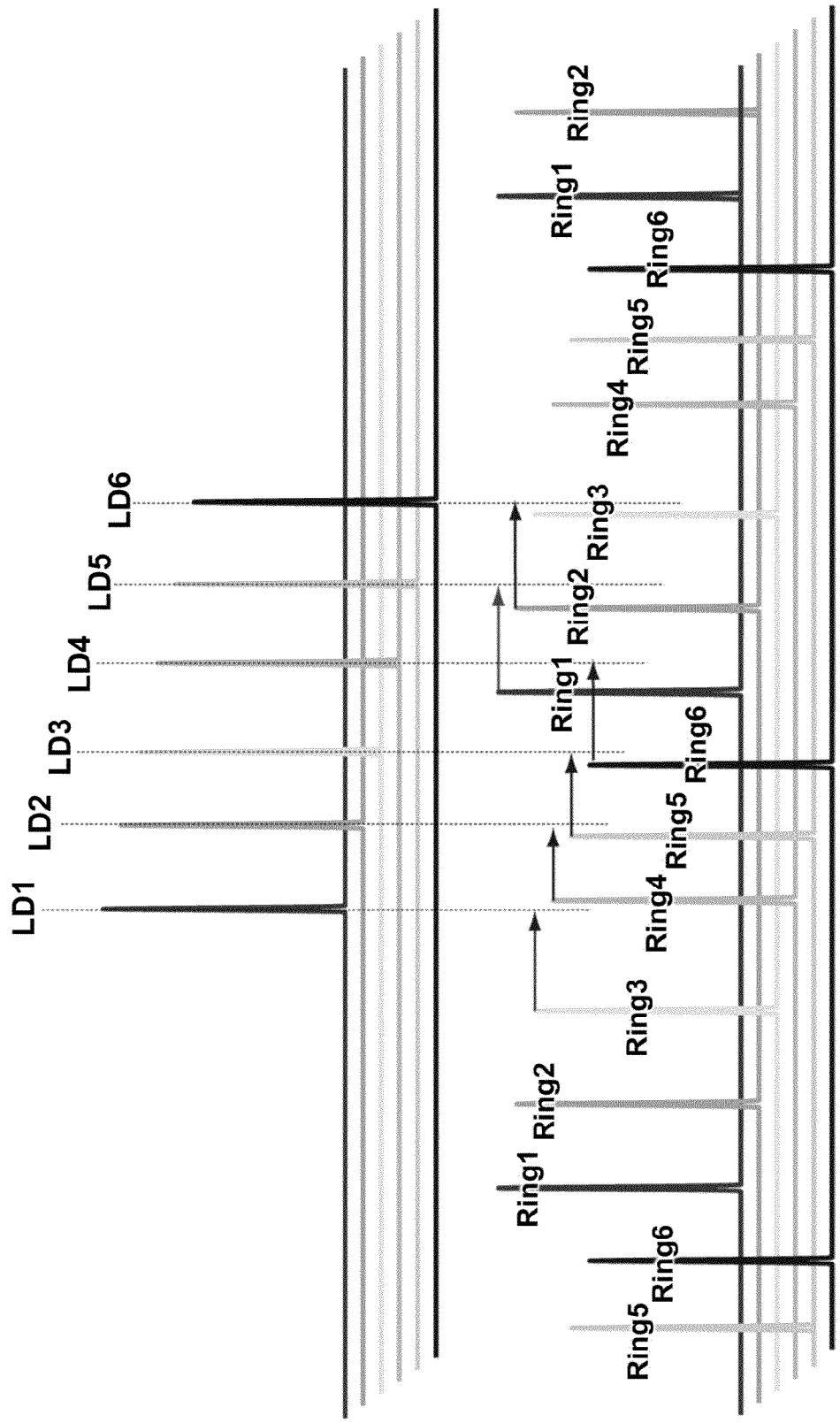
FIG. 18 is a view illustrating re-resonance wavelength adjustment control in the optical resonator apparatus (optical modulation apparatus) according to the first embodiment taking, as an example, re-resonance wavelength adjustment control (re-resonance spectrum adjustment) where six input lights having wavelengths that are different from each other are inputted to six ring optical resonators (ring optical modulators)
Figure 19:
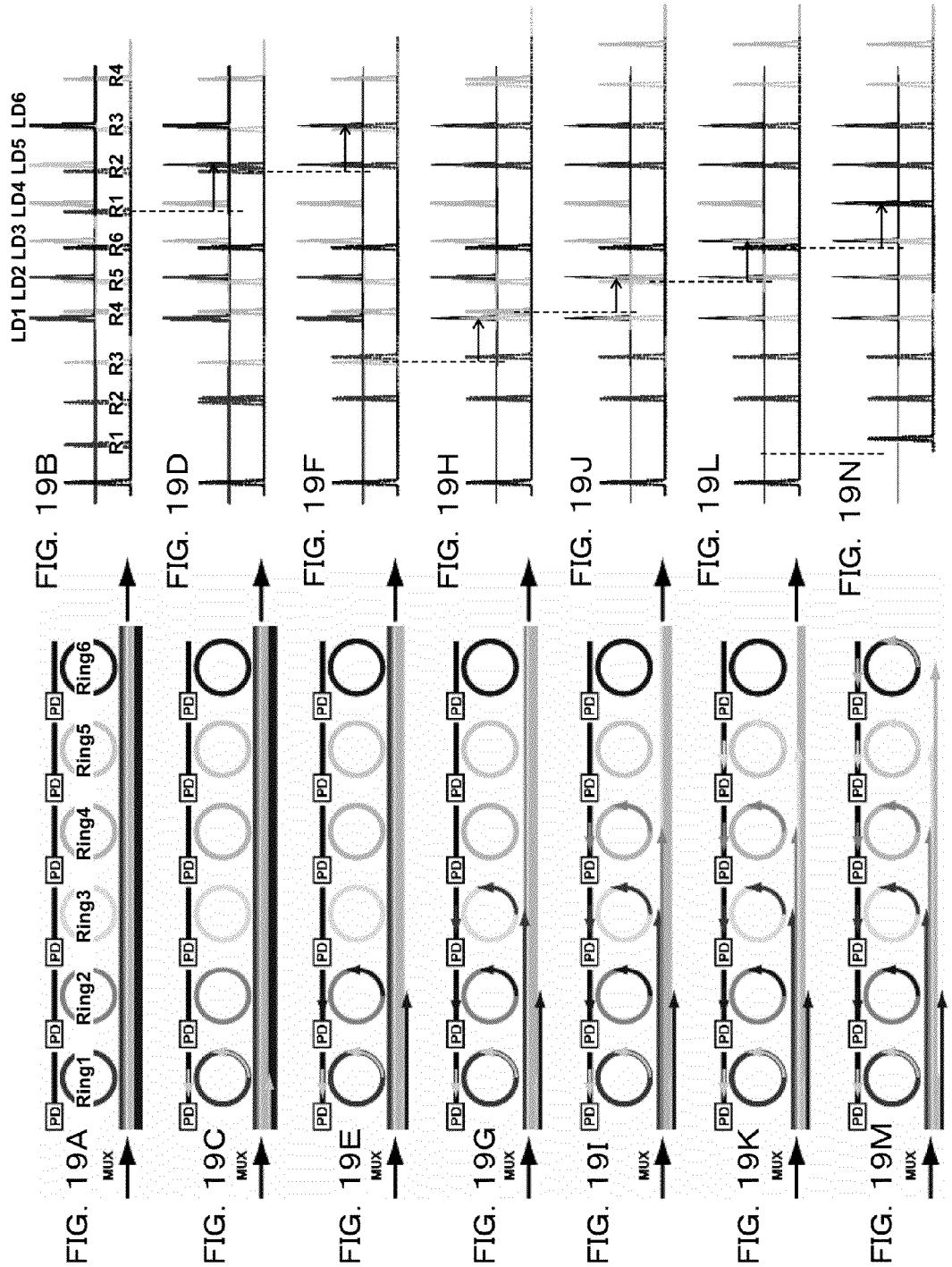
FIGS. 19A to 19N are views illustrating the re-resonance wavelength adjustment control in the optical resonator apparatus (optical modulation apparatus) according to the first embodiment taking, as an example, the re-resonance wavelength adjustment control (re-resonance spectrum adjustment) where six input lights having wavelengths that are different from each other are inputted to six ring optical resonators (ring optical modulators)

In this manner, when it is decided that an inter-channel occurs, as depicted in FIG. 18, the resonance wavelength of the first ring optical modulator Ring1 from the light input side is adjusted first to the long wavelength side so as to match with a second-appearing peak from among peaks of the light intensity monitored by the photodetector 21. Consequently, the resonance wavelength of the ring optical modulator Ring1 is matched not the input light wavelength λ4 outputted from the laser LD4 but with the input light wavelength λ5 outputted from the laser LD5.

Thereafter, the resonance wavelengths of the second and succeeding ring optical modulators Ring2 to Ring6 from the light input side are adjusted in order to the long wavelength side and then each of the resonance wavelengths is matched with a first-appearing peak from among peaks of the light intensity monitored by the photodetector 21. Consequently, the resonance wavelength of the ring optical modulator Ring2 is matched with the input light wavelength λ6 outputted from the laser LD6, the resonance wavelength of the ring optical modulator Ring3 is matched with the input light wavelength λ1 outputted from the laser LD1, the resonance wavelength of the ring optical modulator Ring4 is matched with the input light wavelength λ2 outputted from the laser LD2, the resonance wavelength of the ring optical modulator Ring5 is matched with input light wavelength λ3 outputted from the laser LD3, and the resonance wavelength of the ring optical modulator Ring6 is matched with the input light wavelength λ4 outputted from the laser LD4.

In this manner, in regard to the second and succeeding ring optical modulators Ring2 to Ring6 from the light input side, by simply adjusting the resonance wavelength to a first-appearing peak, each of the resonance wavelengths of the second and succeeding ring optical modulator Ring2 to Ring6 from the light input side can be matched with the respective input light wavelength. This is because, if the resonance wavelength of the ring optical modulator is matched with the input light wavelength in order beginning with the ring optical modulator provided at the light input side, then the input light propagates to the drop port side of the ring optical modulator and consequently does not propagate to the ring optical modulators positioned at the light output side with respect to the ring optical modulator.

For example, if the number of input lights having a plurality of wavelengths that are different from each other is 16 (the number of wavelengths of WDM input light is 16); the wavelength interval thereof is approximately 3.2 nm; the deviation $\delta_{LD}$ thereof is approximately 0.1 nm; and the deviation $\delta_{ring}$ of the resonance wavelength intervals of the plurality of ring optical modulators 9 is approximately 0.1 nm, then an inter-channel occurs with a probability of approximately 15%. Even if an inter-channel occurs with such a high probability as just described, if the re-resonance wavelength adjustment control described above is performed, then the resonance wavelengths of all of the ring optical modulators 9 can be suitably allocated to the input light wavelengths (WDM input light channels). Then, the expected value of the power consumption necessary for the resonance wavelength adjustment control for each of the plurality of ring optical modulators 9 when the ring optical modulators 9 are allocated to the input light wavelengths is approximately 1.08 mW, and this is an increment of approximately 15% even if it is compared with the expected value described above of approximately 0.94 mW of the power consumption where an inter-channel does not occur. Therefore, the power consumption necessary for the resonance wavelength adjustment control can be maintained sufficiently low.

In this manner, by performing the re-resonance wavelength adjustment control when it is decided that an inter-channel occurs, such a situation that the wavelength controlling amount of the resonance wavelength adjustment control for the ring optical modulator 9 for which the resonance wavelength adjustment control has been performed last, namely, the current amount (power consumption) necessary for the resonance wavelength adjustment control, increases exceeding that of any other ring optical modulator 9 can be reduced.

Now, control (controlling method for an optical modulator; controlling method for an optical resonator) by the controller 3 provided in the optical transmitter (optical modulation apparatus; optical resonator apparatus) according to the present embodiment is described.

In the present embodiment, the controller 3 performs the re-resonance wavelength adjustment control when it is decided that an inter-channel occurs after the resonance wavelength adjustment control is performed.

In particular, the controller 3 first performs the resonance wavelength adjustment control for adjusting the resonance wavelengths of the plurality of ring optical modulators 9 so as to match with the input light wavelengths of a plurality of input lights having wavelengths that are different from each other in order beginning with the ring optical modulator 9 provided at the most light input side from among the plurality of ring optical modulators 9 provided in the optical modulation unit (optical resonance unit) 2 of the optical transmitter 30 (optical modulation apparatus; optical resonator apparatus) configured in such a manner as described above.

Then, if it is decided that an inter-channel occurs, then the controller 3 performs the re-resonance wavelength adjustment control for adjusting the resonance wavelength of the first ring optical modulator 9 from the light input side from among the plurality of ring optical modulators 9 so as to match with a second-matching input light wavelength and adjusting the resonance wavelengths of the second and succeeding ring optical modulators 9 from the light input side so as to match with a first-matching input light wavelength thereby to adjust the resonance wavelengths of the plurality of ring optical modulators 9 in order beginning with the ring optical modulator 9 provided at the most light input side from among the plurality of ring optical modulators 9 so as to match with the input light wavelengths of the plurality of input lights having wavelengths that are different from each other.

Especially, the controller 3 preferably decides that an inter-channel occurs when the current amount (power consumption) necessary for the resonance wavelength adjustment control for the ring optical modulator 9 for which the resonance wavelength adjustment control has been performed last in the resonance wavelength adjustment control is equal to or higher than a certain current amount (certain power consumption).

Further, the round-trip lengths of the ring optical waveguides 6 of the plurality of ring optical modulators 9 increase in order from the light input side to the light output side, and the controller 3 preferably adjusts, in the resonance wavelength adjustment control and the re-resonance wavelength adjustment control, the resonance wavelengths of the plurality of ring optical modulators 9 to the long wavelength side so as to match with the input light wavelengths of the plurality of input lights having wavelengths that are different from each other.

In the following, the control by the controller 3 is described particularly with reference to FIG. 20.

It is to be noted that this control is performed, for example, every time the optical transmitter is started up (every time the power supply is made available), and the optical transmitter (optical modulation apparatus) is initialized.

First, the controller 3 executes a sequence (denoted by reference character X in FIG. 20) in which resonance wavelength adjustment control is performed in order beginning with the ring optical modulator 9 provided at the most light input side.

In particular, the controller 3 first turns on all lasers LD(1) to LD (N) included in the laser array light source 1 with a certain current value (step S10).

Then, the controller 3 sets x to x=1 (step S20) and powers up the heater power supply so that current is supplied from the heater power supply to the resonance wavelength adjustment electrode 8 (heater electrode 8X) of the ring optical modulator Ring(1) provided at the most light input side to adjust the resonance wavelength of the ring optical modulator Ring(1) (step S30). Here, the photodetector PD(1) coupled to the ring optical modulator Ring(1) outputs a monitor value $P_{mon}(1)$ to the controller 3 in response to a variation of the resonance wavelength of the ring optical modulator Ring(1). To this end, the controller 3 adjusts the current amount (power; heater power) to be supplied to the ring optical modulator Ring(1) so that the monitor value $P_{mon}(1)$ has a maximum value. Here, the current amount (heater power) to be supplied to the ring optical modulator Ring(1) is gradually increased to gradually shift the resonance wavelength of the ring laser array light source 1 to the long wavelength side. Then, when the monitor value $P_{mon}(1)$ exhibits a maximum value, the resonance wavelength adjustment control for the ring optical modulator Ring(1) is completed and the ring optical modulator Ring(1) is locked. In this case, the resonance wavelength of the ring optical modulator Ring(1) is matched with the wavelength of a first-appearing peak of the light intensity monitored by the photodetector PD(1).

Thereafter, it is decided whether x=N is satisfied (step S40). If x=N is not satisfied, then x is set to x=x+1 (step S50), whereafter the processing returns to step S30 to repeat similar processes until it is decided that x=N is satisfied. In other words, similarly as in the resonance wavelength adjustment control for the ring optical modulator Ring(1) provided at the most light input side described above, the resonance wavelength adjustment control for the second to the Nth ring optical modulators Ring(2) to Ring(N) from the light input side is performed in order.

Figure 20:
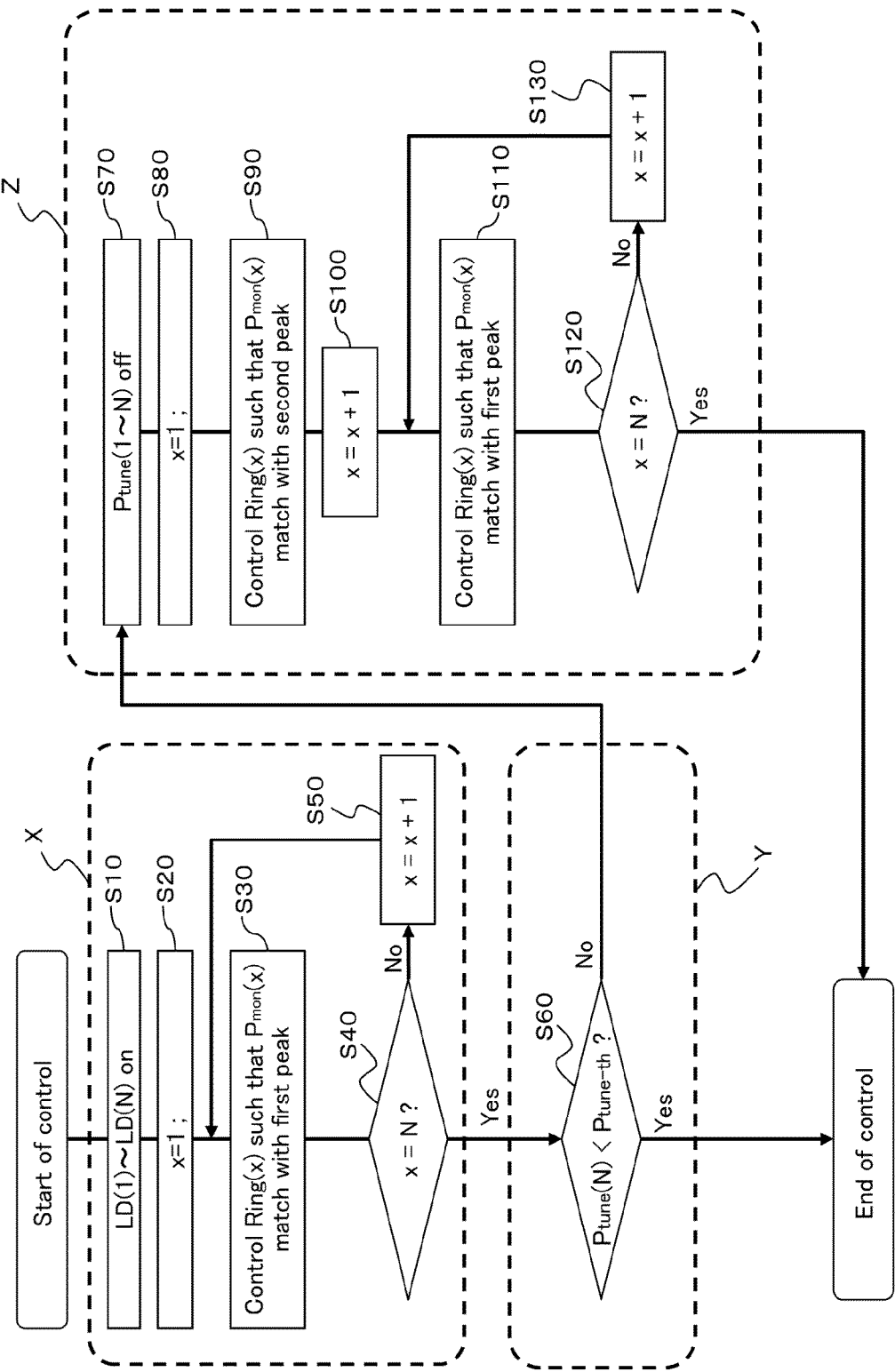
FIG. 20 is a flow chart illustrating control (controlling method for an optical resonator; a controlling method for an optical modulator) in the optical resonator apparatus (optical modulation apparatus) and an optical transmitter according to the first embodiment.

Then, if it is decided that x=N is satisfied, namely, if the resonance wavelength adjustment control for the Nth ring optical modulator Ring(N) that is the last ring optical modulator, then this sequence (denoted by reference character X in FIG. 20) is ended, and the processing advances to a next sequence (denoted by reference character Y in FIG. 20).

Then, the controller 3 executes an inter-channel decision sequence (denoted by reference character Y in FIG. 20). In particular, the controller 3 executes a sequence for checking whether the resonance wavelengths of all ring optical modulators 9 coupled in cascade connection appropriately correspond to the individual input light wavelengths, namely, whether an inter-channel occurs.

In particular, if it is decided at step S40 described hereinabove that x=N is satisfied, then the controller 3 decides whether or not the power value $P_{tune}(N)$ required for the resonance wavelength adjustment control for the Nth ring optical modulator Ring(N) for which the controller 3 has performed the resonance wavelength adjustment control last is lower than a threshold value $P_{tune-th}$ (for example, $P_{FSR}/N \times 1.5$ or the like) (step S60).

If it is decided as a result of the decision that the power value $P_{tune}(N)$ required for the resonance wavelength adjustment control for the Nth ring optical modulator Ring(N) is lower than the threshold value $P_{tune-th}$, then the controller 3 decides that an inter-channel does not occur and ends the control. In this case, by performing the resonance wavelength adjustment control for adjusting the resonance wavelength of a ring optical modulator to the long wavelength side so as to match with an input light wavelength in order beginning with the ring optical modulator Ring(1) provided at the most light input side, the resonance wavelengths of all of the ring resonators Ring(1) to Ring(N) are matched with the input light wavelengths individually at the nearest longer wavelength side. Consequently, the power consumption required for the resonance wavelength adjustment control for the ring resonators Ring(1) to Ring(N) can be lowered sufficiently, and therefore, the controller 3 ends the control without performing re-resonance wavelength adjustment control hereinafter described.

On the other hand, if it is decided that the power value $P_{tune}(N)$ required for the resonance wavelength adjustment control for the Nth ring optical motor Ring(N) is equal to or higher than the threshold value $P_{tune-th}$, then the controller 3 decides that an inter-channel occurs and ends this sequence (denoted by reference character Y in FIG. 20) and then advances the processing to a next sequence (denoted by reference character Z in FIG. 20) for performing re-resonance wavelength adjustment control.

Further, if it is decided as a result of execution of the inter-channel decision sequence (denoted by Y in FIG. 20) described above that an inter-channel occurs, then the controller 3 executes a sequence (denoted by reference character Z in FIG. 20) for performing re-resonance wavelength adjustment control.

In particular, if it is decided at step S60 described hereinabove that the power value $P_{tune}(N)$ required for the resonance wavelength adjustment control for the Nth ring optical modulator Ring(N) is equal to or higher than the threshold value $P_{tune-th}$, then the controller 3 executes the sequence (denoted by reference character Z in FIG. 20) for performing the re-resonance wavelength adjustment control.

Here, the controller 3 first places the control state of all of the ring optical modulators 9 into an off state (step S70). In particular, since the ring resonators Ring(1) to Ring(N) are locked in a state in which the power values $P_{tune}(1)$ to $P_{tune}(N)$ are supplied thereto, respectively, as a result of the re-resonance wavelength adjustment control performed therefor, the controller 3 turns off the ring resonators Ring(1) to Ring(N) to reset the power values $P_{tune}(1)$ to $P_{tune}(N)$.

Then, the controller 3 sets x to x=1 (step S80) and powers up the heater power supply to supply current to the resonance wavelength adjustment electrode (heater electrode) of the ring optical modulator Ring(1) provided at the most light input side to adjust the resonance wavelength of the ring optical modulator Ring(1) (step S90). Here, the controller 3 adjusts the current amount (heater power) to be supplied to the ring optical modulator Ring(1) until the monitor value $R_{mon}(1)$ exhibits a maximum value twice. In particular, the current amount (heater power) to be supplied to the ring optical modulator Ring(1) is gradually increased to gradually shift the resonance wavelength of the ring optical modulator Ring(1) to the long wavelength side. Then, when the monitor value $P_{mon}(1)$ passes a maximum value (peak) for the first time and then exhibits a maximum value (peak) for the second time, the controller 3 completes the resonance wavelength adjustment control for the ring optical modulator Ring(1) and locks the ring optical modulator Ring(1). In this case, the resonance wavelength of the ring optical modulator Ring(1) is matched with one of peaks of the light intensity monitored by the photodetector PD(1) which appears for the second time.

Thereafter, the controller 3 sets x to x=x+1 (step S100) and powers up the heater power supply to supply current from the heater power supply to the resonance wavelength adjustment electrode (heater electrode) of the ring optical modulator Ring(2) provided at the second position from the light input side to adjust the resonance wavelength of the ring optical modulator Ring(2) (step S110). Here, the controller 3 adjusts the current amount (power; heater power) to be supplied to the ring optical modulator Ring(2) so that the monitor value $P_{mon}(2)$ exhibits a maximum value. In particular, the current amount (heater power) to be supplied to the ring optical modulator Ring(2) is gradually increased to gradually shift the resonance wavelength of the ring optical modulator Ring(2) to the long wavelength side. Then, if the monitor value $P_{mon}(2)$ exhibits a maximum value, then the controller 3 completes the resonance wavelength adjustment control for the ring optical modulator Ring(2) and locks the ring optical modulator Ring(2). In this case, the resonance wavelength of the ring optical modulator Ring(2) is matched with one of peaks of the light intensity monitored by the photodetector PD(2) which appears for the first time.

Thereafter, it is decided whether x=N is satisfied (step S120). If x=N is not satisfied, then the controller 3 sets x to x=x+1 (step S130) and returns the processing to step S110 to repeat similar processes until it is decided that x=N is satisfied. In particular, the controller 3 performs the resonance wavelength adjustment control for the third to Nth ring optical modulators Ring(3) to Ring(N) in order similarly as in the resonance wavelength adjustment control for the ring optical modulator Ring(2) provided at the second position from the light input side described hereinabove.

Then, if it is decided that x=N is satisfied, namely, if the resonance wavelength adjustment control for the Nth ring optical modulator Ring(N) that is the last ring optical modulator, then the controller 3 ends this sequence (denoted by reference character Z in FIG. 20) and thereby ends the control.

By performing such control as described above, it can be decided whether or not an inter-channel occurs. Further, when an inter-channel occurs, by performing the re-resonance wavelength adjustment control described above, the resonance wavelengths of all of the ring optical modulators 9 can be appropriately allocated to the individual input light wavelengths (WDM input light channels) with low power consumption. By performing the re-resonance wavelength adjustment control when it is decided that an inter-channel occurs in this manner, it is possible to control the current amount (power consumption) necessary for the resonance wavelength adjustment control for the ring optical modulator 9 for which the resonance wavelength adjustment control has been performed last so that the current amount may not become greater than that of any other ring optical modulator.

Accordingly, with the optical modulation apparatus (optical resonator apparatus), optical transmitter and controlling method for an optical modulator (optical resonator) according to the present embodiment, there is an advantage that, when a plurality of input lights having wavelengths that are different from each other are inputted to a plurality of ring optical modulators (ring optical resonators) coupled in cascade connection to reduce a required current amount (power consumption), it is possible to control the current amount (power consumption) necessary for the resonance wavelength adjustment control for the ring optical modulator (ring optical resonator) for which the resonance wavelength adjustment control has been performed last so that the current amount (power consumption) may not become greater than the current amount of any other ring optical modulator (ring optical resonator).

Second Embodiment

An optical resonator apparatus, an optical transmitter and a controlling method for an optical resonator according to a second embodiment are described with reference to FIGS. 21 and 22.

In the present embodiment, the optical resonator apparatus, the optical transmitter including the optical resonator apparatus and the controlling method for an optical resonator are described taking an optical modulation apparatus, an optical transmitter including the optical modulator apparatus and a controlling method for an optical modulator as an example, respectively.

The optical modulation apparatus, optical transmitter and controlling method for an optical modulator according to the present embodiment are different in the decision method of whether or not an inter-channel occurs from those of the first embodiment described hereinabove.

In particular, in the first embodiment described hereinabove, the controller 3 decides that an inter-channel occurs when the current amount (power consumption) required for the resonance wavelength adjustment control for the ring optical modulator for which the resonance wavelength adjustment control has been performed last in the resonance wavelength adjustment control is equal to or greater than a certain current amount (certain power consumption).

In contrast, in the present embodiment, the controller 3 decides that an inter-channel occurs in a case in which, when the resonance wavelength of a ring optical modulators 9 is adjusted to an input light wavelength in the resonance wavelength adjustment control, the ordinal number (turn) of the ring optical modulator 9 and the ordinal number (turn) of the input light wavelength do not match with each other or in another case in which the current amount (power consumption) required for the resonance wavelength adjustment control for the ring optical modulator 9 for which the resonance wavelength adjustment control has been performed last in the resonance wavelength adjustment control is equal to or greater than a certain current amount (certain power consumption).

The reason why such a decision method as just described is adopted in the present embodiment is described below.

In particular, only if it is decided that an inter-channel occurs when the current amount (power consumption) required for the resonance wavelength adjustment control for the ring optical modulator 9 for which the resonance wavelength adjustment control has been performed last is equal to or greater than a certain current amount (certain power consumption) as in the first embodiment described hereinabove, since the current amount (power consumption) required for the resonance wavelength adjustment control for the ring optical modulator 9 for which the resonance wavelength adjustment control has been performed last relies upon the dispersion in resonance wavelength interval of the plurality of ring optical modulators 9 and the dispersion in wavelength interval between a plurality of input lights having wavelengths that are different from each other (wavelength interval between the wavelengths of the WDM input light), there is the possibility that, in a fabrication environment in which the dispersions are great or in a state in which the dispersion cannot be estimated correctly, the dispersions may have an influence on the yield or the quality.

Here, in a state in which an inter-channel does not occur (refer to FIG. 14), the resonance wavelength of each of the ring optical modulators 9 is matched in order with an input light wavelength. For example, if the resonance wavelength of the ring optical modulator Ring(1) positioned at the first position from the light input side is matched with the input wavelength $\lambda 4$ outputted from the laser LD4 as depicted in FIG. 14, then the resonance wavelength of the ring optical modulator Ring(2) positioned at the second position at the longer wavelength side by one channel is matched with the input light wavelength $\lambda 5$ outputted from the laser LD5 at the longer wavelength side by one channel. Further, the resonance wavelength of the ring optical modulator Ring3 positioned at the third position at the longer wavelength side by one channel is matched with the input light wavelength $\lambda 6$ outputted from the laser LD6 of the longest wavelength at the longer wavelength side by one channel. Further, the resonance wavelength of the ring optical modulator Ring4 positioned at the fourth position at the longer wavelength side by one channel is matched with the input light wavelength $\lambda 1$ outputted from the laser LD1 of the shortest wavelength. Further, the resonance wavelength of the ring optical modulator Ring5 positioned at the fifth position at the longer wavelength side by one channel is matched with the input light wavelength $\lambda 2$ outputted from the laser LD2 at the longer wavelength side by one channel. Then, the resonance wavelength of the ring optical modulator Ring6 positioned at the sixth position at the longer wavelength side by one channel is matched with the input light wavelength $\lambda 3$ outputted from the laser LD3 at the longer wavelength side by one channel. In this manner, when the resonance wavelengths of the ring optical modulators 9 are matched with the input light wavelengths in the resonance wavelength adjustment control, the ordinal number (sequential order) of the ring optical modulators 9 and the ordinal number (sequential order) of the input light wavelengths coincide with each other.

Therefore, when the resonance wavelength of a ring optical modulator 9 is adjusted to an input light wavelength in the resonance wavelength adjustment control, if the ordinal number of the ring optical modulator 9 and the ordinal number of the input light wavelength do not match with each other, then this signifies that an inter-channel occurs.

Thus, in the present embodiment, in addition to the decision of whether or not an inter-channel occurs in the first embodiment described hereinabove, also in the case wherein it is decided that the ordinal number of the ring optical modulators 9 and the ordinal number of the input wavelengths do not coincide with each other, it is decided that an inter-channel occurs. By such decision, it is possible to decide more strictly whether or not an inter-channel occurs. It is to be noted that whether or not the ordinal number of the ring optical modulators 9 and the ordinal number of the input light wavelengths coincide with each other is equivalent to whether or not the order of the ring optical modulator 9 and the order of the input light wavelength coincide with each other.

In the following, more particular description is given with reference to FIG. 21.

It is to be noted that, in the present embodiment, an additional inter-channel decision sequence included in an inter-channel decision sequence (denoted by reference character Y in FIG. 21) is incorporated in a sequence (denoted by reference character X in FIG. 21) in which the resonance wavelength adjustment control is performed in order beginning with the ring optical modulator provided at the most light input side.

Figure 21:
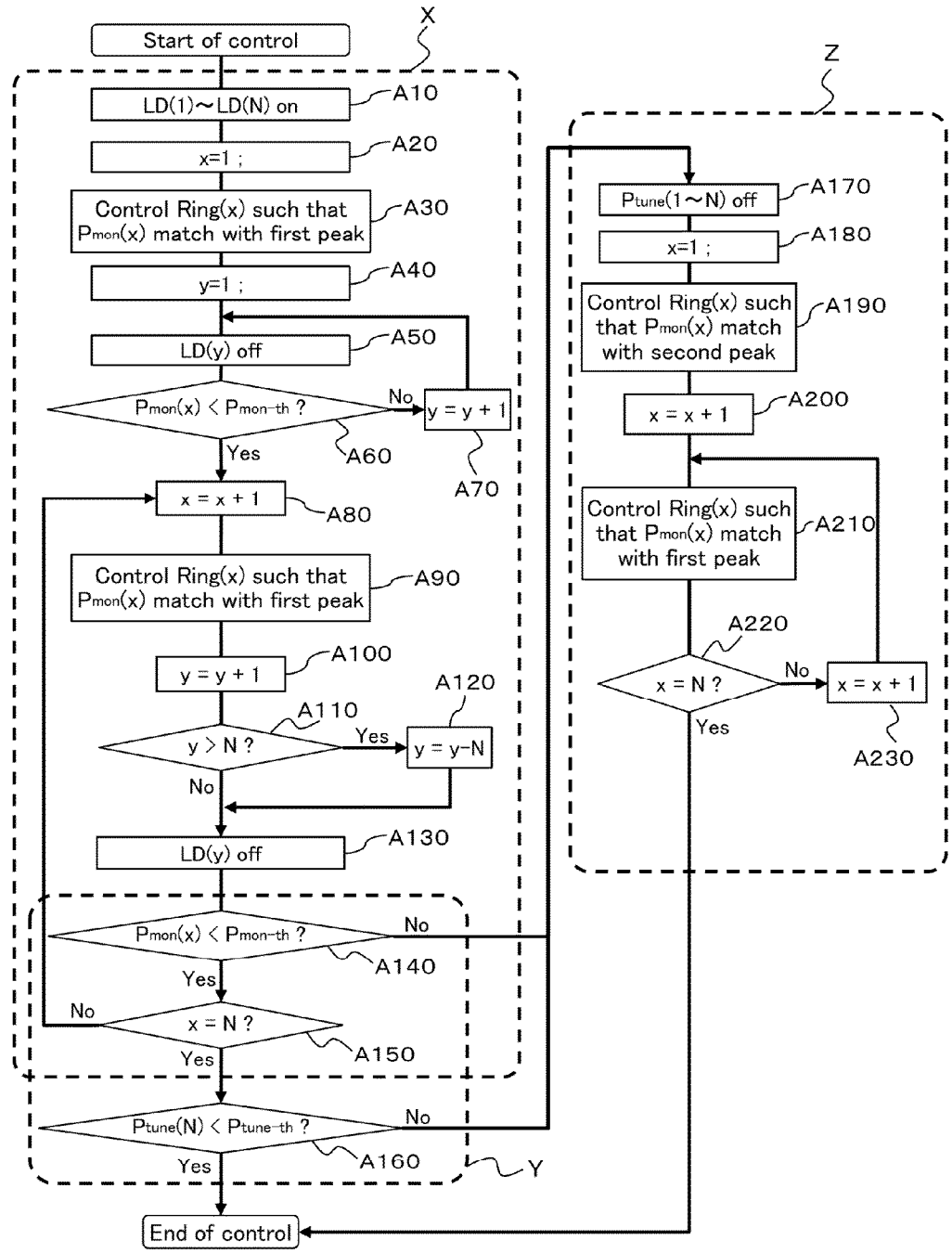
FIG. 21 is a flow chart illustrating control (controlling method for an optical resonator; a controlling method for an optical modulator) in an optical resonator apparatus (optical modulation apparatus) and an optical transmitter according to a second embodiment.

First, the controller 3 executes a sequence of performing the resonance wavelength adjustment control in order beginning with the ring optical modulator 9 provided at the most input light side and an additional inter-channel decision sequence (denoted by reference character X in FIG. 21).

In particular, the controller 3 first turns on all lasers LD(1) to LD (N) included in the laser array light source 1 with a certain current value (step A10).

Then, the controller 3 sets x to x=1 (step A20) and powers up the heater power supply so that current is supplied from the heater power supply to the resonance wavelength adjustment electrode (heater electrode) of the ring optical modulator Ring(1) provided at the most light input side to adjust the resonance wavelength of the ring optical modulator Ring(1) (step A30). Here, the photodetector PD(1) coupled to the ring optical modulator Ring(1) outputs a monitor value $P_{mon}(1)$ to the controller 3 in response to a variation of the resonance wavelength of the ring optical modulator Ring(1). Consequently, the controller 3 adjusts the current amount (power; heater power) to be supplied to the ring optical modulator Ring(1) so that the monitor value $P_{mon}(1)$ exhibits a maximum value. Here, the current amount (heater power) to be supplied to the ring optical modulator Ring(1) is gradually increased to gradually shift the resonance wavelength of the ring optical modulator Ring(1) to the long wavelength side. Then, when the monitor value $P_{mon}(1)$ exhibits a maximum value, the resonance wavelength adjustment control for the ring optical modulator Ring(1) is completed and the ring optical modulator Ring(1) is locked. In this case, the resonance wavelength of the ring optical modulator Ring(1) is matched with the wavelength of a first-appearing peak of the light intensity monitored by the photodetector PD(1).

Then, the controller 3 sets y to y=1 (step A40) and turns off the laser LD1 (step A50), and then decides whether or not the monitor value $P_{mon}(1)$ has become lower than the threshold value $P_{mon-th}$ (for example, approximately value of dark current+α) (step A60).

Here, if the resonance wavelength of the ring optical modulator Ring(1) matches with the wavelength of the input light from the laser LD1, then the input light from the laser LD1 is drawn into the ring optical modulator Ring(1) and inputted to the photodetector PD(1). Therefore, when the laser LD1 is turned off, if the monitor value $P_{mon}(1)$ becomes lower than the threshold value $P_{mon-th}$, namely, if the monitor value $P_{mon}(1)$ decreases approximately to a value of the dark current, then the input light from the laser LD1 is drawn into the ring optical modulator Ring(1) and inputted to the photodetector PD(1). In other words, the resonance wavelength of the ring optical modulator Ring(1) is matched with the wavelength of the input light from the laser LD1.

If it is decided as a result of the decision that the monitor value $P_{mon}(1)$ is not lower than the threshold value $P_{mon-th}$, then the controller 3 sets y to y=y+1 (step A70), and then returns the processing to step A50. At step A50, the controller 3 turns off the laser LD2 and decides whether or not the monitor value $P_{mon}(1)$ is lower than the threshold value $P_{mon-th}$ (for example, approximately value of dark current+α) (step A60). Thereafter, similar processes are repeated until it is decided that the monitor value $P_{mon}(1)$ is lower than the threshold value $P_{mon-th}$.

Then, when it is decided that the monitor value $P_{mon}(1)$ is lower than the threshold value $P_{mon-th}$, the input light from the laser LD(y) that has been turned off at the time is drawn into the ring optical modulator Ring(1) and inputted to the photodetector PD(1). In other words, the resonance wavelength of the ring optical modulator Ring(1) is matched with the wavelength of the input light from the laser LD(y) that has been placed into an off state at the time.

In this manner, the input light wavelength with which the resonance wavelength of the ring optical modulator Ring(1) is matched, namely, the laser (input light wavelength or order of the laser) that outputs the input light of the wavelength, can be specified. In short, a corresponding relationship between the ring optical modulator Ring(1) and the laser can be specified.

For example, if the resonance wavelengths of the two ring optical modulators Ring4 and Ring5 are placed between the input light of the wavelength λ1 outputted from the laser LD1 and the input light of the wavelength λ2 outputted from the laser LD2 and an inter-channel occurs as depicted in FIG. 16, then it is specified that the resonance wavelength of the ring optical modulator Ring(1) positioned at the first position from the light input side is matched with the wavelength λ4 outputted from the laser LD4 and the input light wavelength with which the resonance wavelength of the ring optical modulator Ring(1) is matched is the input wavelength λ4 outputted from the laser LD4.

Then, if it is decided at step A60 that the monitor value $P_{mon}(1)$ is lower than the threshold value $P_{mon-th}$, then the controller 3 increments x to x=x+1 (at this stage, x=2) (step A80) and powers up the heater power supply to supply current from the heater power supply to the resonance wavelength adjustment electrode (heater electrode) of the ring optical modulator Ring(2) provided at the second position from the light input side to adjust the resonance wavelength of the ring optical modulator Ring(2) (step A90). Here, the photodetector PD(2) coupled to the ring optical modulator Ring(2) outputs the monitor value $P_{mon}(2)$ to the controller 3 in response to a variation of the resonance wavelength of the ring optical modulator Ring(2). Therefore, the controller 3 adjusts the current amount (power; heater power) to be supplied to the ring optical modulator Ring(2) so that the monitor value $P_{mon}(2)$ exhibits a maximum value. Here, the current amount (heater power) to be supplied to the ring optical modulator Ring(2) is gradually increased to gradually shift the resonance wavelength of the ring optical modulator Ring(2) to the long wavelength side. Then, if the monitor value $P_{mon}(2)$ exhibits a maximum value, then the controller 3 completes the resonance wavelength adjustment control for the ring optical modulator Ring(2) and locks the ring optical modulator Ring(2). In this case, the resonance wavelength of the ring optical modulator Ring(2) is matched with the wavelength of one of peaks of the light intensity monitored by the photodetector PD(2) which appears for the first time.

For example, if the resonance wavelengths of the two ring optical modulators Ring4 and Ring5 are placed between the input light of the wavelength λ1 outputted from the laser LD1 and the input light of the wavelength λ2 outputted from the laser LD2 and an inter-channel occurs as depicted in FIG. 16, then the resonance wavelength of the ring optical modulator Ring2 positioned at the second position from the light input side is matched with the wavelength λ5 outputted from the laser LD5.

Then, the controller 3 sets y to y=y+1 (step A100) and decides whether y is higher than N (step A110). If it is decided that y is higher than N, then the controller 3 sets y to y=y−N (step A120) and advances the processing to step A130. On the other hand, if it is decided at step A110 that y is equal to or lower than N, then the controller 3 advances the processing directly to step A130. Then at step A130, the controller 3 turns off the laser LD(y).

For example, if the resonance wavelengths of the two ring optical modulators Ring4 and Ring5 are placed between the input light of the wavelength λ1 outputted from the laser LD1 and the input light of the wavelength λ2 outputted from the laser LD2 and an inter-channel occurs as depicted in FIG. 16 and besides it is specified that the input light wavelength with which the resonance wavelength of the ring optical modulator Ring1 is matched as described above is the input light wavelength λ4 outputted from the laser LD4, then since y=4, the controller 3 sets y to y=5 at step A100. Further, in this case, since N=6, it is decided at step A110 that y is not higher than N and the laser LD5 is turned off.

Then, the controller 3 decides whether or not the monitor value $P_{mon}(2)$ is lower than the threshold value $P_{mon-th}$ (for example, approximately value of dark current+α) (step A140).

If it is decided as a result of this decision that the monitor value $P_{mon}(2)$ is lower than the threshold value $P_{mon\text{-}th}$, then the controller 3 decides that the ordinal number of the ring optical modulator 9 and the ordinal number of the input light wavelength match with each other and no inter-channel occurs and further decides whether x=N is satisfied (step A150). If x=N is not satisfied, then the controller 3 returns the processing to step A80, at which the controller 3 sets x to x=x+1 (step A150), and then repeats similar processes until it is decided that x=N is satisfied. In short, the resonance wavelength adjustment control of the third to Nth ring optical modulators Ring(3) to Ring(N) from the light input side and the additional inter-channel occurrence decision are performed in order similarly to the resonance wavelength adjustment control of the ring optical modulator Ring(2) provided at the second position from the light input side and the additional inter-channel occurrence decision described hereinabove.

On the other hand, if it is decided as a result of the decision described hereinabove that the monitor value $P_{mon}(2)$ is not lower than the threshold value $P_{mon\text{-}th}$, then the controller 3 decides that the ordinal number of the ring optical modulator 9 and the ordinal number of the input light wavelengths do not match with each other and an inter-channel occurs. Therefore, the controller 3 ends this sequence (denoted by reference character X in FIG. 21) and advances the processing to a next sequence (denoted by Z in FIG. 21) in which the re-resonance wavelength adjustment control is performed.

For example, where the resonance wavelengths of the two ring optical modulators Ring4 and Ring5 are placed between the input light of the wavelength λ1 outputted from the laser LD1 and the input light of the wavelength λ2 outputted from the laser LD2 and an inter-channel occurs as depicted in FIG. 16, if the resonance wavelength of the ring optical modulator Ring2 positioned at the second position from the light input side is matched with the wavelength λ5 outputted from the laser LD5, then the controller 3 decides, at step A140, that the monitor value $P_{mon}(2)$ is lower than the threshold value $P_{mon\text{-}th}$ and that the ordinal number of the ring optical modulator 9 and the ordinal number of the input light wavelength match with each other and no inter-channel occurs. At this stage, x is 2. Further, in this case, N is 6, and therefore, the controller 3 decides at step A150 that x=N is not satisfied. Consequently, the controller 3 returns the processing to step A80, at which the controller 3 sets x to x=3 to adjust the resonance wavelength of the ring optical modulator Ring3 (step A90). As a result, the resonance wavelength of the ring optical modulator Ring3 positioned at the third position from the light input side is matched with the input wavelength λ6 outputted from the laser LD6. Therefore, the controller 3 decides at step A140 that the monitor value $P_{mon}(3)$ is lower than the threshold value $P_{mon\text{-}th}$ and that the ordinal number of the ring optical modulator 9 and the ordinal number of the input light wavelengths match with each other and hence no inter-channel occurs. At this stage, x is 3. Further, in this case, N=6, and therefore, the controller 3 decides at step A150 that x=N is not satisfied. Consequently, the controller 3 returns the processing to step A80, at which the controller 3 sets x to x=4 to adjust the resonance wavelength of the ring optical modulator Ring4 (step A90). As a result, the resonance wavelength of the ring optical modulator Ring4 positioned at the fourth position from the light input side is matched with the wavelength λ2 outputted from the laser LD2. At this state, the controller 3 sets y to y=7 at step A100, and since N is 6, the controller 3 decides at step A110 that y is higher than N and, at step A120, the controller 3 sets y to y=1 by y=y−N and turns off the laser LD1 that outputs the input light wavelength of the ordinal number matching with the ordinal number of the ring optical modulator 9. In this case, the controller 3 decides at step A140 that the monitor value $P_{mon}(4)$ is not lower than the threshold value $P_{mon\text{-}th}$, and the ordinal number of the ring optical modulator 9 and the ordinal number of the input light wavelengths do not match with each other and an inter-channel occurs, and thus ends this sequence (denoted by reference character X in FIG. 21) and advances the processing to a next sequence (denoted by reference character Z in FIG. 21) in which the re-resonance wavelength adjustment control is performed. In short, if it is decided that the ordinal number of the ring optical modulator 9 and the ordinal number of the input light wavelength do not match with each other when the resonance wavelength of the ring optical modulator 9 is adjusted to the input light wavelength in the resonance wavelength adjustment control, then the controller 3 decides that an inter-channel occurs and therefore ends this sequence (denoted by reference character X in FIG. 21) and advances the processing to a next sequence (denoted by reference character Z in FIG. 21) in which the re-resonance wavelength adjustment control is performed. By turning on/off a laser every time the resonance wavelength of each ring optical modulator 9 is adjusted to an input light wavelength and confirming whether or not the ordinal number of the ring optical modulator 9 and the ordinal number of the input light wavelengths match with each other (namely, whether the corresponding relationship between the ring optical modulator 9 and the input light wavelength is maintained or lost) in this manner, it can be decided with a higher degree of preciseness whether or not an inter-channel occurs.

Incidentally, where whether or not an inter-channel occurs is decided depending upon whether or not the ordinal number of a ring optical modulator 9 and the ordinal number of an input light wavelength match with each other as described above, even if the resonance wavelength of the ring optical modulator 9 for which the resonance wavelength adjustment control has been performed last is displaced and an inter-channel occurs, it is decided that no inter-channel occurs.

Figure 22:
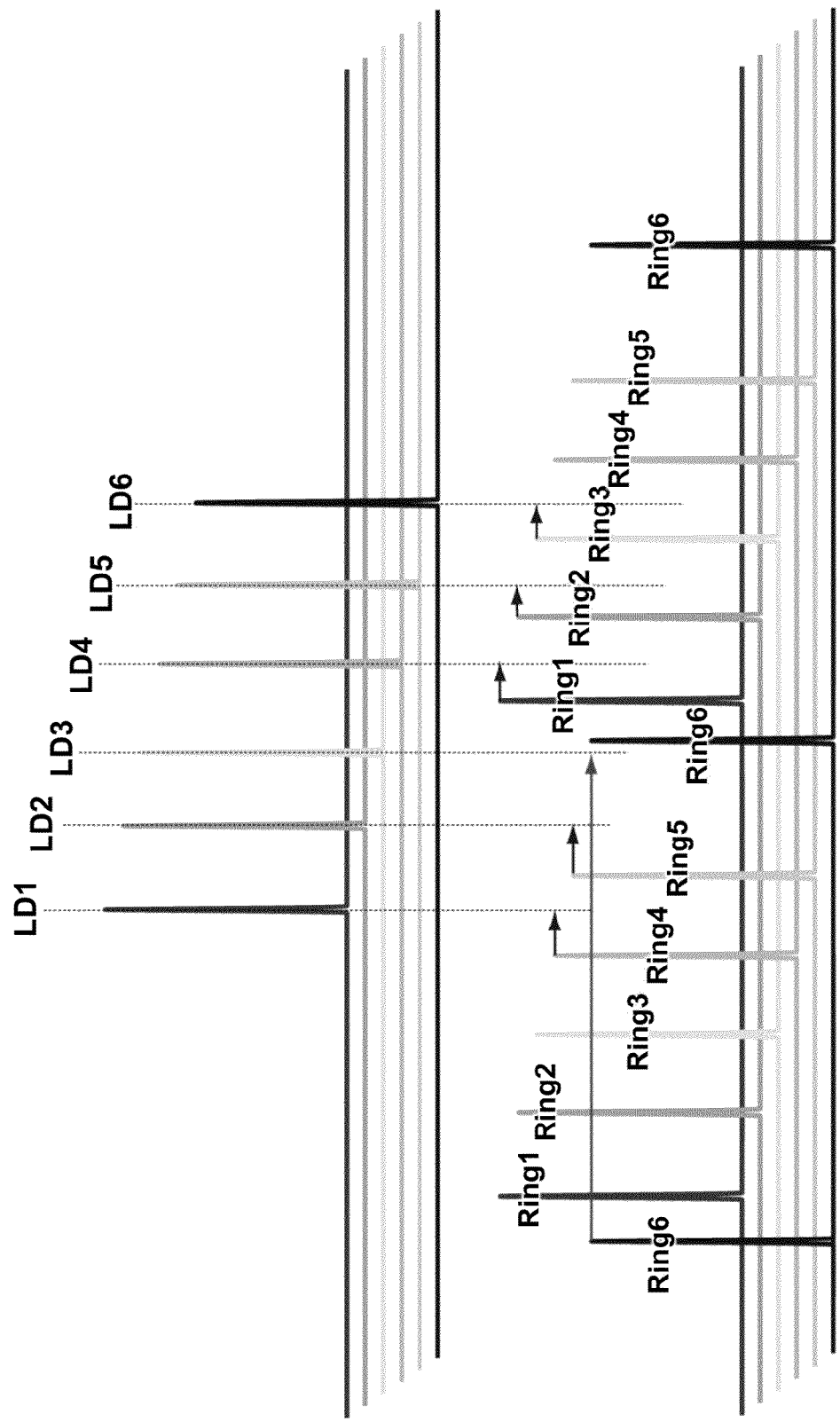
FIG. 22 is a view illustrating resonance wavelength adjustment control in the optical resonator apparatus (optical modulation apparatus) according to the second embodiment taking, as an example, resonance wavelength adjustment control (resonance spectrum adjustment) where six input lights having wavelengths that are different from each other are inputted to six ring optical resonators (ring optical modulators) and illustrating the resonance wavelength adjustment control in a case in which occurrence of an inter-channel cannot be decided based on a corresponding relationship between ring optical resonators and input light wavelengths.

For example, if the resonance wavelength of the ring optical modulator 9 for which the resonance wavelength adjustment control is performed last is displaced and an inter-channel occurs as depicted in FIG. 22, then when the resonance wavelength of the ring optical modulator 9 is adjusted to the input light wavelength in the resonance wavelength adjustment control, it is not decided that the ordinal number of the ring optical modulator 9 and the ordinal number of the input light wavelength do not match with each other, and it is decided that no inter-channel occurs.

In particular, for example, if the resonance wavelengths of the two ring optical modulators Ring1 and Ring6 are placed between the input light of the wavelength λ3 outputted from the laser LD3 and the input light of the wavelength λ4 outputted from the laser LD4 and an inter-channel occurs as depicted in FIG. 22, then the resonance wavelengths of the second and succeeding ring optical modulators Ring2 to Ring6 from the light input side are matched with the input light wavelengths outputted from the lasers LD5 to LD3 whose ordinal numbers correspond to those of the input light wavelengths. Therefore, the controller 3 decides at step A140 that the monitor values $P_{mon}(x)$ of all of the ring optical modulators Ring2 to Ring6 are lower than the threshold value $P_{mon\text{-}th}$ and thus decides that the ordinal number of the ring optical modulators 9 and the ordinal number of the input light wavelengths match with each other and no inter-channel occurs. As a result, the controller 3 decides at step A150 that x=N is satisfied.

In this case, the current amount (power consumption) necessary for the resonance wavelength adjustment control for the ring optical modulator 9 for which the resonance wavelength adjustment control has been performed last is greater than that of any other ring optical modulator 9.

Therefore, in the present embodiment, if it is decided at step A150 described hereinabove that x=N is satisfied, then the controller 3 decides whether or not the power value $P_{tune}$(N) required for the resonance wavelength adjustment control for the Nth ring optical modulator Ring(N) for which the resonance wavelength adjustment control has been performed last is lower than the threshold value $P_{tune-th}$ (for example, (N−1)×$P_{FSR}$/N or the like) (step A160) similarly as in the case of the first embodiment described hereinabove. It is to be noted that, in the present embodiment, the threshold value $P_{tune-th}$(X) that is different from that in the case of the first embodiment described hereinabove can be used. For example, such a very high value as (N−1)×$P_{FSR}$/N can be used. This is because, for example, in such a case as illustrated in FIG. 22, only it is necessary to be able to decide whether or not an inter-channel occurs. Where such a very high value is used as the threshold value, a high degree of decision accuracy can be achieved without being influenced by the environment.

If it is decided as a result of this decision that the power value $P_{tune}$(N) required for the resonance wavelength adjustment control for the Nth ring optical modulator Ring(N) is lower than the threshold value $P_{tune-th}$, then the controller 3 decides that no inter-channel occurs and thus ends the control.

On the other hand, if it is decided that the power value $P_{tune}$(N) required for the resonance wavelength adjustment control for the Nth ring optical modulator Ring(N) is equal to or higher than the threshold value $P_{tune-th}$, then the controller 3 decides that an inter-channel occurs and ends this sequence (denoted by reference character Y in FIG. 21) and then advances the processing to a next sequence (denoted by reference character Z in FIG. 21) for performing re-resonance wavelength adjustment control.

In this manner, in the present embodiment, it is decided basically from a corresponding relationship between the resonance wavelength of a ring optical modulator 9 and an input light wavelength whether or not an inter-channel occurs, and also it is decided whether or not the resonance wavelength of the ring optical modulator 9 for which the resonance wavelength adjustment control is performed last is displaced and an inter-channel occurs. In other words, in addition to the decision in the first embodiment described hereinabove regarding whether or not an inter-channel occurs, it is decided that an inter-channel occurs also when it is decided that, when the resonance wavelength of a ring optical modulator 9 is adjusted to an input light wavelength in the resonance wavelength adjustment control, the ordinal number of the ring optical modulator 9 and the ordinal number of the input light wavelength do not match with each other.

Then, if it is decided as a result of the decision at step A140 or A160 described hereinabove that an inter-channel occurs, then the controller 3 executes a sequence for performing re-resonance wavelength adjustment control similarly as in the case of the first embodiment described hereinabove.

In particular, the controller 3 first turns off the control state of all of the ring optical modulators 9 (step A170). In particular, since the ring resonators Ring(1) to Ring(N) are locked in a state in which the power values $P_{tune}$(1) to $P_{tune}$(N) are supplied thereto, respectively, as a result of the resonance wavelength adjustment control performed therefor, the locking state of the ring resonators Ring(1) to Ring(N) is turned off to reset the ring resonators Ring(1) to Ring(N).

Then, the controller 3 sets x to x=1 (step A180) and powers up the heater power supply to supply current from the heater power supply to the resonance wavelength adjustment electrode (heater electrode) of the ring optical modulator Ring(1) provided at the most light input side to adjust the resonance wavelength of the ring optical modulator Ring(1) (step A190). Here, the controller 3 adjusts the current amount (heater power) to be supplied to the ring optical modulator Ring(1) until the monitor value $P_{mon}$(1) exhibits a maximum value twice. In particular, the controller 3 gradually increases the current amount (heater port) to be supplied to the ring optical modulator Ring(1) to gradually shift the resonance wavelength of the ring optical modulator Ring(1) to the long wavelength side. Then, if the monitor value $P_{mon}$(1) exhibits a maximum value (peak) for the second time after it exhibits a maximum value (peak) for the first time, then the controller 3 completes the resonance wavelength adjustment control for the ring optical modulator Ring(1) and locks the ring optical modulator Ring(1). In this case, the resonance wavelength of the ring optical modulator Ring(1) is matched with one of peaks of the light intensity monitored by the photodetector PD(1) which appears for the second time.

Then, the controller 3 sets x to x=x+1 (step A200) and powers up the heater power supply to supply current from the heater power supply to the resonance wavelength adjustment electrode (heater electrode) of the ring optical modulator Ring(2) provided at the second position from the light input side to adjust the resonance wavelength of the ring optical modulator Ring(2) (step S210). Here, the controller 3 adjusts the current amount (power; heater power) to be supplied to the ring optical modulator Ring(2) so that the monitor value $P_{mon}$(2) exhibits a maximum value. In particular, the controller 3 gradually increases the current amount (heater power) to be supplied to the ring optical modulator Ring(2) to gradually shift the resonance wavelength of the ring optical modulator Ring(2) to the long wavelength side. Then, if the monitor value $P_{mon}$(2) exhibits a maximum value, then the controller 3 completes the resonance wavelength adjustment control for the ring optical modulator Ring(2) and locks the ring optical modulator Ring(2). In this case, the resonance wavelength of the ring optical modulator Ring(2) is matched with one of peaks of the light intensity monitored by the photodetector PD(2) which appears for the first time.

Thereafter, the controller 3 decides whether x=N is satisfied (step s120), and if x=N is not satisfied, then the controller 3 sets x to x=x+1 (step S230). Thereafter, the controller 3 returns the processing to step A210 to repeat similar processes until it is decided that x=N is satisfied. In particular, the resonance wavelength adjustment control for the third to Nth ring optical modulators Ring(3) to Ring(N) is performed in order from the light input side similarly as in the resonance wavelength adjustment control for the ring optical modulator Ring(2) provided at the second position from the light input side described hereinabove.

If it is decided that x=N is satisfied, namely, if the resonance wavelength adjustment control for the Nth ring optical modulator Ring(N) that is the last ring optical modulator is completed, then the controller 3 ends this sequence (denoted by reference character Z in FIG. 21) and ends the control.

By performing such control as described above, it can be decided with a higher degree of preciseness whether or not an inter-channel occurs. Further, by performing the re-resonance wavelength adjustment control described hereinabove when an inter-channel occurs, the resonance wavelengths of all of the ring optical modulators 9 can be allocated appropriately to the individual input light wavelengths (WDM input light channels) with low power consumption. In this manner, by performing the re-resonance wavelength adjustment control when it is decided that an inter-channel occurs, it is possible to control the current amount (power consumption) necessary for the resonance wavelength adjustment control for the ring optical modulator 9 for which the resonance wavelength adjustment control has been performed last so that the current amount may not become greater than that of any other ring optical modulator 9.

Accordingly, with the optical modulation apparatus (optical resonator apparatus), optical transmitter and controlling method for an optical modulator (optical resonator) according to the present embodiment, there is an advantage that, when a plurality of input lights having wavelengths that are different from each other are inputted to a plurality of ring optical modulators (ring optical resonators) coupled in cascade connection to reduce a required current amount (power consumption), it is possible to control the current amount (power consumption) necessary for the resonance wavelength adjustment control for the ring optical modulator (ring optical resonator) for which the resonance wavelength adjustment control has been performed last so that the current amount (power consumption) may not become greater than the current amount of any other ring optical modulator (ring optical resonator).

Third Embodiment

First, an optical resonator apparatus, an optical transmitter and a controlling method for an optical resonator are described with reference to FIGS. 23 to 25.

In the present embodiment, the optical resonator apparatus, the optical transmitter including the optical resonator apparatus and the controlling method for an optical resonator are described taking an optical modulation apparatus, an optical transmitter including the optical modulator apparatus and a controlling method for an optical modulator as an example, respectively.

The optical resonator apparatus, optical transmitter and controlling method for an optical resonator according to the present embodiment are different in the adjustment method for the resonance wavelength of the ring optical modulators 9 from those of the first embodiment described hereinabove. In particular, in the optical resonator apparatus, optical transmitter and controlling method for an optical resonator in the first embodiment described hereinabove, the resonance wavelength of the ring optical modulators 9 is adjusted by heating by a heater. However, the optical resonator apparatus, optical transmitter and controlling method for an optical resonator in the present embodiment are different in that the resonance wavelength of the ring optical modulators 9 is adjusted by carrier injection.

In this case, the first embodiment described hereinabove and the present embodiment are common in that the round-trip lengths of the ring optical waveguides of a plurality of ring optical modulators 9 vary in order from the light input side toward the light output side and the controller adjusts, in the resonance wavelength adjustment control and the re-resonance wavelength adjustment control, the resonance wavelengths of individual ones of the plurality of ring optical resonators so as to match with the input light wavelengths of the plurality of input lights that have different wavelengths from each other. However, in the first embodiment described hereinabove, the round-trip lengths of the plurality of ring optical modulators 9 increase in order from the light input side toward the light output side, and the controller adjusts, in the resonance wavelength adjustment control and the re-resonance wavelength adjustment control, the resonance wavelengths of individual ones of the plurality of ring optical resonators to the long wavelength side so as to match with the input light wavelengths of the plurality of input lights having wavelength that are different from each other. On the other hand, the present embodiment is different from the first embodiment described hereinabove in that the round-trip lengths of the ling optical waveguides of the plurality of ring optical resonators decrease in order from the light input side toward the light output side, and the controller adjusts, in the resonance wavelength adjustment control and the re-resonance wavelength adjustment control, the resonance wavelengths of individual ones of the plurality of ring optical resonators to the short wavelength side so as to match with the input light wavelengths of individual ones of the plurality of input lights having wavelength that are different from each other.

Figure 23:
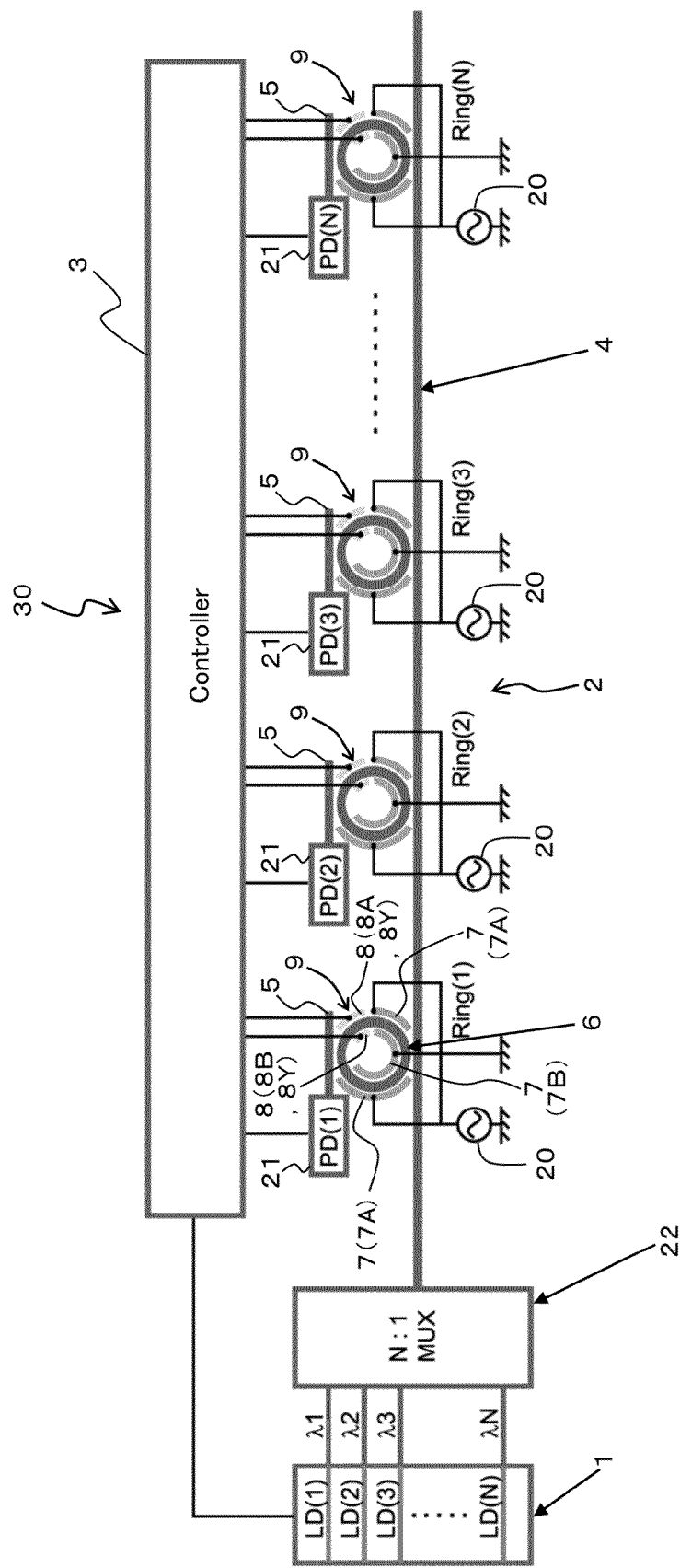
FIG. 23 is a schematic view depicting a configuration of an optical resonator apparatus (optical modulation apparatus) and an optical transmitter according to a third embodiment.
Figure 25:
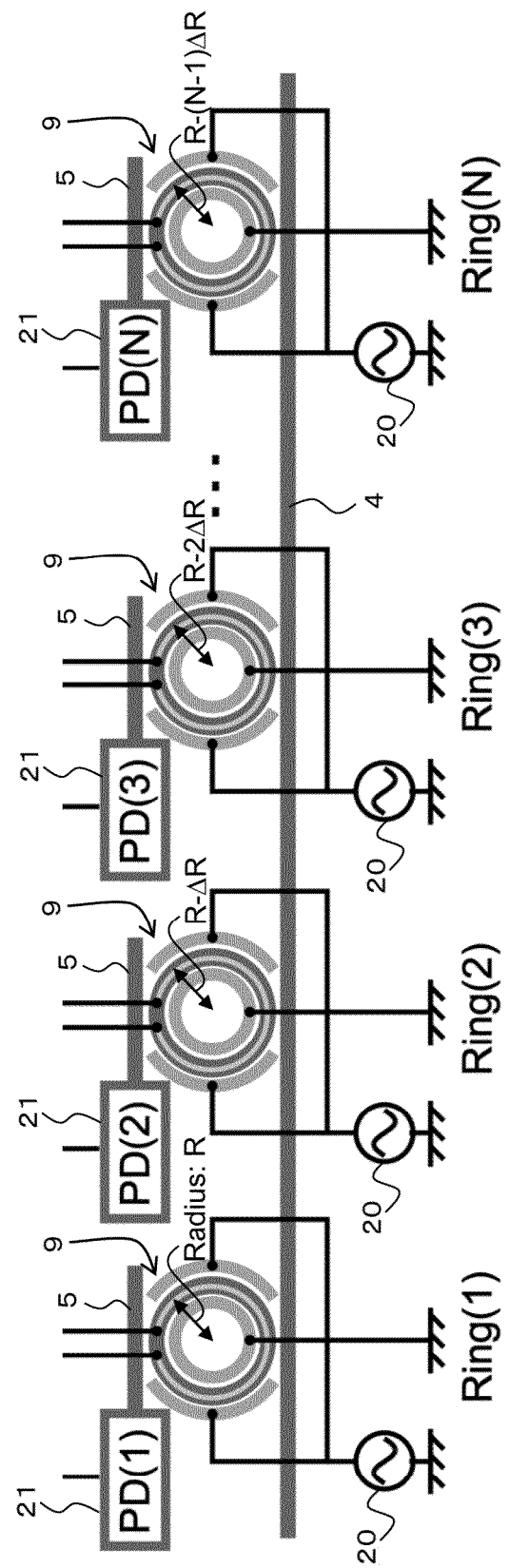
FIG. 25 is a schematic view illustrating a configuration of an optical resonance unit (optical modulation unit) provided in the optical resonator apparatus (optical modulation apparatus) according to the third embodiment.

To this end, while, in the first embodiment described hereinabove, the heater electrode 8X for heating each ring optical waveguide 6 is provided as the resonance wavelength adjustment electrode 8, in the present embodiment, a carrier injection electrode 8Y to which, in order to adjust the resonance wavelength of each ring optical modulator 9, current is supplied to inject carriers into the ring optical waveguide 6 is provided as the resonance wavelength adjustment electrode 8 as depicted in FIGS. 23 to 25.

Then, by supplying current to the carrier injection electrode 8Y, it is possible to inject carriers into a junction portion 12PN of different conductivity types formed in the inside of the ring optical waveguide 6 and to vary the refractive index thereof, thereby to adjust the resonance wavelength of the ring optical modulator 9. Here, if current is supplied to the carrier injection electrode 8Y, then carriers are injected into the junction portion 12PN formed in the inside of the ring optical waveguide 6. Thereupon, the refractive index thereof varies by a carrier plasma effect thereby to shift the resonance wavelength of the ring optical modulator 9 to the short wavelength side. It is to be noted that the carrier injection is performed by biasing the junction portion 12PN in the forward direction.

Such a refractive index variation by carrier injection as just described is superior in power efficiency in comparison with refractive index variation by a heater, and therefore, an effect of further reducing the power required for matching between the wavelength of an input light and the resonance wavelength of the ring optical modulator 9 can be expected. Meanwhile, since the optical loss by carrier injection increases, the loss from which the input light suffers increases. Further, since part of the modulation region of the ring optical modulator 9 is used as a resonance wavelength adjustment region by carrier injection, the modulation region decreases and the modulation efficiency drops. Therefore, in comparison with the first embodiment described hereinabove, the dynamic extinction ratio becomes lower with respect to an equivalent modulation signal amplitude.

Which one of the configuration of the first embodiment described hereinabove and the configuration of the third embodiment is preferable differs depending upon performances of the laser array light source 1, demanded power consumption of the system, loss in the optical link of the transmission system, configuration or characteristic of the reception system and so forth. Therefore, it is preferable to adopt a more advantageous method taking a usage environment, a required performance and so forth into consideration.

In this case, a p-side electrode 7B and an n-side electrode 7A configuring the modulation electrode 7 may be formed shorter than those in the first embodiment described hereinabove while a p-side electrode 8B and an n-side electrode 8A that configure the carrier injection electrode 8Y are provided adjacent the p-side electrode 7B and the n-side electrode 7A, respectively, as depicted in FIGS. 24A and 24B. In other words, part of the modulation region in which the modulation electrode 7 is provided in the first embodiment described hereinabove may be used as a resonance wavelength adjustment region (resonance wavelength controlling region) in which the carrier injection electrode 8Y is provided. It is to be noted that FIG. 24B is a cross sectional view taken along line B-B' of FIG. 24A, and the cross sectional view taken along line A-A' of FIG. 24A depict a structure that does not include the heater electrode 8X in FIG. 3B.

Here, the n-side electrode 7A that configures the modulation electrode 7 and the n-side electrode 8A that configures the carrier injection electrode 8Y are provided along the rib portion 12X on the high-concentration doped region 12NH of the n-type doped region 12N of each ring-shaped waveguide core layer 12C, namely, in one of outside regions of the slab portion 12Y. Further, the p-side electrode 7B that configures the modulation electrode 7 and the p-side electrode 8B that configures the carrier injection electrode 8Y are provided along the rib portion 12X on the high-concentration doped region 12PH of the p-type doped region 12P of each ring-shaped waveguide core layer 12C, namely, in the other of the outer side regions of the slab portion 12Y. In short, the n-side electrode 7A and the p-side electrode 7B that configure the modulation electrode 7 and the n-side electrode 8A and the p-side electrode 8B that configure the carrier injection electrode 8Y are provided along the rib portion 12X on the opposite sides (outer sides and inner sides) across the rib portion 12X of each ring-shaped waveguide core layer 12C. Here, the p-side electrode 7B that configures the modulation electrode 7 and the p-side electrode 8B that configures the carrier injection electrode 8Y are partly provided on the inner side of the ring-shaped rib portion 12X that configures each ring-shaped waveguide core layer 12C, and the n-side electrode 7A that configures the modulation electrode 7 and the n-side electrode 8A that configures the carrier injection electrode 8Y are provided partly on the outer sides of the ring-shaped rib portion 12X.

Further, the controller 3 may control the carrier injection power supply (or carrier injection circuit including the carrier injection power supply) in order to perform resonance wavelength adjustment control and may control the modulation signal source 20 (or a driver circuit including the modulation signal source 20) in order to perform modulation driving control.

Especially, in the present embodiment, in order to adjust the resonance wavelength of the ring optical modulators 9 by carrier injection, resonance wavelength adjustment control for adjusting the resonance wavelength of each ring optical modulator 9 (here, to the short wavelength side) so as to match with an input light wavelength is performed.

To this end, the ring optical waveguides 6 of the plurality of ring optical modulators (ring optical resonators) 9 provided in the optical modulation unit (optical resonance unit) 2 have round-trip lengths that are different from each other and decrease in order from the light input side toward the light output side (in other words, the round-trip lengths vary in order from the light input side toward the light output side). In particular, the plurality of ring optical waveguides 6 having round-trip lengths that are different from each other are provided in series along the first optical waveguide 4 such that the round-trip lengths decrease in order from the light input side toward the light output side, and the modulation electrode 7 and the resonance wavelength adjustment electrode 8 are provided on each of the ring optical waveguides 6. In this manner, the round-trip lengths of the ring optical waveguides 6 of the ring optical modulators 9 become longer toward the light input side and become shorter toward the light output side. Here, since the ring optical waveguides 6 of the ring optical modulators 9 have a circular ring shape, they have ring diameters that are different from each other and decrease in order from the light input side toward the light output side. In other words, the ring radii of the ring optical waveguides 6 of the ring optical modulators 9 become greater toward the light input side and become smaller toward the light output side.

Where the ring optical waveguides 6 of the ring optical modulators 9 have round-trip lengths that are different from each other and decrease in order from the light input side toward the light output side in this manner, the resonance wavelengths of the ring optical modulators 9 are different from each other and decrease in order from the light input side toward the light output side. In particular, in a state in which no modulation electric signal is supplied to the modulation electrode 7 and besides current is not supplied to the resonance wavelength adjustment electrode 8, the resonance wavelengths of the ring optical modulators 9 are different from each other and decrease in order from the light input side toward the light output side. It is to be noted that the orders of the resonance are equal to each other. Here, the round-trip lengths (ring radii) of the ring optical waveguides 6 of the ring optical modulators 9 are set so as to be different from each other such that the resonance wavelength intervals between the ring optical modulators 9 may be similar to the wavelength intervals of a plurality of input lights of different wavelengths outputted from the laser array light source 1. Further, the ring optical modulator 9 having the ring optical waveguide 6 whose round-trip length is greatest (whose ring radius is greatest) is disposed at the position at the most light input side, and the ring optical modulators 9 having the ring optical waveguides 6 whose round-trip lengths are successively smaller (whose ring radii are successively smaller) are disposed in order toward the light output side. For example, if the ring radius of the ring optical modulator Ring(1) at the first position from the light input side is represented by R and the ring radii of the ring optical modulators Ring(2) to Ring (N) at the second to Nth positions are successively decreased by $\Delta R$ like $R-\Delta R$, $R-2\Delta R$, ..., $r-(N-1)\Delta R$ as depicted in FIG. 25, then the resonance wavelength in a certain order of each ring optical modulator 9 shifts by a certain wavelength to the short wavelength side.

Further, the controller 3 performs resonance wavelength adjustment control for adjusting the resonance wavelengths of the plurality of ring optical modulators 9 (here, to the short wavelength side) in order beginning with the ring optical modulator 9 provided at the most light input side from among the plurality of ring optical modulators 9 so as to match with the input light wavelengths of the plurality of input lights having resonance wavelengths that are different from each other. Then, if it is decided that an inter-channel occurs, then the controller 3 performs re-resonance wavelength adjustment control for adjusting the resonance wavelength (here, to the short wavelength side) of the ring optical modulator 9 at the first position from the light input side from among the plurality of ring optical modulators 9 so as to match with a second-matching input light wavelength and adjusting the resonance wavelengths (here, to the short wavelength side) of the ring optical modulators 9 at the second and succeeding positions from the light input side thereby to adjust the resonance wavelengths (here, to the short wavelength side) of the plurality of the ring optical modulators 9 in order beginning with the ring optical modulator provided at the most light input side from among the plurality of ring optical modulators 9 so as to match with the input light wavelengths of the plurality of input lights having wavelengths that are different from each other.

Now, control (controlling method for an optical resonator; controlling method for an optical modulator) by the controller 3 provided in the optical transmitter (optical modulation apparatus; optical resonator apparatus) according to the present embodiment is described.

In the present embodiment, the controller 3 performs the re-resonance wavelength adjustment control when it is decided that an inter-channel occurs after the resonance wavelength adjustment control is performed.

In particular, the controller 3 first performs resonance wavelength adjustment control for adjusting the resonance wavelengths of the plurality of ring optical modulators 9 in order beginning with the ring optical modulator 9 provided at the most light input side from among the plurality of ring optical modulators (ring optical resonators) 9 provided in the optical modulation unit (optical resonator unit) 2 of the optical transmitter (optical modulation apparatus; optical resonator apparatus) configured in such a manner as described above so as to match with the input light wavelengths of the plurality of input lights having wavelengths that are different from each other.

Then, when it is decided that an inter-channel occurs, the controller 3 performs the re-resonance wavelength adjustment control for adjusting the resonance wavelength of the first ring optical modulator from the light input side from among the plurality of ring optical modulators so as to match with a second-matching input light wavelength and then adjusting the resonance wavelengths of the second and succeeding ring optical modulators from the light input side so as to match with a first-matching input light wavelength thereby to adjust the resonance wavelengths of the plurality of ring optical modulations in order beginning with the ring optical modulator provided at the most light input side from among the plurality of ring optical modulators so as to match with the input light wavelengths of the plurality of input lights having wavelengths that are different from each other.

Especially, the controller 3 preferably decides that an inter-channel occurs when the current amount (power consumption) required for the resonance wavelength adjustment control for the ring optical modulator 9 for which the resonance wavelength adjustment control has been performed last in the resonance wavelength adjustment control is equal to or greater than a certain current amount (certain power consumption).

Further, the round-trip lengths of the ring optical waveguides 6 of the plurality of ring optical modulators 9 decrease in order from the light input side toward the light output side, and the controller 3 preferably adjusts, in the resonance wavelength adjustment control and the re-resonance wavelength adjustment control, the resonance wavelengths of the plurality of ring optical modulators 9 to the short wavelength side so as to match with the input light wavelengths of the plurality of input lights having wavelengths that are different from each other.

It is to be noted that, while the wavelength controlling direction in the present embodiment is opposite to that in the first embodiment described hereinabove, since also the disposition of the ring optical modulators 9 with respect to the first optical waveguide 4 is reversed, the controlling algorithm in the present embodiment is substantially same as that in the first embodiment described hereinabove.

It is to be noted that details of the other points of the present embodiment are similar to those of the first embodiment described hereinabove.

Accordingly, with the optical modulation apparatus (optical resonator apparatus), optical transmitter and controlling method for an optical modulator (optical resonator) according to the present embodiment, there is an advantage that, when a plurality of input lights having wavelengths that are different from each other are inputted to a plurality of ring optical modulators (ring optical resonators) coupled in cascade connection to reduce a required current amount (power consumption), it is possible to control the current amount (power consumption) necessary for the resonance wavelength adjustment control for the ring optical modulator (ring optical resonator) for which the resonance wavelength adjustment control has been performed last so that the current amount (power consumption) may not become greater than the current amount of any other ring optical modulator (ring optical resonator).

It is to be noted that, while the present embodiment is configured as a modification to the first embodiment described hereinabove, the present embodiment is not limited to this and can be configured as a modification to the second embodiment described hereinabove. In other words, the present embodiment can be applied to the second embodiment described hereinabove.

Fourth Embodiment

First, an optical resonator apparatus and a controlling method for an optical resonator according to a fourth embodiment are described with reference to FIG. 26.

In the present embodiment, the optical resonator apparatus and the controlling method for an optical resonator are described taking an optical demultiplexing apparatus and a controlling method for an optical demultiplexer as an example, respectively.

While, in the first embodiment described hereinabove, the present technology is applied to an optical modulation apparatus, an optical transmitter and a controlling method for an optical modulator, in the present embodiment, the present technology is applied to an optical demultiplexing apparatus and a controlling method for an optical demultiplexer.

In this case, the ring optical modulator in the first embodiment described above may be read as ring optical resonator; the optical modulation unit as optical demultiplexing unit; the optical modulation apparatus as optical demultiplexing apparatus; and the controlling method for an optical modulator as controlling method for an optical demultiplexer.

Figure 26:
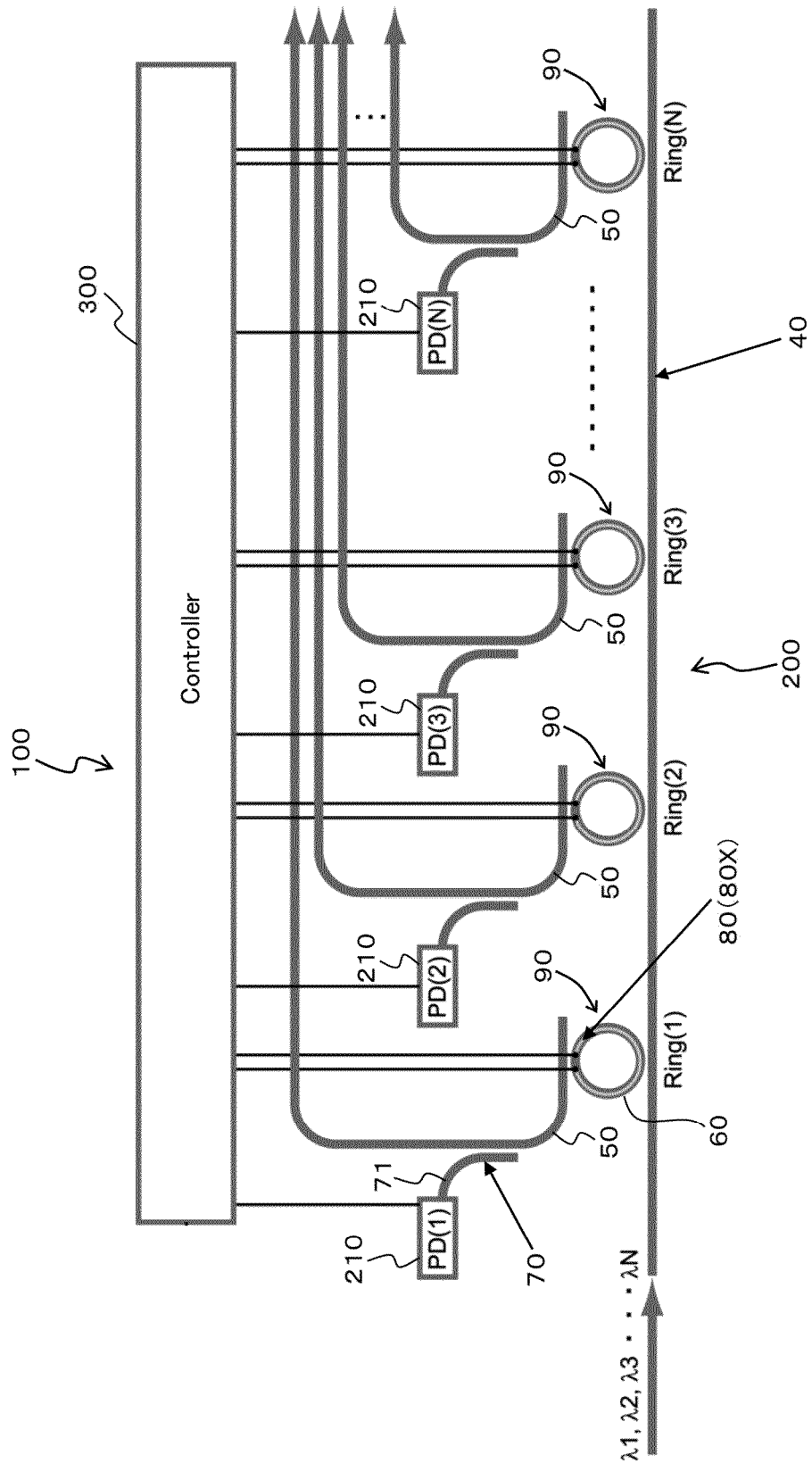
FIG. 26 is a schematic view depicting a configuration of an optical resonator apparatus (optical modulation apparatus) according to a forth embodiment.

Further, where the optical modulation apparatus is used as an optical demultiplexing apparatus 100 as depicted in FIG. 26, the modulation electrode, modulation signal source and so forth can be omitted. Further, where the optical modulation apparatus is used as the optical demultiplexing apparatus 100, WDM input light (WDM signal light; a plurality of input lights having wavelengths that are different from each other) inputted to the optical demultiplexing apparatus 100 is demultiplexed into lights of the individual wavelengths by ring optical resonators 90 and guided by and outputted from second optical waveguides 50 (optical waveguides for a drop port). Therefore, the second optical waveguides 50 may be extended to the output side, for example, through a directional coupler 70, an optical waveguide 71 (monitoring optical waveguide) along which part of the demultiplexed light is guided may be coupled to each second optical waveguide 50, and a photodetector 210 (PD) may be coupled to each optical waveguide 71. Then, the resonance wavelength adjustment control or the re-resonance wavelength adjustment control for adjusting the resonance wavelengths of the ring optical resonators 90 to a plurality of input light wavelengths included in the WDM input light and different from each other may be performed based on information from the photodetectors 210 similarly as in the case of the first embodiment described hereinabove. With the configuration just described, if the re-resonance wavelength adjustment control is performed when an inter-channel occurs, it is possible to allocate the resonance wavelengths of all of the ring optical resonators 90 appropriately to the input light wavelengths (WDM input light channels) with low power consumption.

To this end, the optical demultiplexing apparatus 100 according to the present embodiment includes an optical demultiplexing unit (optical resonator unit) 200 that includes a plurality of ring optical resonators 90 each including a first optical waveguide 40, a second optical waveguide 50, a ring optical waveguide 60 optically coupled between the first optical waveguide 40 and the second optical waveguide 50, and a resonance wavelength adjustment electrode 80 (here, a heater electrode 80X) provided on the ring optical waveguide 60 for adjusting the resonance wavelength. The plurality of ring optical resonators 90 are coupled in cascade connection, and the ring optical waveguides 60 of the plurality of ring optical resonators 90 have round-trip lengths that are different from each other and vary in order from the light input side toward the light output side.

The present optical demultiplexing apparatus 100 further includes a controller 300 that performs the resonance wavelength adjustment control for adjusting the resonance wavelengths of the plurality of ring optical resonators 90 in order so as to match with the input light wavelengths of a plurality of input lights having wavelengths that are different from each other beginning with the ring optical resonator 90 provided at the most light input side from among the plurality of ring optical resonators 90. When it is decided that an inter-channel occurs, the controller 300 further performs the re-resonance wavelength adjustment control for adjusting the resonance wavelength of the first ring optical resonator 90 from the light input side from among the plurality of ring optical resonators 90 so as to match with a second-matching input light wavelength and then adjusting the resonance wavelengths of the second and succeeding ring optical resonators 90 from the light input side to the first-matching input light wavelength thereby to adjust the resonance wavelengths of the plurality of ring optical resonators 90 in order beginning with the ring optical resonator 90 provided at the most light input side from among the plurality of ring optical resonators 90 so as to match with the input light wavelengths of the plurality of input lights having wavelengths that are different from each other.

Especially, the round-trip lengths of the ring optical waveguides 60 of the plurality of ring optical resonators 90 increase in order from the light input side toward the light output side, and preferably, the controller 300 adjusts, in the resonance wavelength adjustment control and the re-resonance wavelength adjustment control, the resonance wavelengths of the plurality of ring optical resonators 90 to the long wavelength side so as to match with the input light wavelengths of the plurality of input lights having wavelengths that are different from each other.

Meanwhile, the resonance wavelength adjustment electrode 80 preferably is the heater electrode 80X to which current is supplied to heat the ring optical waveguide 60 in order to adjust the resonance wavelength of the ring optical resonator 90.

Further, the controller 300 preferably decides that an inter-channel occurs when the current amount required for the resonance wavelength adjustment control for the ring optical resonator 90 for which the resonance wavelength adjustment control has been performed last in the resonance wavelength adjustment control is equal to or greater than a certain current amount.

Preferably, the optical demultiplexing apparatus 100 includes a photodetector 210 coupled to the first optical waveguide or the second optical wavelength of each of the plurality of ring optical resonators 90, and the controller 3 performs the resonance wavelength adjustment control and the re-resonance wavelength adjustment control based on information detected by the photodetectors 210.

Now, control (controlling method for an optical demultiplexer; controlling method for an optical resonator) by the controller 3 provided in the optical demultiplexing apparatus (optical resonator apparatus) according to the present embodiment is described.

In the present embodiment, the controller 300 performs the re-resonance wavelength adjustment control when it is decided that an inter-channel occurs after the resonance wavelength adjustment control is performed.

In particular, the controller 300 first performs the resonance wavelength adjustment control for adjusting the resonance wavelengths of the plurality of ring optical resonators 90 in order beginning with the ring optical resonator 90 provided at the most light input side from among the plurality of ring optical resonators 90 provided in the optical demultiplexing unit (optical resonator unit) 200 of the optical demultiplexing apparatus (optical resonator apparatus) 100 configured in such a manner as described above so as to match with the input light wavelengths of the plurality of input lights having wavelengths that are different from each other.

Then, if it is decided that an inter-channel occurs, then the controller 300 adjusts the resonance wavelength of the first ring optical resonator 90 from the light input side from among the plurality of ring optical resonators so as to match with a second-matching input light wavelength and then adjusting the resonance wavelengths of the second and succeeding ring optical resonators 90 from the light input side so as to match with a first-matching input light wavelength thereby to adjust the resonance wavelengths of the plurality of ring optical resonators 90 in order beginning with the ring optical resonator 90 provided at the most light input side from among the plurality of ring optical resonators 90 so as to match with the input light wavelengths of the plurality of input lights having wavelengths that are different from each other.

Especially, the controller 300 preferably decides that an inter-channel occurs when the current amount (power consumption) required for the resonance wavelength adjustment control for the ring optical resonator 90 for which the resonance wavelength adjustment control has been performed last in the resonance wavelength adjustment control is equal to or greater than a certain current amount (certain power consumption).

Further, the round-trip lengths of the ring optical waveguides of the plurality of ring optical resonators 90 increase in order from the light input side toward the light output side, and the controller 300 preferably adjusts, in the resonance wavelength adjustment control and the re-resonance wavelength adjustment control, the resonance wavelengths of the plurality of ring optical resonators 90 to the long wavelength side so as to match with the input light wavelengths of the plurality of input lights having wavelengths that are different from each other.

It is to be noted that details of the other points of the present embodiment are similar to those of the first embodiment described hereinabove.

Accordingly, with the optical demultiplexing apparatus (optical resonator apparatus) and the controlling method for an optical demultiplexer (optical resonator) according to the present embodiment, there is an advantage that, when a plurality of input lights having wavelengths that are different from each other are inputted to a plurality of ring optical modulators (ring optical resonators) coupled in cascade connection to reduce a required current amount (power consumption), it is possible to control the current amount (power consumption) necessary for the resonance wavelength adjustment control for the ring optical resonator for which the resonance wavelength adjustment control has been performed last so that the current amount (power consumption) may not become greater than the current amount of any other ring optical resonator.

It is to be noted that, while the present embodiment has been described taking a case in which the light demultiplexing apparatus and the controlling method for an optical demultiplexer in the first embodiment described hereinabove are used as those in the present embodiment as an example, the light demultiplexing apparatus and the controlling method for an optical demultiplexer are not limited to this, and the light demultiplexing apparatus and the controlling method for an optical demultiplexer in each of the second and third embodiments described above can be used as the light demultiplexing apparatus and the controlling method for an optical demultiplexer in the present embodiment. Also in this case, the ring optical modulator in the second and third embodiments described above may be read as ring optical resonator; the optical modulation unit as optical demultiplexing unit; the optical modulation apparatus as optical demultiplexing apparatus; and the controlling method for an optical modulator as controlling method for an optical demultiplexer.

For example, where the light demultiplexing apparatus in the third embodiment described hereinabove is used as the optical demultiplexing apparatus, the optical demultiplexing apparatus (optical resonator apparatus) is configured such that the round-trip lengths of the ring optical waveguides of the plurality of ring optical resonators decrease in order from the light input side toward the light output side. Thus, the controller adjusts, in the resonance wavelength adjustment control and the re-resonance wavelength adjustment control, the resonance wavelengths of the plurality of ring optical resonators to the short wavelength side so as to match with the input light wavelengths of the plurality of lights having wavelengths that are different from each other. In this case, the resonance wavelength adjustment electrode preferably is a carrier injection electrode to which current is supplied to inject carriers into the ring optical waveguide in order to adjust the resonance wavelength of the ring optical resonator. It is to be noted that details of the other points of the present embodiment are similar to those of the third embodiment described hereinabove.

On the other hand, where the apparatus in the second embodiment described hereinabove is used as the optical demultiplexing apparatus, if the ordinal number of a ring optical resonator and the ordinal number of an input light wavelength do not coincide with each other when the resonance wavelength of the input light wavelength is adjusted to the input light wavelength in the resonance wavelength adjustment control or if the current amount required for the resonance wavelength adjustment control for the ring optical resonator for which the resonance wavelength adjustment control has been performed last in the resonance wavelength adjustment control is equal to or greater than a certain current amount, then it is decided that an inter-channel occurs. It is to be noted that details of the other points of the present embodiment are similar to those of the second embodiment described hereinabove.

[Others]

It is to be noted that the present technology is not limited to the configurations described in the description of the embodiments and modifications given above but can be modified in various manners without departing from the spirit and scope of the present technology.

For example, while, in the embodiments described hereinabove, silicon is used as the material of the waveguide core layer that configures optical waveguides provided in the optical resonator units and $SiO_2$ is used as the material of the cladding layer, the materials are not limited to them, and other semiconductor materials such as, for example, silicon germanium (SiGe), InP, GaAs and mixed crystal of them, namely, other semiconductor materials transparent with respect to signal light in the communication wavelength band, may be used. Also in this case, effects similar to those achieved by the embodiments described hereinabove can be achieved.

Further, while, in the embodiments described hereinabove, a silicon substrate (Si substrate) is used for the substrate 10, the material of the substrate 10 is not limited to this, and other substrates of, for example, quartz, GaAs or InP may be used instead. Also in this case, similar effects to those achieved by the embodiments described hereinabove can be achieved.

Further, while, in the embodiments described hereinabove, the ring optical resonator has a lateral pn structure and a carrier density variation upon reverse biasing is used, the ring optical resonator is not limited to this, and, for example, the ring optical resonator may have a pin structure and a carrier density upon forward biasing may be utilized. Also in this case, effects similar to those achieved by the embodiments described hereinabove can be achieved.

Further, while, in the embodiments described hereinabove, the ring optical waveguide of the ring optical resonator is of a circular ring type, the ring optical waveguide is not limited to this and may be of a race track type wherein the coupling portion between the first optical waveguide and the second optical waveguide (input and output waveguides) has a linear shape. Also in this case, effects similar to those achieved by the embodiments described hereinabove can be achieved.

Further, while, in the embodiments described hereinabove, the waveguide structure is a rib waveguide structure, the waveguide structure is not limited to this, and, for example, part or all of the waveguides may have a channel-type waveguide structure that does not include a slab portion. Also in this case, effects similar to those achieved by the embodiments described hereinabove can be achieved.

Further, the round-trip lengths (ring radii) or resonance wavelength intervals of the ring optical modulators, the number of or the wavelength interval between input light wavelengths (number of wavelengths included in WDM input light) are not limited to those in the embodiments described hereinabove but may be set suitably.

Further, while, in the embodiments described hereinabove, the photodetector is a pin type photodetector of an InGaAs absorption layer or a Ge absorption layer, the photodetector is not limited to them. For example, only it is necessary for the absorption layer to absorb a signal wavelength, and in addition to the materials mentioned above, some other material such as, for example, InGaAsP can be used. Also in this case, effects similar to those achieved by the embodiments described hereinabove can be achieved. Further, for example, with regard to the structure of the photodetector, it may be a structure other than the pin type structure, and, for example, a photodetector of some other structure such as an APD (Avalanche PhotoDiode) type structure or a MIM (Metal-Insulator-Metal) type structure may be used. Also in this case, effects similar to those achieved by the embodiments described hereinabove can be achieved.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical resonator apparatus, comprising:
an optical resonator unit that includes a plurality of ring optical resonators each including a first optical waveguide, a second optical waveguide, a ring optical waveguide optically coupled between the first optical waveguide and the second optical waveguide, and a resonance wavelength adjustment electrode provided on the ring optical waveguide for adjusting a resonance wavelength, the plurality of ring optical resonators being coupled in cascade connection with each other, the ring optical waveguides of the plurality of ring optical resonators having round-trip lengths that are different from each other and vary in order from a light input side to a light output side; and
a controller that performs resonance wavelength adjustment control for adjusting a resonance wavelength of each of the plurality of ring optical resonators in order beginning with the ring optical resonator provided at the most light input side from among the plurality of ring optical resonators so as to match with an input light wavelength of each of a plurality of input lights having wavelengths that are different from each other and performs, when it is decided that an inter-channel occurs, re-resonance wavelength adjustment control for adjusting the resonance wavelength of the first ring optical resonator from the light input side from among the plurality of ring optical resonators so as to match with a second-matching input light wavelength and adjusting the resonance wavelengths of the second and succeeding ring optical resonators from the light input side to the first-matching input light wavelength thereby to adjust the resonance wavelength of each of the plurality of ring optical resonators so as to match with the input light wavelength of each of the plurality of input lights having wavelengths that are different from each other in order beginning with the ring optical resonator provided at the most light input side from among the plurality of ring optical resonators.

2. The optical resonator apparatus according to claim 1, wherein the round-trip lengths of the ring optical waveguides of the plurality of ring optical resonators increase in order from the light input side toward the light output side; and
the controller adjusts, in the resonance wavelength adjustment control and the re-resonance wavelength adjustment control, the resonance wavelength of each of the plurality of ring optical resonators to a long wavelength side so as to match with the input light wavelength of each of the plurality of input lights having wavelengths that are different from each other.

3. The optical resonator apparatus according to claim 1, wherein the resonance wavelength adjustment electrode is a heater electrode, to which current for adjusting the resonance wavelength of the ring optical resonator is supplied to heat the ring optical waveguide.

4. The optical resonator apparatus according to claim 1, wherein the round-trip lengths of the ring optical waveguides of the plurality of ring optical resonators decrease in order from the light input side toward the light output side; and
the controller adjusts, in the resonance wavelength adjustment control and the re-resonance wavelength adjustment control, the resonance wavelength of each of the plurality of ring optical resonators to a short wavelength side so as to match with the input light wavelength of each of the plurality of input lights having wavelengths that are different from each other.

5. The optical resonator apparatus according to claim 1, wherein the resonance wavelength adjustment electrode is a carrier injection electrode, to which current for adjusting the resonance wavelength of the ring optical resonator is supplied, to inject a carrier into the ring optical waveguide.

6. The optical resonator apparatus according to claim 1, wherein the controller decides that the inter-channel occurs when a current amount required for the resonance wavelength adjustment control for the ring optical resonator for which the resonance wavelength adjustment control has been performed last in the resonance wavelength adjustment control is equal to or greater than a certain current amount.

7. The optical resonator apparatus according to claim 1, wherein the controller decides that the inter-channel occurs where the order of the ring optical resonators and the order of the input light wavelengths do not match with each other when adjusting the resonance wavelengths of the ring optical resonators so as to match with the input light wavelengths in the resonance wavelength adjustment control or where a current amount required for the resonance wavelength adjustment control for the ring optical resonator for which the resonance wavelength adjustment control has been performed last in the resonance wavelength adjustment control is equal to or greater than a certain current amount.

8. The optical resonator apparatus according to claim 1, further comprising a photodetector coupled to the first optical waveguide or the second optical waveguide of each of the plurality of ring optical resonators; wherein
the controller performs the resonance wavelength adjustment control and the re-resonance wavelength adjustment control based on information detected by the photodetector.

9. An optical transmitter, comprising:
a light source that outputs lights having wavelengths different from each other;
an optical multiplexing unit coupled with the light source;
an optical resonator unit that is coupled with the optical multiplexing unit and includes a plurality of ring optical resonators each including a first optical waveguide, a second optical waveguide, a ring optical waveguide optically coupled between the first optical waveguide and the second optical waveguide, and a resonance wavelength adjustment electrode provided on the ring optical waveguide for adjusting a resonance wavelength, the plurality of ring optical resonators being coupled in cascade connection with each other, the ring optical waveguides of the plurality of ring optical resonators having round-trip lengths that are different from each other and vary in order from a light input side to a light output side; and
a controller that performs resonance wavelength adjustment control for adjusting a resonance wavelength of each of the plurality of ring optical resonators in order beginning with the ring optical resonator provided at the most light input side from among the plurality of ring optical resonators to an input light wavelength of a corresponding one of input light components having a plurality of wavelengths different from each other and performs, when it is decided that an inter-channel occurs, re-resonance wavelength adjustment control for adjusting the resonance wavelength of the first ring optical resonator from the light input side from among the plurality of ring optical resonators so as to match with a second-matching input light wavelength and adjusting the resonance wavelengths of the second and succeeding ring optical resonators from the light input side to the first-matching input light wavelength thereby to adjust the resonance wavelengths of the plurality of ring optical resonators so as to match with the input light wavelength each of the plurality of input lights having wavelengths that are different from each other in order beginning with the ring optical resonator provided at the most light input side from among the plurality of ring optical resonators.

10. The optical transmitter according to claim 9, wherein the round-trip lengths of the ring optical waveguides of the plurality of ring optical resonators increase in order from the light input side toward the light output side; and
the controller adjusts, in the resonance wavelength adjustment control and the re-resonance wavelength adjustment control, the resonance wavelength of each of the plurality of ring optical resonators to a long wavelength side so as to match with the input light wavelength of each of the plurality of input lights having wavelengths that are different from each other.

11. The optical transmitter according to claim 9, wherein the resonance wavelength adjustment electrode is a heater electrode to which current for adjusting the resonance wavelength of the ring optical resonator is supplied to heat the ring optical waveguide.

12. The optical transmitter according to claim 9, wherein the round-trip lengths of the ring optical waveguides of the plurality of ring optical resonators decrease in order from the light input side toward the light output side; and
the controller adjusts, in the resonance wavelength adjustment control and the re-resonance wavelength adjustment control, the resonance wavelength of each of the plurality of ring optical resonators to a short wavelength side so as to match with the input light wavelength of each of the plurality of input lights having wavelengths that are different from each other.

13. The optical transmitter according to claim 9, wherein the resonance wavelength adjustment electrode is a carrier injection electrode to which current for adjusting the resonance wavelength of the ring optical resonator is supplied, to inject a carrier into the ring optical waveguide.

14. The optical transmitter according to claim 9, wherein the controller decides that the inter-channel occurs when a current amount required for the resonance wavelength adjustment control for the ring optical resonator for which the resonance wavelength adjustment control has been performed last in the resonance wavelength adjustment control is equal to or greater than a certain current amount.

15. The optical transmitter according to claim 9, wherein the controller decides that the inter-channel occurs where the order of the ring optical resonators and the order of the input light wavelengths do not match with each other when adjusting the resonance wavelengths of the ring optical resonators so as to match with the input light wavelengths in the resonance wavelength adjustment control or where a current amount required for the resonance wavelength adjustment control for the ring optical resonator for which the resonance wavelength adjustment control has been performed last in the resonance wavelength adjustment control is equal to or greater than a certain current amount.

16. The optical transmitter according to claim 9, further comprising a photodetector coupled to the first optical waveguide or the second optical waveguide of each of the plurality of ring optical resonators; wherein
the controller performs the resonance wavelength adjustment control and the re-resonance wavelength adjustment control based on information detected by the photodetector.

17. A controlling method for an optical resonator, comprising:
performing, by a controller, resonance wavelength adjustment control for adjusting a resonance wavelength of each of a plurality of ring optical resonators provided in an optical resonator and each including a first optical waveguide, a second optical waveguide, a ring optical waveguide optically coupled between the first optical waveguide and the second optical waveguide, and a resonance wavelength adjustment electrode provided on the ring optical waveguide for adjusting a resonance wavelength, the plurality of ring optical resonators being coupled in cascade connection with each other, the ring optical waveguides of the plurality of ring optical resonators having round-trip lengths that are different from each other and vary in order from a light input side to a light output side, the resonance wavelength adjustment control adjusting the resonance wavelength of each of the plurality of ring optical resonators in order beginning with the ring optical resonator provided at the most light input side from among the plurality of ring optical resonators so as to match with an input light wavelength of each of a plurality of input lights having wavelengths that are different from each other; and
performing, by the controller, when it is decided that an inter-channel occurs, re-resonance wavelength adjustment control for adjusting the resonance wavelength of the first ring optical resonator from the light input side from among the plurality of ring optical resonators so as to match with a second-matching input light wavelength and adjusting the resonance wavelengths of the second and succeeding ring optical resonators from the light input side to the first-matching input light wavelength thereby to adjust the resonance wavelength of each of the plurality of ring optical resonators so as to match with the input light wavelength of each of the plurality of input lights having wavelengths that are different from each other in order beginning with the ring optical resonator provided at the most light input side from among the plurality of ring optical resonators.

18. The controlling method for an optical resonator according to claim 17, wherein the round-trip lengths of the ring optical waveguides of the plurality of ring optical resonators increase in order from the light input side toward the light output side; and
the controller adjusts, in the resonance wavelength adjustment control and the re-resonance wavelength adjustment control, the resonance wavelength of each of the plurality of ring optical resonators to a long wavelength side so as to match with the input light wavelength of each of the plurality of input lights having wavelengths that are different from each other.

19. The controlling method for an optical resonator according to claim 17, wherein the round-trip lengths of the ring optical waveguides of the plurality of ring optical resonators decrease in order from the light input side toward the light output side; and the controller adjusts, in the resonance wavelength adjustment control and the re-resonance wavelength adjustment control, the resonance wavelength of each of the plurality of ring optical resonators to a short wavelength side so as to match with the input light wavelength of each of the plurality of input lights having wavelengths that are different from each other.

20. The controlling method for an optical resonator according to claim 17, wherein the controller decides that the inter-channel occurs when a current amount required for the resonance wavelength adjustment control for the ring optical resonator for which the resonance wavelength adjustment control has been performed last in the resonance wavelength adjustment control is equal to or greater than a certain current amount.

* * * * *